(12) United States Patent
Kitayama et al.

(10) Patent No.: US 7,423,564 B2
(45) Date of Patent: Sep. 9, 2008

(54) OPTICAL SIGNAL PROCESSING DEVICE FOR A/D CONVERTER INCLUDING OPTICAL ENCODERS WITH NONLINEAR LOOP MIRRORS

(75) Inventors: Ken-ichi Kitayama, Osaka (JP);
Kensuke Ikeda, Tokyo (JP);
Mohammad Abdul Jalil, Chiba (JP);
Shu Namiki, Tokyo (JP); Takashi Inoue, Tokyo (JP)

(73) Assignee: Juridical Foundation Osaka Industrial Promotion Organization, Osaka (JP)

( * ) Notice: Subject to any disclaimer, the term of this patent is extended or adjusted under 35 U.S.C. 154(b) by 0 days.

(21) Appl. No.: 10/579,630

(22) PCT Filed: Nov. 16, 2004

(86) PCT No.: PCT/JP2004/017007

§ 371 (c)(1),
(2), (4) Date: Sep. 11, 2007

(87) PCT Pub. No.: WO2005/047970

PCT Pub. Date: May 26, 2005

(65) Prior Publication Data
US 2008/0129564 A1    Jun. 5, 2008

(51) Int. Cl.
*H03M 1/00* (2006.01)
(52) U.S. Cl. .................... 341/137; 341/140; 341/142; 398/154; 398/155; 398/147; 398/140; 398/102; 385/5; 385/15; 385/16; 385/24; 385/32
(58) Field of Classification Search .................. 341/137, 341/155; 398/154, 155, 147, 199, 140, 201, 398/102; 385/5, 15, 16, 32, 24, 122
See application file for complete search history.

(56) References Cited

U.S. PATENT DOCUMENTS 4,851,840 A * 7/1989 McAulay .................... 341/137

(Continued)

FOREIGN PATENT DOCUMENTS

EP        0 985 956        3/2000

(Continued)

OTHER PUBLICATIONS

Henry F. Taylor, "An Optical Analog-to-digital Converter-Design and Analysis", IEEE Journal of Quantum Electronics, vol. QE-15, No. 4, Apr. 1979.

(Continued)

*Primary Examiner*—Linh V Nguyen
(74) *Attorney, Agent, or Firm*—Wenderoth, Lind & Ponack, L.L.P.

(57) ABSTRACT

An optically sampling device optically samples an optical analog signal using a sampled signal having a predetermined sampling frequency, and outputs control light having a pulse train of an optically sampled optical analog signal. A signal generating device generates a pulse train of signal light which is synchronized with the sampled signal. An optical encoding device optically encodes the pulse train of the signal light according to the control light, by using optical encoders each including nonlinear optical loop mirrors, and outputs pulse trains of optically encoded signal light from said optical encoders, respectively. An optically quantizing device performs optical threshold processing on the pulse trains of optically-encoded signal light to optically quantize them, by using at least one of optical threshold processors each of which is connected to each of said optical encoders and includes a nonlinear optical device, and outputs optically quantized pulse trains as optical digital signals.

21 Claims, 58 Drawing Sheets

U.S. PATENT DOCUMENTS

| | | | | |
|---|---|---|---|---|
| 4,926,177 | A * | 5/1990 | Sakata | 341/137 |
| 5,604,618 | A | 2/1997 | Mori et al. | |
| 5,848,205 | A | 12/1998 | Bigo | |
| 6,118,397 | A * | 9/2000 | Heflinger | 341/137 |
| 6,160,504 | A | 12/2000 | Fields et al. | |
| 6,229,937 | B1 | 5/2001 | Nolan et al. | |
| 6,404,365 | B1 * | 6/2002 | Heflinger | 341/137 |
| 6,424,773 | B1 | 7/2002 | Watanabe | |
| 6,453,082 | B1 | 9/2002 | Watanabe | |
| 6,525,682 | B2 * | 2/2003 | Yap et al. | 341/137 |
| 6,529,150 | B1 * | 3/2003 | Shoop et al. | 341/137 |
| 6,584,241 | B2 * | 6/2003 | Davis et al. | 385/5 |
| 6,608,854 | B1 * | 8/2003 | Watanabe | 372/96 |
| 6,642,872 | B2 * | 11/2003 | Pfeiffer | 341/137 |
| 6,665,480 | B2 | 12/2003 | Watanabe | |
| 6,760,509 | B2 * | 7/2004 | Islam | 385/24 |
| 7,079,731 | B2 * | 7/2006 | Shahar | 385/48 |
| 7,171,082 | B2 * | 1/2007 | Ionov | 385/39 |
| 7,236,707 | B2 * | 6/2007 | Shahar | 398/140 |
| 7,321,731 | B2 * | 1/2008 | Ionov et al. | 398/75 |
| 7,369,779 | B1 * | 5/2008 | Croussore et al. | 398/176 |
| 2002/0097943 | A1 * | 7/2002 | Davis et al. | 385/5 |
| 2003/0058499 | A1 * | 3/2003 | Reingand et al. | 359/135 |
| 2003/0063860 | A1 | 4/2003 | Watanabe | |
| 2004/0001016 | A1 * | 1/2004 | Nunnally | 341/137 |
| 2008/0094263 | A1 * | 4/2008 | Hirono et al. | 341/137 |

FOREIGN PATENT DOCUMENTS

| | | |
|---|---|---|
| EP | 1 052 746 | 11/2000 |
| EP | 1 093 011 | 4/2001 |
| JP | 1-271730 | 10/1989 |
| JP | 8-146473 | 6/1996 |
| JP | 9-33967 | 2/1997 |
| JP | 9-102991 | 4/1997 |
| JP | 9-222620 | 8/1997 |
| JP | 11-231361 | 8/1999 |
| JP | 2000-10129 | 1/2000 |
| JP | 2000-321606 | 11/2000 |
| JP | 2001-117125 | 4/2001 |
| JP | 2002-525647 | 8/2002 |
| JP | 2003-75787 | 3/2003 |
| JP | 2003-107541 | 4/2003 |
| WO | 93/05592 | 3/1993 |

OTHER PUBLICATIONS

B. Jalali et al., "Optical folding-flash analog-to-digital converter with analog encoding", Optics Letters, Optical Society of America, vol. 20, No. 18, Sep. 15, 1995.

N. J. Doran et al., "Nonlinear-optical loop mirror", Optics Letters, Optical Society of America, vol. 13, No. 1, Jan. 1988.

Takashi Yamamoto et al., "Demultiplexing of subterabit TDM signal by using ultrafast nonlinear optical loop mirror", Technical Report of the Institute of Electronics Information and Communication Engineers, C-I, issued from the Institute of Electronics Information and Communication Engineers, vol. J82-C-1, pp. 109-116, Mar. 1999.

Govind P. Agrawal, "Nonlinear Fiber Optics", Academic Press, ISBN: 0120451425, 2nd Edition, pp. 210-211, 1995.

Stephen M. Jensen, "The Nonlinear Coherent Coupler", IEEE Journal of Quantum Electronics, vol. QE-18, No. 10, Oct. 1982.

William S. Wong et al., "Self-switching of optical pulses in dispersion-imbalanced nonlinear loop mirrors", Optics Letters, Optical Society of America, vol. 22, pp. 1150-1152, 1997.

I. Y. Khrushchev et al., "High-quality laser diode pulse compression in dispersion-imbalanced loop mirror", Electronics Letters, vol. 34, pp. 1009-1010, May 1998.

K. R. Tamura et al., "Spectral-Smoothing and Pedestal Reduction of Wavelength Tunable Quasi-Adiabatically Compressed Femtosecond Solitons Using a Dispersion-Flattened Dispersion-Imbalanced Loop Mirror", IEEE Photonics Technology Letters, vol. 11, pp. 230-232, Feb. 1999.

K. J. Blow et al., "Demonstration of the nonlinear fiber loop mirror as an ultrafast all-optical demultiplexer", Electronics Letters, vol. 26, pp. 962-964, 1990.

T. Yamamoto et al., Ultrafast nonlinear optical loop mirror for demultiplexing 640 Gbit/s TDM signals, Electronics Letters, vol. 34, 1013-1014, May 1998.

Supplementary European Search Report issued Jan. 11, 2008 in the European Application No. EP 04 81 8553.

J.-M. Jeong et al., "All-Optical analog-to-digital and digital-to-analog conversion implemented by a nonlinear fiber interferometer", Optics Communications, North-Holland Publishing Co., Amsterdam, NL, vol. 91, No. ½ , Jul. 1, 1992, pp. 115-122.

Akihiro Maruta et al., "All-Optical Analog-to-Digital Conversion Utilizing Nonlinear Phenomena in Fiber", Leos 2002, 15th Annual Meeting of the IEEE Lasers & Electro-Optics Society, Glascow, Scotland, Nov. 11-12, 2002, Annual Meeting of the IEEE Lasers and Electro-Optics Society, New York, NY, IEEE, US, vol. 1 of 2, Nov. 13, 2002, pp. 430-431.

Tsuyoshi Konishi et al., "All-optical analog-to-digital converter by use of self-frequency shifting in fiber and a pulse-shaping technique", Journal of the Optical Society of America B, vol. 19, No. 11, Nov. 2002, pp. 2817-2823.

Paul W. Juodawlkis et al., "Optically Sampled Analog-to-Digital Converters", IEEE Transactions on Microwave Theory and Techniques, IEEE Service Center, Piscataway, NJ, US, vol. 49, No. 10, Oct. 2001, pp. 1840-1853.

J.-M. Jeong et al., "All-optical analog-to-digital and digital-to-analog conversion implemented by a nonlinear fiber interferometer", Optics Communications, Jul. 1, 1992, vol. 91, pp. 115-122.

* cited by examiner

Fig.54

| x | y | OPTICAL SIGNAL INTENSITY |
|---|---|---|
| 0 | 0 | 0 |
| 1 | 0 | A |
| 0 | 1 | 2A |
| 1 | 1 | 3A |

Fig.56

| CODE | OPTICAL SIGNAL INTENSITY |
|------|--------------------------|
| 00   | 0                        |
| 10   | A                        |
| 01   | 2A                       |
| 11   | 3A                       |

OPTICAL LOGIC OPERATION CIRCUIT 600

OPTICAL SIGNAL PROCESSING DEVICE FOR A/D CONVERTER INCLUDING OPTICAL ENCODERS WITH NONLINEAR LOOP MIRRORS

TECHNICAL FIELD

The present invention relates to an optical signal processing method and an optical signal processing device, a nonlinear optical loop mirror and a designing method thereof, and an optical signal conversion method, for use in, for example, optical fiber communication systems and for use in an optical analog-to-digital conversion method and device for converting an optical analog signal into an optical digital signal.

BACKGROUND ART

Conventionally, analog-to-digital conversion (referred to as A/D conversion hereinafter) has been realized through the digitizing, quantization and encoding processings, and these processings have been conventionally performed through the electrical signal processings using semiconductor devices.

Currently, there is a demand for analog-to-digital conversion processing by the high-speed optical processing. For example, non-patent documents 1 and 2 (referred to as prior art examples hereinafter) disclose a method of quantizing an optical analog signal using a Mach-Zehnder interferometer type optical modulator as a sample hold circuit, performing photoelectric conversion using a photo-detector, and encoding a converted electric signal using electric circuits.

Patent Document 1: Japanese patent laid-open publication No. P01-271730A.
Patent Document 2: Japanese patent laid-open publication No. P2000-010129A.
Patent Document 3: Japanese patent laid-open publication No. P9-033967A.
Patent Document 4: Japanese patent laid-open publication No. P9-222620A.
Patent Document 5: Japanese patent laid-open publication No. P9-102991A.
Patent Document 6: Japanese patent laid-open publication No. P2000-321606A.
Patent Document 7: Japanese patent laid-open publication No. P2001-117125A.
Patent Document 8: Japanese patent laid-open publication No. P8-146473A.
Patent Document 9: Japanese patent laid-open publication No. P2002-525647A.
Patent Document 10: Japanese patent laid-open publication No. P2003-107541A.
Non-Patent Document 1: Henry F. Taylor, "An Optical Analog-to-digital Converter-Design and Analysis", IEEE Journal of Quantum Electronics, Vol. QE-15, No. 4, Apr. 1979.
Non-Patent Document 2: B. Jalali et al., "Optical folding-flash analog-to-digital converter with analog encoding", Optics Letters, Optical Society of America, Vol. 20, No. 18, Sep. 15, 1995.
Non-Patent Document 3: N.J. Doran et al., "Nonlinear-optical loop mirror", Optical Letters, Optics Society of America, Vol. 13, No. 1, January 1988.
Non-Patent Document 4: Takashi Yamamoto et al., "Demultiplexing of subterabit TDM signal by using ultrafast nonlinear optical loop mirror", Technical Report of the Institute of Electronics Information and Communication Engineers, C-I, issued from the Institute of Electronics Information and Communication Engineers, Vol. J82-C-1, pp. 109-116, March 1999.
Non-Patent Document 5: Govind P. Agrawal, "NONLINEAR FIBER OPTICS", Academic Press, ISBN: 0120451425, 2nd Edition, pp. 210-211, 1995.
Non-Patent Document 6: Stephen M. Jensen, "The Nonlinear Coherent Coupler", IEEE Journal of Quantum Electronics, Vol. QE-18, No. 10, October 1982.
Non-Patent Document 7: William S. Wong et al., "Self-switching of optical pulses in dispersion-imbalanced nonlinear loop mirrors", Optics Letters, Optical Society of America, Vol. 22, pp. 1150-1152, 1997.
Non-Patent Document 8: I. Y. Khrushchev et al., "High-quality laser diode pulse compression in dispersion-imbalanced loop mirror", Electronics Letters, Vol. 34, pp. 1009-1010, May 1998.
Non-Patent Document 9: K. R. Tamura et al., "Spectral-Smoothing and Pedestal Reduction of Wavelength Tunable Quasi-Adiabatically Compressed Femtosecond Solitons Using a Dispersion-Flattened Dispersion-Imbalanced Loop Mirror", IEEE Photonics Technology Letters, Vol. 11, pp. 230-232, February 1999.
Non-Patent Document 10: K.J. Blow et al., "Demonstration of the nonlinear fiber loop mirror as an ultrafast all-optical demultiplexer", Electronics Letters, Vol. 26, pp. 962-964, 1990.

DISCLOSURE OF INVENTION

Problems to be Solved by the Invention

In the above mentioned prior art examples, the electric circuits are employed as encoding circuits. Accordingly, there is a limit due to the response speed of the semiconductor device, and therefore, it is impossible to perform processing at a high speed such as an order of THz, In addition, although the patent document 1 discloses an optical A/D conversion device using a nonlinear Fabry-Perot resonator, the optical A/D conversion device only converts the optical analog signal into the binary optical digital signal, and the patent document 1 does not disclose any optical circuit for encoding.

Namely, there has been such a problem in the prior art that an optical analog-to-digital converter has not been developed and practically used for converting the optical analog signal into the optical digital signal, which is capable of performing the encoding and quantization processings on the optical signal, and capable of performing the high-speed processing at a frequency of an order of THz or higher.

An object of the present invention is to provide a method and a device for optical signal processing for use in a method and a device for optical A/D conversion, which are capable of solving the above-mentioned problems, encoding and quantization processings on an optical signal, and performing a high-speed processing at a frequency of an order of THz or higher, while having a simple configuration.

In addition, another object of the present invention is to provide a method and a device for optical signal processing, a nonlinear optical loop mirror, and a designing method thereof and an optical signal conversion method for use in, for example, optical fiber communication systems and for use for a method and a device for optical analog-to-digital conversion for converting an optical analog signal into an optical digital signal.

Means for Solving the Problems

According to the first aspect of the present invention, there is provided an optical signal processing method including the steps of performing predetermined signal processing on a pulse train of signal light having a first wavelength according to control light having a pulse train having a second wavelength different from the first wavelength, by using an optical signal processor including an optical nonlinear device having an input-to-output characteristic with predetermined periodicity with respect to light intensity, and outputting a resultant signal light.

According to the second aspect of the present invention, there is provided an optical signal processing method including the steps of performing predetermined optical logic operation processing on a pulse train of signal light having a first wavelength, by making use of one of (a) a plurality of control lights each having a pulse train having a second wavelength different from the first wavelength and (b) control light having a pulse train having a plurality of wavelengths different from the first wavelength, by using an optical signal processor including an optical nonlinear device having an input-to-output characteristic with periodicity corresponding to a predetermined optical logic operation with respect to light intensity, and outputting a resultant signal light.

In the above mentioned optical signal processing method, the optical encoder preferably includes a first optical nonlinear device and has a first input end for inputting the pulse train of the signal light, a second input end for inputting the pulse train of the control light, and an output end for outputting a pulse train of optically-encoded signal light.

According to the third aspect of the present invention, there is provided an optical signal processing method including the steps of optically encoding a pulse train of signal light having a first wavelength according to control light which has a second wavelength different from the first wavelength and a pulse train of an optically sampled optical analog signal, by using a plurality of optical encoders each of which includes optical nonlinear devices having input-to-output characteristics with different periodicities with respect to light intensity, respectively, and outputting a plurality of pulse trains of optically-encoded signal light from the respective optical encoders.

In the above mentioned optical signal processing method, the optical encoders are preferably "N" optical encoders each having an input-to-output characteristic with a period of T×2$^{(N-2)}$, where "N" is a natural number (N=1, 2, 3 . . . ) indicating a quantifying bit number.

According to the fourth aspect of the present invention, there is provided an optical signal processing method including the steps of decoding a pulse train of a multi-level optical signal having a first wavelength into a plurality of binary optical signals according to control light having a pulse train having a second wavelength different from the first wavelength, by using a plurality of optical signal processors including optical nonlinear devices having input-to-output characteristics with different periodicities with respect to light intensity, and outputting the binary optical signals.

In the above mentioned optical signal processing method, each of the optical encoders preferably includes a first optical nonlinear device and has a first input end for inputting the pulse train of the signal light, a second input end for inputting the pulse train of the control light, and an output end for outputting a pulse train of optically-encoded signal light.

In addition, in the above mentioned optical signal processing method, the first optical nonlinear device is preferably a nonlinear optical loop mirror. In the other case, the first optical nonlinear device is preferably a Kerr shutter which utilizes an optical Kerr effect of a nonlinear optical effect. Instead, the first optical nonlinear device is preferably a waveguide-type Mach-Zehnder interferometer.

According to the fifth aspect of the present invention, there is provided an optical signal processing device including a signal processing device for performing predetermined signal processing on a pulse train of signal light having a first wavelength according to control light having a pulse train having a second wavelength different from the first wavelength, by using an optical signal processor including an optical nonlinear device having an input-to-output characteristic with predetermined periodicity with respect to light intensity, and for outputting a resultant signal light.

According to the sixth aspect of the present invention, there is provided an optical signal processing device including an operating device for performing predetermined optical logic operation processing on a pulse train of signal light having a first wavelength, by making use of one of (a) a plurality of control lights each having a pulse train having a second wavelength different from the first wavelength and (b) control light having a pulse train having a plurality of wavelengths different from the first wavelength, by using an optical signal processor including an optical nonlinear device having an input-to-output characteristic with periodicity corresponding to a predetermined optical logic operation with respect to light intensity, and for outputting a resultant signal light.

In the above mentioned optical signal processing device, the optical encoder preferably includes a first optical nonlinear device and has a first input end for inputting the pulse train of the signal light, a second input end for inputting the pulse train of the control light, and an output end for outputting a pulse train of optically-encoded signal light.

According to the seventh aspect of the present invention, there is provided an optical signal processing device including an optical encoding device for optically encoding a pulse train of signal light having a first wavelength according to control light which has a second wavelength different from the first wavelength and a pulse train of an optically sampled optical analog signal, by using a plurality of optical encoders each of which includes optical nonlinear devices having input-to-output characteristics with different periodicities with respect to light intensity, respectively, and for outputting a plurality of pulse trains of optically-encoded signal light from the respective optical encoders.

In the above mentioned optical signal processing device, the optical encoders are preferably "N" optical encoders each having an input-to-output characteristic with a period of T×2$^{(N-2)}$, where "N" is a natural number (N=1, 2, 3 . . . ) indicating a quantifying bit number.

According to the eighth aspect of the present invention, there is provided an optical signal processing device a including multi-level decoding device for decoding a pulse train of a multi-level optical signal having a first wavelength into a plurality of binary optical signals according to control light having a pulse train having a second wavelength different from the first wavelength, by using a plurality of optical signal processors including optical nonlinear devices having input-to-output characteristics with different periodicities with respect to light intensity, and for outputting the binary optical signals.

In the above mentioned optical signal processing method, each of the optical encoders preferably includes a first optical nonlinear device and has a first input end for inputting the pulse train of the signal light, a second input end for inputting the pulse train of the control light, and an output end for outputting a pulse train of optically-encoded signal light.

In addition, in the above mentioned optical signal processing method, the first optical nonlinear device is preferably a nonlinear optical loop mirror. In the other case, the first optical nonlinear device is preferably a Kerr shutter which utilizes an optical Kerr effect of a nonlinear optical effect. Instead, the first optical nonlinear device is preferably a waveguide-type Mach-Zehnder interferometer.

According to the ninth aspect of the present invention, there is provided an optical signal processing method for optically analog-to-digital-converting an optically sampled optical analog signal into an optical digital signal. The method includes an optically encoding step and an optically quantizing step. The optically encoding step optically encodes a pulse train of signal light having a first wavelength according to control light which has a second wavelength different from the first wavelength and has a pulse train of an optically sampled optical analog signal, by using a plurality of optical encoders each including optical nonlinear devices having input-to-output characteristics with different periodicities with respect to the light intensity, and outputs a plurality of pulse trains of optically-encoded signal light from the respective optical encoders. The optically quantizing step performs optical threshold processing on the pulse trains of optically-encoded signal light to optically quantize the pulse trains of optically-encoded signal light, by using at least one of optical threshold processors each of which is connected to each of the optical encoders and includes a nonlinear optical device having a nonlinear input-to-output characteristic with respect to light intensity, and outputs optically quantized pulse trains as optical digital signals.

The above mentioned optical signal processing method preferably further includes the steps of optically sampling an optical analog signal at a predetermined sampling frequency, and outputting an optically sampled optical analog signal, prior to the optically encoding step.

In addition, in the above mentioned optical signal processing method, the optical encoders are preferably "N" optical encoders each having an input-to-output characteristic with a period of $T \times 2^{(N-2)}$, where "N" is a natural number (N=1, 2, 3 . . . ) indicating a quantifying bit number.

Further, in the above mentioned optical signal processing method, the optically encoding step preferably includes a step of optically quantizing each of the pulse trains of optically-encoded signal light, by using one of a single optical threshold processor and a plurality of optical threshold processors connected in cascade to each other for optically quantizing a pulse train of inputted signal light.

Still further, in the above mentioned optical signal processing method, each of the optical encoders preferably includes a first optical nonlinear device and has a first input end for inputting the pulse train of the signal light, a second input end for inputting the pulse train of the control light, and an output end for outputting a pulse train of optically-encoded signal light.

In addition, in the above mentioned optical signal processing method, each of the optical threshold processors preferably includes a second optical nonlinear device and has a first input end for inputting one of continuous light of predetermined carrier wave light and a pulse train of the predetermined carrier wave light, a second input end for inputting the pulse train of optically encoded signal light, and an output end for outputting the optically-quantized pulse train.

Further, in the above mentioned optical signal processing method, each of the optical threshold processors preferably includes a second optical nonlinear device and has an input end for inputting one of continuous light of predetermined carrier wave light and a pulse train of the predetermined carrier wave light, and an output end for outputting the optically-quantized pulse train.

Still further, in the above mentioned optical signal processing method, the first optical nonlinear device is preferably a nonlinear optical loop mirror. In the other case, the first optical nonlinear device is preferably a Kerr shutter which utilizes an optical Kerr effect of a nonlinear optical effect. Instead, the first optical nonlinear device is preferably a waveguide-type Mach-Zehnder interferometer.

Still further, in the above mentioned optical signal processing method, the second optical nonlinear device is preferably a nonlinear optical loop mirror. In the other case, the second optical nonlinear device is preferably a Kerr shutter which utilizes an optical Kerr effect of a nonlinear optical effect. Instead, the second optical nonlinear device is preferably a waveguide-type Mach-Zehnder interferometer.

According to the tenth aspect of the present invention, there is provided an optical signal processing device for optically analog-to-digital-converting an optically sampled optical analog signal into an optical digital signal. The device includes an optically encoding device and an optically quantizing device. The optically encoding device optically encodes a pulse train of signal light having a first wavelength according to control light which has a second wavelength different from the first wavelength and has a pulse train of an optically sampled optical analog signal, by using a plurality of optical encoders each including optical nonlinear devices having input-to-output characteristics with different periodicities with respect to the light intensity, and outputs a plurality of pulse trains of optically-encoded signal light from the respective optical encoders. The optically quantizing device performs optical threshold processing on the pulse trains of optically-encoded signal light to optically quantize the pulse trains of optically-encoded signal light, by using at least one of optical threshold processors each of which is connected to each of the optical encoders and includes a nonlinear optical device having a nonlinear input-to-output characteristic with respect to light intensity, and outputs optically quantized pulse trains as optical digital signals.

The above mentioned optical signal processing device preferably further includes an optically sampling device for optically sampling an optical analog signal at a predetermined sampling frequency, and for outputting an optically sampled optical analog signal, at the previous stage of the optically encoding device.

In addition, in the above mentioned optical signal processing device, the optical encoders are preferably "N" optical encoders each having an input-to-output characteristic with a period of $T \times 2^{(N-2)}$, where "N" is a natural number (N=1, 2, 3 . . . ) indicating a quantifying bit number.

Further, in the above mentioned optical signal processing device, the optically encoding step preferably includes a step of optically quantizing each of the pulse trains of optically-encoded signal light, by using one of a single optical threshold processor and a plurality of optical threshold processors connected in cascade to each other for optically quantizing a pulse train of inputted signal light.

Still further, in the above mentioned optical signal processing device, each of the optical encoders preferably includes a first optical nonlinear device and has a first input end for inputting the pulse train of the signal light, a second input end for inputting the pulse train of the control light, and an output end for outputting a pulse train of optically-encoded signal light.

In addition, in the above mentioned optical signal processing device, each of the optical threshold processors preferably includes a second optical nonlinear device and has a first input end for inputting one of continuous light of predetermined carrier wave light and a pulse train of the predetermined carrier wave light, a second input end for inputting the pulse train of optically encoded signal light, and an output end for outputting the optically-quantized pulse train.

Further, in the above mentioned optical signal processing device, each of the optical threshold processors preferably includes a second optical nonlinear device and has an input end for inputting one of continuous light of predetermined carrier wave light and a pulse train of the predetermined carrier wave light, and an output end for outputting the optically-quantized pulse train.

Still further, in the above mentioned optical signal processing device, the first optical nonlinear device is preferably a nonlinear optical loop mirror. In the other case, the first optical nonlinear device is preferably a Kerr shutter which utilizes an optical Kerr effect of a nonlinear optical effect. Instead, the first optical nonlinear device is preferably a waveguide-type Mach-Zehnder interferometer.

Still further, in the above mentioned optical signal processing device, the second optical nonlinear device is preferably a nonlinear optical loop mirror. In the other case, the second optical nonlinear device is preferably a Kerr shutter which utilizes an optical Kerr effect of a nonlinear optical effect. Instead, the second optical nonlinear device is preferably a waveguide-type Mach-Zehnder interferometer.

According to the eleventh aspect of the present invention, there is provided a nonlinear optical loop mirror including an optical fiber, a photo-coupler, a control-light input device for inputting a control light signal to the optical fiber, and a nonlinear medium placed on an optical path of the optical fiber. The photo-coupler is connected so as to branch an input optical signal inputted from an optical-signal input end into two optical signals and to output the optical signals to both ends of the optical fiber and connected so as to branch and output optical signals outputted from the both ends of the optical fiber to the optical-signal input end and an optical-signal output end, respectively. The nonlinear optical loop mirror adjusts a phase difference between optical signals inputted to the both ends of the optical fibers according to power of the control light signal so as to control power of the output optical signal outputted from the optical-signal output end. The nonlinear optical loop mirror suppresses a parametric gain caused among the respective branched optical signals and the control light signal, so that a ratio of the power of the output optical signal to the maximum value thereof becomes equal to or smaller than a predetermined threshold value when a difference between phase shifts caused to the respective branched optical signals is set to $2n\pi$ (where "n" is an integer equal to or larger than 1), where the phase shifts are caused by cross-phase modulation (XPM) generated among the respective branched optical signals and the control light signal.

In the above mentioned nonlinear optical loop mirror, a relationship of G<2Tth+1 is preferably set to be satisfied, where "G" is a ratio of amplification of the optical signal propagating in the same direction as that of the control light signal, where the amplification is caused by the parametric gain, and "Tth" is a ratio of the predetermined threshold value to the maximum value of the output optical signal.

In addition, in the above mentioned nonlinear optical loop mirror, one of the input optical signal and the control light signal is preferably inputted after passing through an optical delay line, so that pulses of the optical signals and pulses of the control light signal are superimposed on each other over a predetermined range of the nonlinear medium.

Further, in the above mentioned nonlinear optical loop mirror, polarization states of the optical signals and the control light signal are preferably substantially identical to each other in the optical fiber and the nonlinear medium.

Still further, in the above mentioned nonlinear optical loop mirror, the predetermined threshold value is preferably a threshold value required for quantization and encoding processings for optical analog-to-digital conversion.

In addition, in the above mentioned nonlinear optical loop mirror, the predetermined threshold value is preferably 3 dB.

Further, in the above mentioned nonlinear optical loop mirror, one of the following conditions is preferably set to be satisfied:
  (a) a dispersion value of the nonlinear medium is equal to or smaller than the minimum dispersion value of dispersion values when the parametric gain caused among the optical signals and the control light signal is equal to or larger than a predetermined value; and
  (b) a dispersion value of the nonlinear medium is equal to or larger than the maximum dispersion value of dispersion values when the parametric gain caused among the optical signals and the control light signal is equal to or larger than a predetermined value.

Still further, in the above mentioned nonlinear optical loop mirror, a wavelength difference between the control light signal and the input optical signal is preferably larger than the maximum wavelength difference which cause a parametric gain equal to or larger than a predetermined value among the optical signals and the control light signal.

In addition, in the above mentioned nonlinear optical loop mirror, an absolute value of a product of a wavelength difference between the control light signal and the optical signals, and a dispersion value of the nonlinear medium is preferably equal to or smaller than a value which suppress walk-off and set a phase shift difference between the branched optical signals due to cross-phase modulation (XPM) caused among the respective optical signals and the control light signal to be equal to or larger than $2\pi$.

Further, in the above mentioned nonlinear optical loop mirror, a power value of the output optical signal is preferably processed as "0" in an optical analog-to-digital conversion processing when a difference between phase shifts caused to the respective branched optical signals is $2n\pi$ (where "n" is an integer equal to or larger than 1), where the phase shifts are generated by cross-phase modulation (XPM) caused among the respective branched optical signals and the control light signal.

Still further, in the above mentioned nonlinear optical loop mirror, a dispersion characteristic of the nonlinear medium preferably has a normal dispersion characteristic, at a wavelength of the control light signal.

Still further, in the above mentioned nonlinear optical loop mirror, a dispersion characteristic of the nonlinear medium preferably has an anomalous dispersion characteristic, at a wavelength of the control light signal.

In addition, in the above mentioned nonlinear optical loop mirror, a relationship of $\lambda_O > \lambda_S > \lambda_C$ preferably holds when a dispersion value "D" of the nonlinear medium differentiated with respect to a wavelength $\lambda$ is positive ($dD/d\lambda > 0$), at wavelengths of the input optical signal and the control light signal.

Further, in the above mentioned nonlinear optical loop mirror, a relationship of $\lambda_O < \lambda_S < \lambda_C$ preferably holds when a dispersion value "D" of the nonlinear medium differentiated with respect to a wavelength $\lambda$ is negative ($dD/d\lambda < 0$), at wavelengths of the input optical signal and the control light signal.

According to the twelfth aspect of the present invention, there is provided a nonlinear optical loop mirror including an optical fiber, a photo-coupler, a control-light input device for inputting a control light signal to the optical fiber, and a nonlinear medium placed on an optical path of the optical fiber. The photo-coupler is connected so as to branch an input optical signal inputted from an optical-signal input end into two optical signals and to output the optical signals to both ends of the optical fiber and connected so as to branch and output optical signals outputted from the both ends of the optical fiber to the optical-signal input end and an optical-signal output end. The nonlinear optical loop mirror adjusts a phase difference between optical signals inputted to the both ends of the optical fibers according to power of the control light signal so as to control power of the output optical signal outputted from the optical-signal output end. A dispersion characteristic of the nonlinear medium has a normal dispersion characteristic, at a wavelength of the control light signal.

In the above mentioned nonlinear optical loop mirror, one of the following conditions is preferably set to be satisfied:
(a) a dispersion value of the nonlinear medium at a wavelength of the control light signal is equal to or smaller than −0.62 ps/nm/km and a wavelength difference between the input signal light and the control light is equal to or larger than 16 nm; and
(b) a dispersion value of the nonlinear medium at a wavelength of the control light signal is equal to or smaller than −0.315 ps/nm/km and a wavelength difference between the input signal light and the control light is equal to or larger than 20 nm.

In addition, in the above mentioned nonlinear optical loop mirror, polarization states of the optical signals and the control light signal are preferably substantially identical to each other in the optical fiber and the nonlinear medium.

According to the thirteenth aspect of the present invention, there is provided a nonlinear optical loop mirror including an optical fiber, a photo-coupler, a control-light input device for inputting a control light signal to the optical fiber, and a nonlinear medium placed on an optical path of the optical fiber. The photo-coupler is connected so as to branch an input optical signal inputted from an optical-signal input end into two optical signals and to output the optical signals to both ends of the optical fiber and connected so as to branch and output optical signals outputted from the both ends of the optical fiber to the optical-signal input end and an optical-signal output end. The nonlinear optical loop mirror adjusts a phase difference between optical signals inputted to the both ends of the optical fibers according to power of the control light signal so as to control power of the output optical signal outputted from the optical-signal output end. A difference between phase shifts caused to the respective optical signals, due to cross-phase modulation (XPM) caused between the respective optical signals and the control light signal, is equal to or larger than $2\pi$.

In the above mentioned nonlinear optical loop mirror, the nonlinear medium preferably has a normal dispersion characteristic, at a wavelength of the control light signal.

In addition, in the above mentioned nonlinear optical loop mirror, the nonlinear optical loop mirror preferably suppresses a parametric gain caused among the respective branched optical signals and the control light signal, so that a ratio of the power of the output optical signal to the maximum value thereof becomes equal to or smaller than a threshold value for optical analog-to-digital conversion when a difference between phase shifts caused to the respective branched optical signals is set to $2n\pi$ (where "n" is an integer equal to or larger than 1), where the phase shifts are caused by cross-phase modulation (XPM) generated among the respective branched optical signals and the control light signal.

Further, in the above mentioned nonlinear optical loop mirror, polarization states of the optical signals and the control light signal are preferably substantially identical to each other in the optical fiber and the nonlinear medium.

According to the fourteenth aspect of the present invention, there is provided a method for designing a nonlinear optical loop mirror including an optical fiber, a photo-coupler, a control-light input device for inputting a control light signal to the optical fiber, and a nonlinear medium placed on an optical path of the optical fiber. The photo-coupler is connected so as to branch an input optical signal inputted from an optical-signal input end into two optical signals and to output the optical signals to both ends of the optical fiber and connected so as to branch and output optical signals outputted from the both ends of the optical fiber to the optical-signal input end and an optical-signal output end. The nonlinear optical loop mirror adjusts a phase difference between optical signals inputted to the both ends of the optical fibers according to power of the control light signal so as to control power of the output optical signal outputted from the optical-signal output end. The method includes first, second, third, fourth, and fifth steps. The first step determines a transfer function and a period ($\phi_{max}$) of the transfer function, the transfer function being expressed as a relationship of power of an input optical signal with respect to power of an output optical signal. The second step determines a threshold value of the output optical signal suitable for optical signal processing. The third step provisionally determines a nonlinearity constant and a dispersion characteristic of said nonlinear medium, and a wavelength and a peak power of the control light signal. The fourth step judges whether or not a phase shift reaches the period $\phi_{max}$, and proceeds to the fifth step when the phase shift reaches the period $\phi_{max}$, while returns to the third step when the phase shift does not reach the period $\phi_{max}$. The fifth step judges whether or not a relationship of G<2Tth+1 is satisfied, where "G" is a ratio of amplification of the optical signal propagating in the same direction as that of the control light signal, where the amplification is caused by the parametric gain, and "Tth" is a ratio of the predetermined threshold value to the maximum value of the output optical signal, and sets the nonlinearity coefficient and the dispersion characteristic of the nonlinear medium and the wavelength and the peak power of the control light signal which have been provisionally determined to a designing determined value when the relationship is satisfied, while returns to the third step when the relationship is not satisfied.

According to the fifteenth aspect of the present invention, there is provided an optical signal conversion method including the steps of branching an input optical signal into two optical signals (A) and (B), propagating the optical signal (A) in the same direction as that of a control light signal having a different wavelength so as to cause cross-phase modulation, and changing a phase shift difference between the optical signals (A) and (B) periodically with respect to change in power of the control light signal so as to change power of output optical signal resulted from interference between the optical signals (A) and (B). The method includes the steps of suppressing a parametric gain caused between the optical signal (A) and the control light signal, so that the power of the output optical signal when the phase shift difference is $2n\pi$ (where "n" is an integer equal to or larger than 1) is equal to or smaller than a threshold value for quantization and encoding processings for optical analog-to-digital conversion, with respect to the maximum value of the power of the output optical signal.

EFFECTS OF THE INVENTION

The optical signal processing method and device according to the present invention performs predetermined signal processing on a pulse train of signal light having a first wavelength, according to control light having a pulse train having a second wavelength different from the first wavelength, by using an optical signal processor including an optical nonlinear device having predetermined periodicity in the input-to-output characteristic with respect to the light intensity. Accordingly, it is possible to realize optical signal processing such as optical logic operations, optical encoding processing and multi-level decoding processing, with a simple configuration, and it is possible to realize speeding-up as compared with the prior art.

In addition, with the optical signal processing method and device according to the present invention, the sampled optical analog signal can be optically A/D-converted into the optical digital signal, and the upper limit of the sampling frequency can be set to an order of several GHz to several THz in principle. Assuming that the limit of the sampling frequency of the A/D conversion for the electric circuit is several tens of GHz, it is possible to realize speeding-up by about two orders of magnitude. In addition, since the inputting and outputting are performed with optical signals, the optical signal processing method and device according to the present invention are suitably applied to the optical networks.

Further, a nonlinear optical loop mirror having a transfer function as shown in FIG. 40 can be realized by making a design which is characterized to cause the gain that signal light propagating in the same direction as that of control light receives from parametric processing caused by the control light in an optical fiber in the nonlinear optical loop mirror according to the present invention to be suppressed to be equal to or smaller than a permissible value determined with respect to a set threshold value.

BRIEF DESCRIPTION OF DRAWINGS

FIG. 54 is a table showing an exemplary code allocation for the decoding device of FIG. 53.

FIG. 56 is a table showing an exemplary code allocation for the decoding device of FIG. 55.

DESCRIPTION OF NUMERICAL REFERENCES

Figure 1:
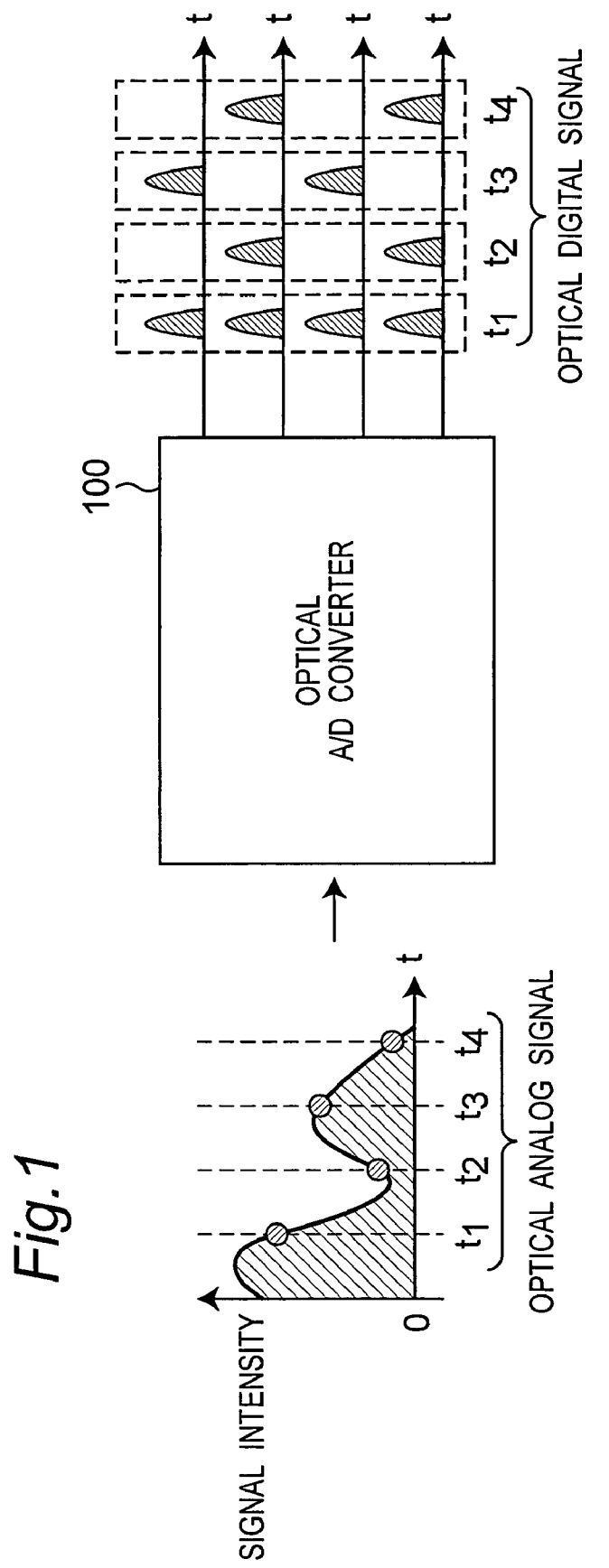
FIG. 1 is a block diagram and a timing chart showing operation of an optical A/D converter 100 according to a first preferred embodiment of the present invention.

10 . . . nonlinear optical loop mirror,
10A . . . polarization controller,
11 and 12 . . . photo-couplers,
13 . . . optical isolator,
14 and 14A . . . optical band-pass filters,
15 . . . optical delay circuit,
15A . . . variable optical delay circuit,
16 . . . optical isolator,
16A . . . optical circulator,
17 . . . optical amplifier,
18 . . . optical isolator,
19 . . . optical fiber cable,
19A . . . polarization controller,
20 . . . nonlinear optical loop mirror,
20A . . . polarization controller,
20B . . . optical attenuator,
21 and 22 . . . photo-couplers,
23 . . . optical isolator,
24 . . . optical band-pass filter,
25 . . . laser diode,
26 and 26A . . . optical isolators,
27 . . . optical amplifier,
28 . . . optical isolator,
29 . . . optical fiber cable,
30 . . . sampled signal generator,
31 . . . laser diode,
32 . . . optical isolator,
41 . . . optical sampling circuit,
42 . . . optical isolator,
50 . . . fiber ring laser,
51 and 52 . . . optical band-pass filters,
53 . . . optical modulator,
54 . . . data signal generator,
55, 56 and 57 . . . optical splitters,
61 and 62 . . . fiber ring lasers,
63 . . . optical delay circuit,
71, 72 and 73 . . . photo-couplers,
81 and 82 . . . optical waveguides,
91, 92 and 93 . . . photo-couplers,
94 . . . optical isolator,
95 . . . optical band-pass filter,
100 . . . optical A/D converter,
101 and 102 . . . optical fiber cables,
103 . . . dispersion-compensating optical fiber cable,
104 . . . optical band-pass filter,
105 . . . photo-coupler,
106 . . . polarization controller,
111 . . . high-birefringence optical fiber cable,
112 . . . polarizer,
200 and 200A . . . optical encoding circuits,
201, 202, 203, 201A, 202A and 203A . . . optical encoders,
300 and 300A . . . optical quantization circuits,
301, 302, 303, 311, 312, 313, 322, 323, 333, 301A, 302A and 303A . . . optical threshold processors,
400 . . . multi-level optical signal decoder,
401 and 402 . . . optical signal processors,
410 . . . photo-coupler,
411 and 412 . . . signal light pulse light sources,
421 . . . optical delay circuit,
422 . . . photo-coupler,
500 . . . nonlinear optical loop mirror (NOLM),
501 . . . optical fiber,
502 . . . photo-coupler,
504 . . . high-nonlinear fiber,
510 . . . optical signal input end,
511 and 512 . . . optical fiber ends,
513 . . . output end,
524 . . . control light input means,
530 . . . input signal light,
531 . . . control light,
532 and 533 . . . propagating lights,
534 . . . output signal light,
550 . . . nonlinear optical loop mirror (NOLM),
551 . . . optical fiber,
552 . . . 3 dB photo-coupler,
553 . . . 17 dB photo-coupler,
554 . . . high-nonlinear fiber (HNLF),
561 and 562 . . . terminals of 3 dB coupler,
571 . . . control light input end,
574 . . . WDM coupler,
580 . . . input end,
591 and 592 . . . polarization controllers,
593 . . . reflected-light photo-detection end,
595 . . . C/L-band WDM coupler,
597 . . . delay line,
598 . . . optical circulator,
600 . . . optical logic operation circuit,
601 and 601A . . . optical signal processors,
602 . . . photo-coupler,
603 . . . signal light pulse source,
611 and 612 . . . light sources,
612 and 622 . . . optical amplifiers,
613 . . . power meter,
623 . . . optical attenuator,
701 . . . laser light source,
702 . . . optical amplifier,
703 . . . polarization controller,
704 and 713 . . . photo-couplers,
705 . . . high-nonlinear optical fiber cable (HNLF),
706 . . . optical band-pass filter,
711 . . . laser light source,
712 and 716 . . . optical amplifiers,
715 . . . dispersion-compensating optical fiber cable (DCF),
717 . . . variable optical attenuator,
721 . . . optical amplifier,
722, 723, 724, 731 and 732 . . . photo-couplers,
725, 726 and 727 . . . optical delay circuits,
733 and 734 . . . optical attenuators.

17

BEST MODE FOR CARRYING OUT THE INVENTION

Preferred embodiments according the present invention will be described below with reference to the drawings. In the attached drawings, the same numerical references denote components similar to each other.

First Preferred Embodiment

FIG. 1 is a block diagram and a timing chart showing operation of an optical A/D converter 100 according to a first preferred embodiment of the present invention. The optical A/D converter 100 according to the present preferred embodiment performs sampling, encoding and quantization on an inputted optical analog signal, and outputs an optical digital signal. In FIG. 1, there is exemplified a case where the optical analog signal is A/D-converted into a 4-bit optical digital signal.

Figure 2:
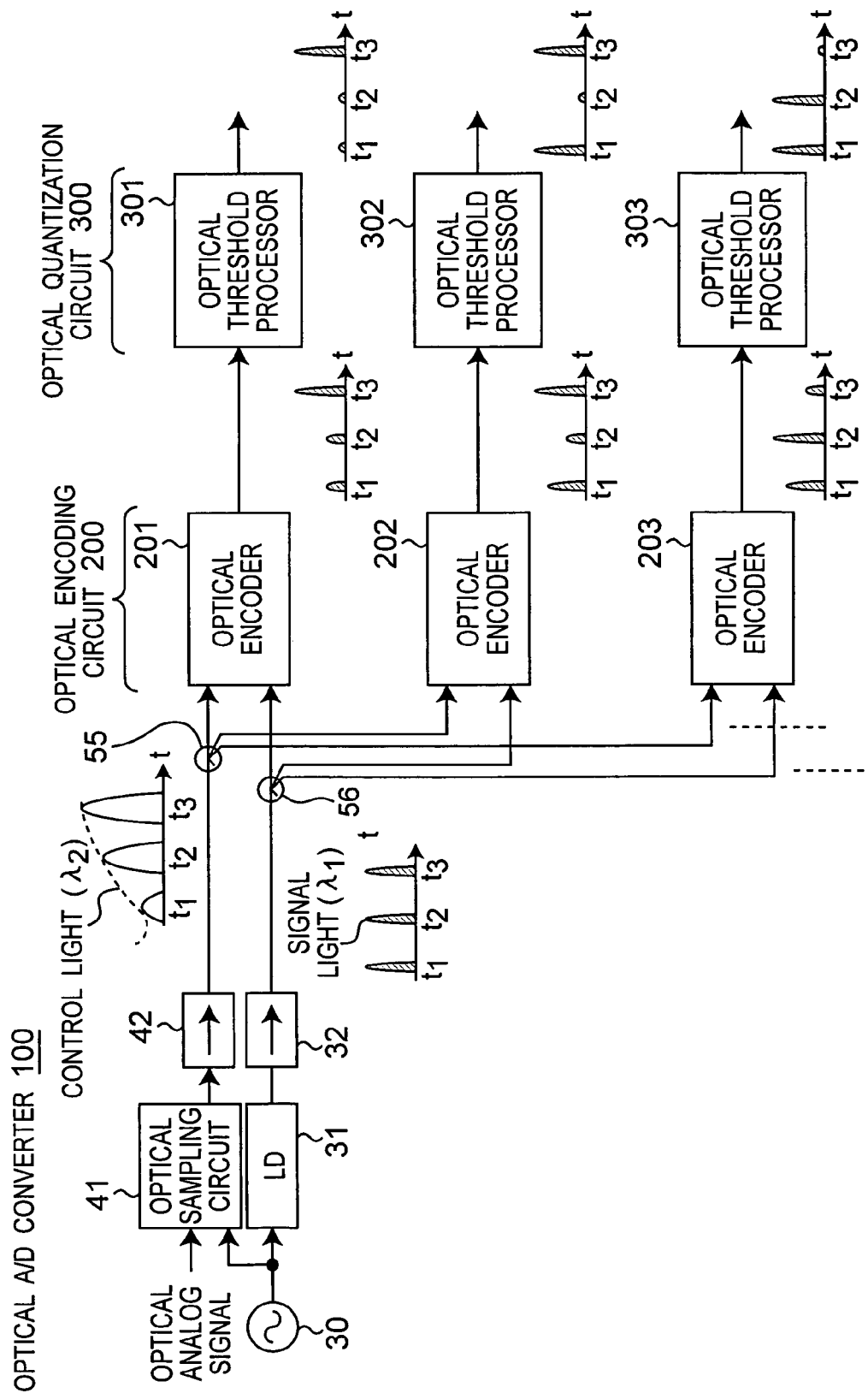
FIG. 2 is a block diagram showing a detailed configuration of the optical A/D converter 100 of FIG. 1.

FIG. 2 is a block diagram showing a detailed configuration of the optical A/D converter 100 of FIG. 1. Referring to FIG. 2, the optical A/D converter 100 is constructed by mainly including an optical sampling circuit 41, an optical encoding circuit 200, and an optical quantization circuit 300. In this case, the optical encoding circuit 200 includes a plurality of optical encoders 201, 202 and 203, and the optical quantization circuit 300 includes a plurality of optical threshold processors 301, 302 and 303.

A sampled signal generator 30 generates a sampled signal having a predetermined frequency, and outputs the sampled signal to a laser diode 31 and the optical sampling circuit 41. The laser diode 31 intermittently generates a train of pulses having a predetermined wavelength $\lambda_1$ and a constant signal level, at a period of an inputted sampled signal, and outputs the pulse train to an optical splitter 56 via an optical isolator 32. Next, the optical splitter 56 splits an inputted signal light into plural signal lights, and outputs split signal lights to the optical encoders 201, 202 and 203 of the optical encoding circuit 200, respectively. On the other hand, an inputted optical analog signal (having a wavelength of $\lambda_2$) to be subjected to optical A/D conversion is inputted to the optical sampling circuit 41. The optical sampling circuit 41 is a well-known circuit for, for example, optical time-division demultiplexing processing (See the non-patent document 4, for example), and samples the optical analog signal at the period of the above-mentioned inputted sampled signal so as to generate control light (having the wavelength of $\lambda_2$), which is resulted from the sampling of the optical analog signal, and outputs the control light to an optical splitter 55 via an optical isolator 42. Next, the optical splitter 55 splits an inputted control light into plural control lights, and outputs split signal lights to the optical encoders 201, 202 and 203 of the optical encoding circuit 200, respectively.

The respective optical encoders 201, 202 and 203 have period characteristics of the power level of output signal light with respect to the power level of inputted control light different from each other. Preferably, there is a relationship of power-of-two among their periods (for example, the optical encoder 201 has a period of "2T", the optical encoder 202 has a period of "T", and the optical encoder 203 has a period of "T/2", and this will be described later with reference to FIG. 5). The optical encoders 201, 202 and 203 encode the input signal light according to the control light, and output encoded signal light to the optical threshold processors 301, 302 and 303, respectively. Further, the respective optical threshold processors 301, 302 and 303 quantize inputted signal light into predetermined binary light digital signals, and output them (while the optical threshold processors perform 1-bit quantization and output binary optical digital signals in the present preferred embodiment, they may output multilevel optical signals), respectively.

Figure 3:
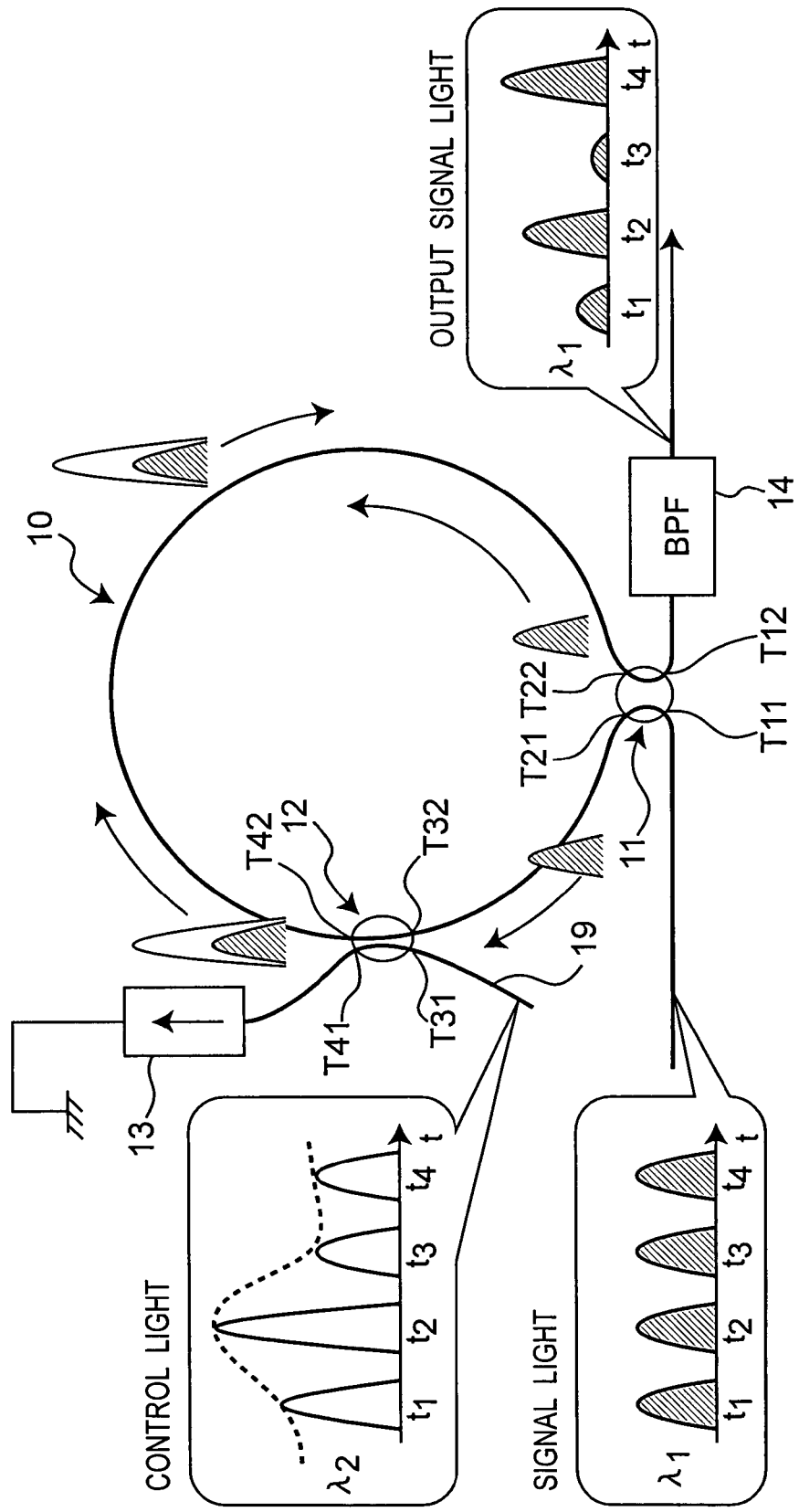
FIG. 3 is a block diagram showing a detailed configuration of an optical encoder 201 of FIG. 2.

FIG. 3 is a block diagram showing a detailed configuration of the optical encoder 201 of FIG. 2. Each of the other optical encoders 202 and 203 has the same configuration as that of the optical encoder 201. Referring to FIG. 3, the optical encoder 201 is constructed by including a nonlinear optical loop miller 10, two photo-couplers 11 and 12, an optical isolator 13, an optical band-pass filter 14, and an optical fiber cable 19.

In this case, in order to overcome the problem of walk-off caused by different group delays between the control light and the signal light, the nonlinear optical loop miller 10 is constituted by plural (at least two) dispersion high-nonlinear optical fiber cables which are connected in cascade to each another, which have group delay characteristics (or dispersion values) different from each other, and each of which has a predetermined length (See the non-patent documents 3 and 4, for example). The portions of the nonlinear optical loop mirror 10 near its one end and another end are placed proximally to each other so that the portions are optically coupled to each other, so as to form the photo-coupler 11. As shown in FIG. 3, the following terminals are defined in the photo-coupler 11:

(1) a terminal on the nonlinear optical loop mirror 10 at its one end side for inputting signal light is defined as T11;

(2) a terminal at another end side for outputting optically-encoded signal light is defined as T12;

(3) a terminal near the one end inside the loop is defined as T21; and (4) a terminal near another end inside the loop is defined as T22.

In addition, a further optical fiber cable 19 is arranged proximally to an optical fiber in the nonlinear optical loop mirror 10 near the terminal T21 of the photo-coupler 11 so that these optical fiber cables are optically coupled to each other, so as to form a photo-coupler 12 around their portions which are arranged proximally to each other. As shown in FIG. 3, the following terminals are defined in the photo-coupler 12:

(1) a terminal on the optical fiber cable 19 near its one end for inputting control light is defined as T31;

(2) a terminal on the nonlinear optical loop mirror 10 near the terminal T2 of the photo-coupler 11 is defined as T32;

(3) a terminal on the optical fiber cable 19 near another end is defined as T41; and (4) a terminal on the nonlinear optical loop mirror 10 closer to another end of the nonlinear optical loop mirror 10 (closer to the terminal T22) than the terminal T2 of the photo-coupler 11 is defined as T42.

Further, another end of the optical fiber cable 19 is terminated in a non-reflection manner via an optical isolator 13. Accordingly, the control light enters into the optical fiber cable 19 through the one end of the optical fiber cable 19, and passes through the photo-coupler 12. Then, one branched control light branched by the photo-coupler 12 is terminated in a non-reflection state via the optical isolator 13, and another branched control light is outputted to the loop in the nonlinear optical loop mirror 10 via the terminal T42 of the photo-coupler 12. In addition, the optical band-pass filter 14 for passing therethrough only component of a wavelength of $\lambda_1$ included in the signal light is connected to another end at the terminal T12 side of the nonlinear optical loop mirror 10.

In the case where the branching ratio of the photo-coupler 11 (for example, the branching ratio for branching an optical signal inputted from the terminal 11 into the terminal T21 and the terminal T22) is set to 1:1 in the nonlinear optical loop mirror 10 constructed as mentioned above, the signal light incident to the terminal T11 is totally reflected toward the input terminal side. In the present preferred embodiment, it is necessary that the incident signal light is transmitted to the output terminal side. Accordingly, a phase shift is caused only in the clockwise direction in which control-light pulses propagate in the nonlinear optical loop mirror 10, so as to change a phase difference between the optical signals propagating in the clockwise direction and in the counter-clockwise direction, and due to this, reflection or transmission of the inputted signal light can be selected. This operational characteristic is utilized for the threshold value processing and the switching in the optical encoders and the optical threshold processors.

In the present preferred embodiment, by using an XPM (Cross Phase Modulation) between the signal light and the control light, the phase difference is caused between the pulses propagating in the clockwise direction and the pulses propagating in the counter-clockwise direction in the loop of the nonlinear optical loop mirror 10, so as to change the output level of the signal light according to the signal level of the control light. Namely, in the propagation of an optical signal propagating in the clockwise direction in the nonlinear optical loop mirror 10, in assuming that the signal light has an electric field of $E_1$ and the control light has an electric field of $E_2$, the electric field $E_1$ receives a phase change $\phi_{1R}^{NL}$ as it propagates through an optical fiber cable having a length of L, due to the nonlinearity, and the phase change $\phi_{1R}^{NL}$ is expressed by the following equation.

[Equation 1]

$$\phi_{1R}^{NL} = \gamma L [|E_1|^2 + 2|E_2|^2] \qquad (1).$$

In this case, $\omega_1$ is an angular frequency of the electric field $E_1$, and expressed by the following equation using a coefficient $\gamma$ indicating the nonlinearity.

[Equation 2]

$$\gamma = (\omega_1 n_2)/(c A_{\mathit{eff}}) \qquad (2).$$

In this case, "c" is a velocity of light in a vacuum, $A_{\mathit{eff}}$ is an effective core cross-sectional area of the fiber, and $n_2$ is a nonlinear refractive index coefficient. In addition, it is assumed that the planes of polarization of $E_1$ and $E_2$ are identical to each other. Further, in the propagation in the counter-clockwise direction in the nonlinear optical loop mirror 10, in assuming that the signal light has the electric field of $E_1$, the signal light receives a phase change $\phi_{1L}^{NL}$ as it propagates through the optical fiber cable having the length of "L", and the phase change $\phi_{1L}^{NL}$ is expressed by the following equation.

[Equation 3]

$$\phi_{1L}^{NL} = \gamma L |E_1|^2 \qquad (3).$$

In this case, a phase difference $\Delta\phi_1^{NL}$ caused between the signal lights propagating in the clockwise direction and the counter-clockwise direction is expressed by the following equation.

[Equation 4]

$$\Delta\phi_{1R}^{NL} = 2\gamma |E_2|^2 L \qquad (4).$$

Figure 4:
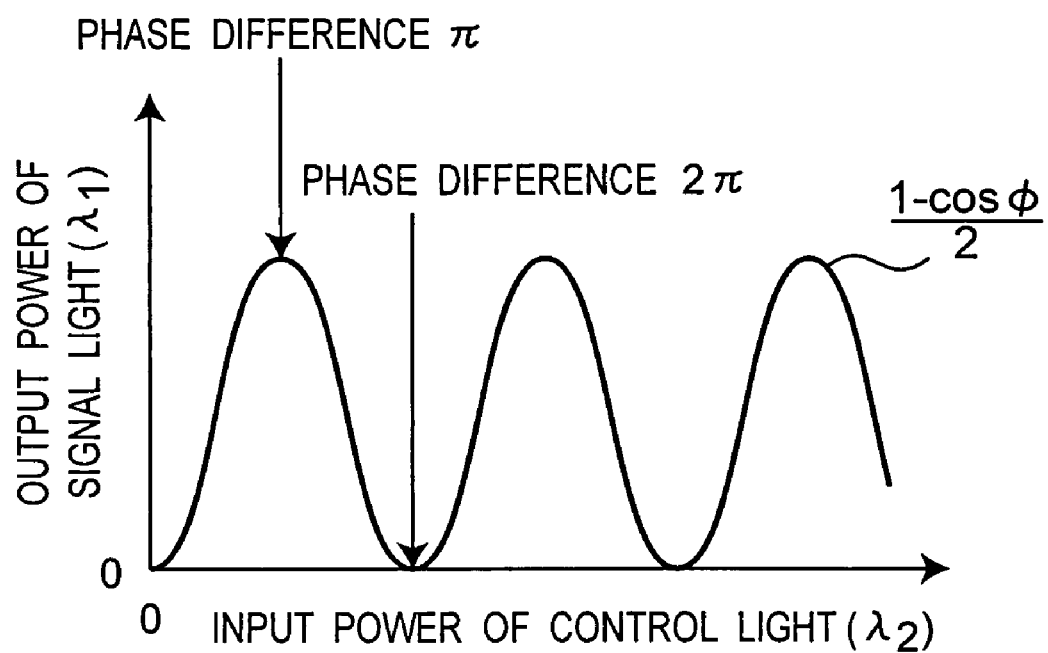
FIG. 4 is a graph showing a relationship between output power of signal light ($\lambda_1$) with respect to input power of control light ($\lambda_2$), showing an operation of an optical encoder 201 of FIG. 3.

Due to the phase difference, the signal lights propagating in the clockwise direction and the counter-clockwise direction interfere with each other. Since the phase difference is proportional to the intensity of the pulse train of the control light, the output signal light from the nonlinear optical loop mirror 10 of the pulse train of the signal light exhibits a periodic characteristic with respect to the input power of the control light, as shown in FIG. 4.

Further, in order to utilize a multi-period characteristic, it is necessary that the control light has larger power. In order to attain this, the nonlinear optical loop mirror 10 can be formed by, for example, an optical fiber cable having a higher nonlinearity. In addition, it can be considered that the nonlinear optical loop mirror 10 preferably has a possible largest loop length, since the intensity of the control light can be decreased with increasing the loop length of the nonlinear optical loop mirror 10, but it is necessary to reduce the group-delay difference as much as possible.

Figure 5:
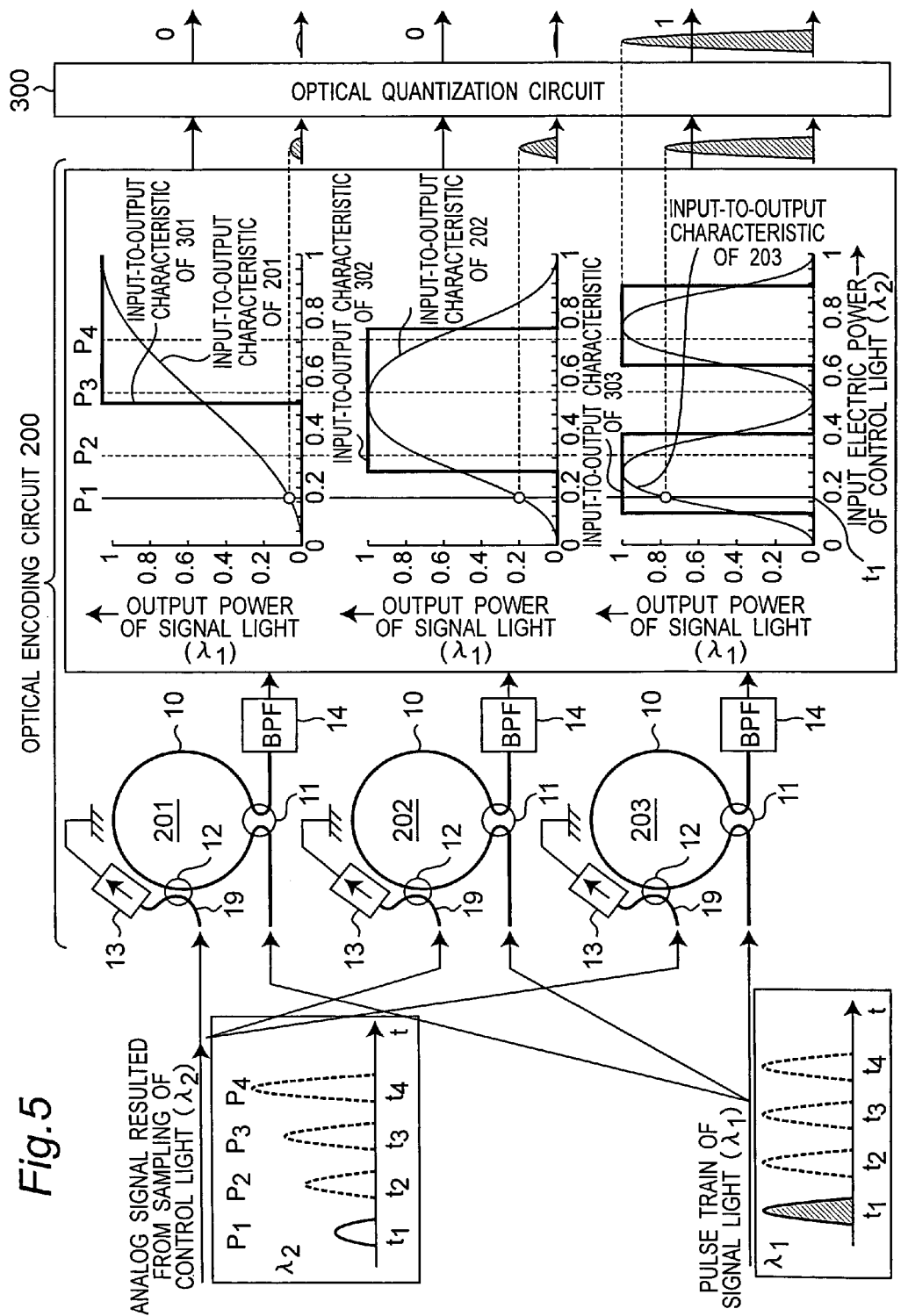
FIG. 5 is graphs and a block diagram showing an exemplary operation of an optical encoding circuit 200 of FIG. 3.

FIG. 5 is graphs and a block diagram showing an exemplary operation of the optical encoding circuit 200 of FIG. 3. In FIG. 5, the respective optical encoders 201, 202 and 203 have period characteristics of the power level of output signal light with respect to the power level of input control light different from each other, respectively. In particular, there is shown such a case where there is the relationship of power-of-two among their periods, the optical encoder 201 has a period of "2T", the optical encoder 202 has a period of "T", and the optical encoder 203 has a period of "T/2". In the exemplary operation of FIG. 5, the signal light inputted at a timing $t_1$ is encoded by the optical encoders 201, 202 and 203, then quantized by the optical threshold processors 301, 302 and 303 (this will be described in detail later), and is outputted as an optical digital signal indicative of a 3-bit codes of "001". Further, in order to obtain an optical digital signal indicative of N-bit codes, it is necessary to provide "N" optical encoders each having an input-to-output characteristic with a period of $T \times 2^{(N-2)}$ with respect to the light intensity. In this case, "N" is a natural number indicating a quantifying bit number.

Figure 6:
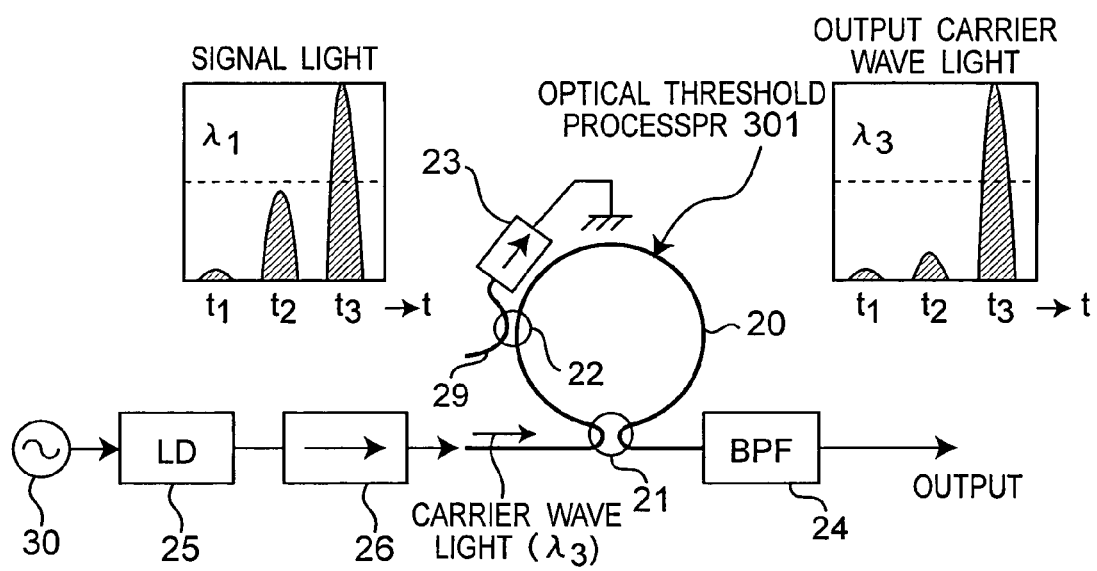
FIG. 6 is a block diagram and graphs showing a detailed configuration and an operation of an optical threshold processor 301 of FIG. 2.

FIG. 6 is a block diagram and graphs showing a detailed configuration and an operation of the optical threshold processor 301 of FIG. 2. Each of the optical threshold processors 302 and 303 has the same configuration as that of the optical threshold processor 301. Referring to FIG. 6, the optical threshold processor 301 is constructed by including a nonlinear optical loop mirror 20, two photo-couplers 21 and 22, an optical isolator 23, an optical band-pass filter 24, a laser diode 25, an optical isolator 26, and an optical fiber cable 29. In this case, the nonlinear optical loop mirror 20, the two photo-couplers 21 and 22, the optical isolator 23, the optical band-pass filter 24, and the optical fiber cable 29 are constructed to be connected to each other in a manner similar to that of the optical encoder 201.

The laser diode 25 intermittently generates a train of pulses of carrier wave light having a predetermined wavelength $\lambda_3$ and a constant signal level at the period of the sampled signals inputted from the optical sampled signal generator 30 (the laser diode 25 may generate continuous light instead of the train of pulses of the carrier wave light), and outputs a train of pulses so that train of pulses enters one end of the nonlinear optical loop mirror 20 (an input end of the photo-coupler 21) via the optical isolator 26. On the other hand, the signal light from the optical encoder 201 enters into the optical fiber cable 29 through one end of the optical fiber cable 29, and passes through the photo-coupler 22 so as to be branched into two signal lights. One signal light passing through the photo-coupler 22 is terminated in a non-reflection state via the optical isolator 23, and another branched signal light branched by the photo-coupler 22 is outputted to the loop of the nonlinear optical loop mirror 20 via the photo-coupler 22. In addition, the optical band-pass filter 24 for passing therethrough only component of a wavelength of $\lambda_3$ included in the carrier wave light is connected to another end of the nonlinear optical loop mirror 20.

Figure 7:
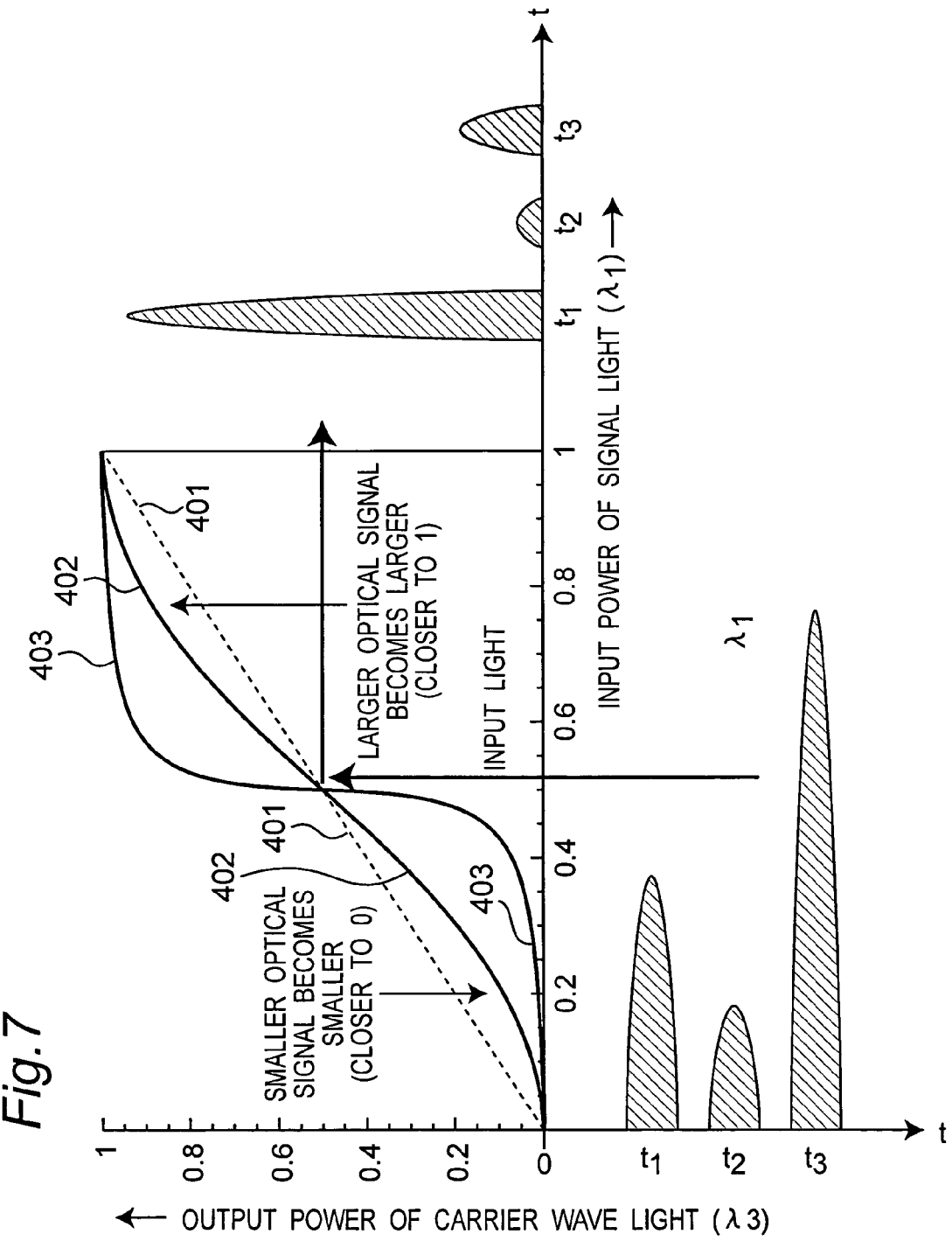
FIG. 7 is a graph showing an exemplary operation of the optical threshold processor 301 of FIG. 6.

The operation of the optical threshold processor 301 constructed as mentioned above will be described with reference to FIG. 7. FIG. 7 shows an exemplary 1-bit quantization operation. For example, when the input-to-output of the optical threshold processor 301 has a linear characteristic 401, the incident signal light is outputted as it is without any quantization. However, when the optical threshold processor 301 has, for example, a first input-to-output characteristic 402 (with respect to the light intensity), a smaller optical signal is converted to be smaller and closer to 0, and a larger optical signal is converted so as to be larger and closer to 1. Further, when a second input-to-output characteristic 403 (with respect to the light intensity) is used, it is possible to generate output light closer to one of binary values. Further, in order to obtain the second input-to-output characteristic 403, it is preferable that optical threshold processors are connected in cascade to each other in plural stages, as described in detail later.

Figure 8:
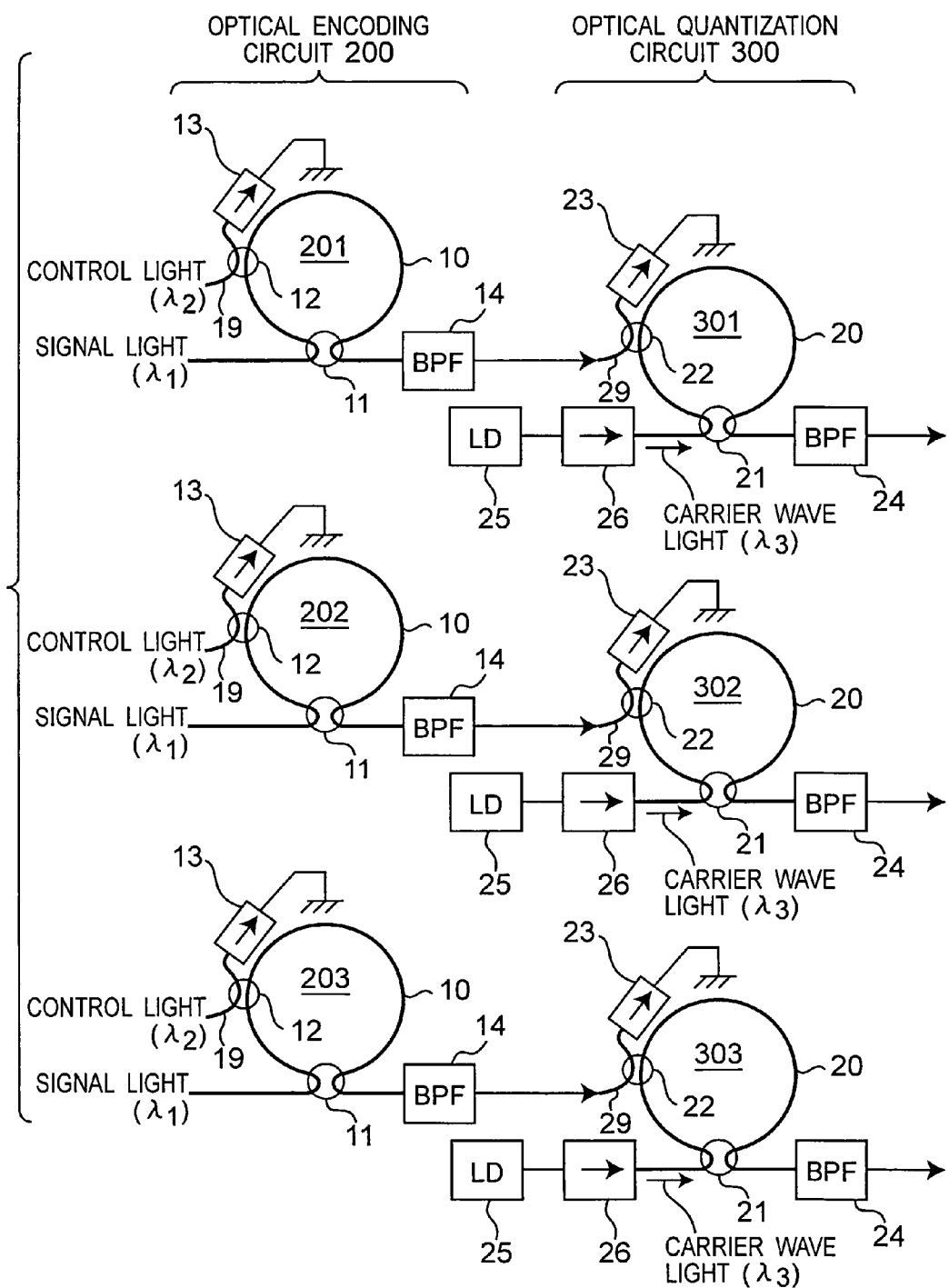
FIG. 8 is a block diagram showing detailed configurations of the optical encoding circuit 200 and an optical quantization circuit 300 of FIG. 2.
Figure 9:
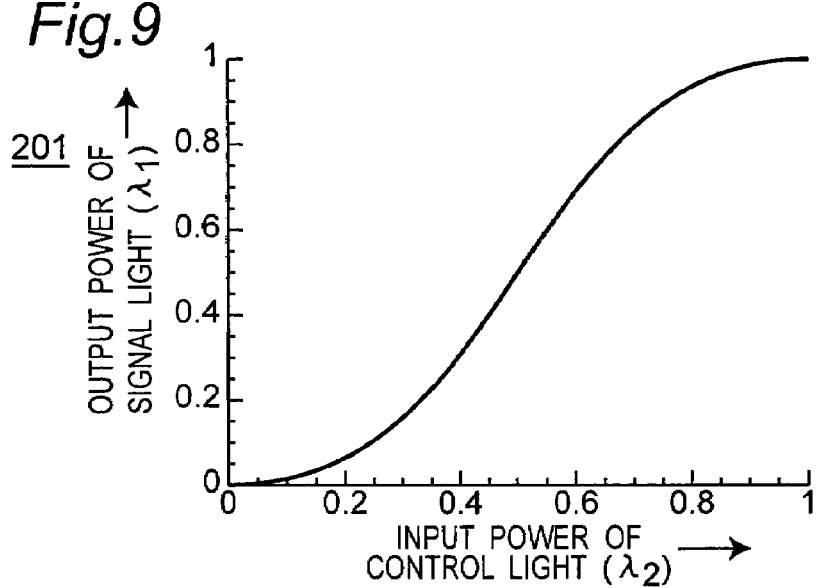
FIG. 9 is a graph showing an exemplary operation of an optical encoder 201 of FIG. 8.
Figure 10:
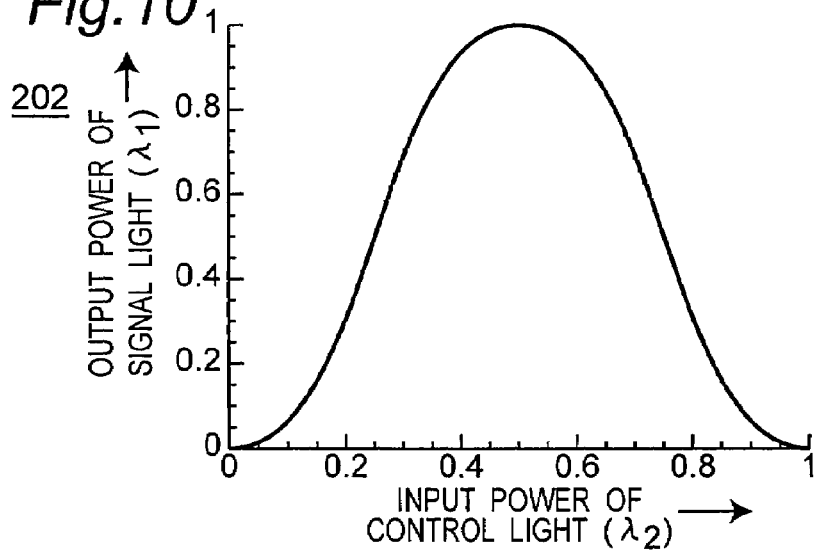
FIG. 10 is a graph showing an exemplary operation of an optical encoder 202 of FIG. 8.
Figure 11:
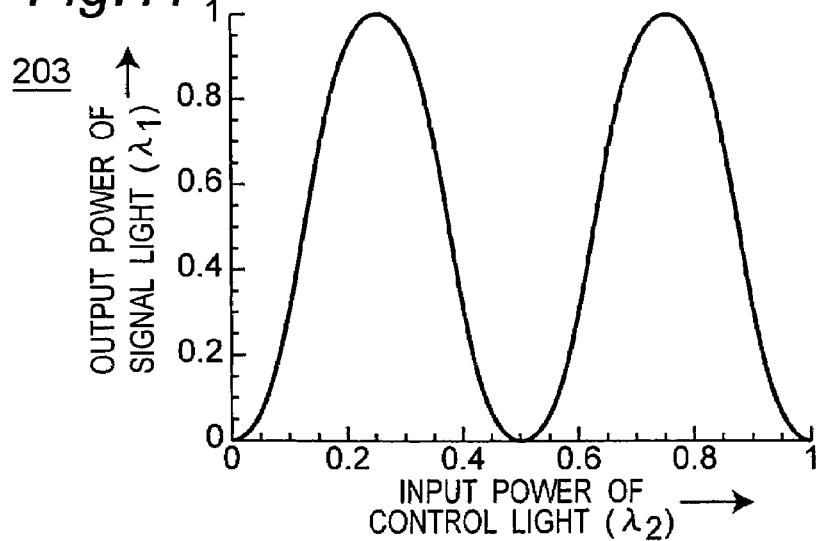
FIG. 11 is a graph showing an exemplary operation of an optical encoder 203 of FIG. 8.
Figure 12:
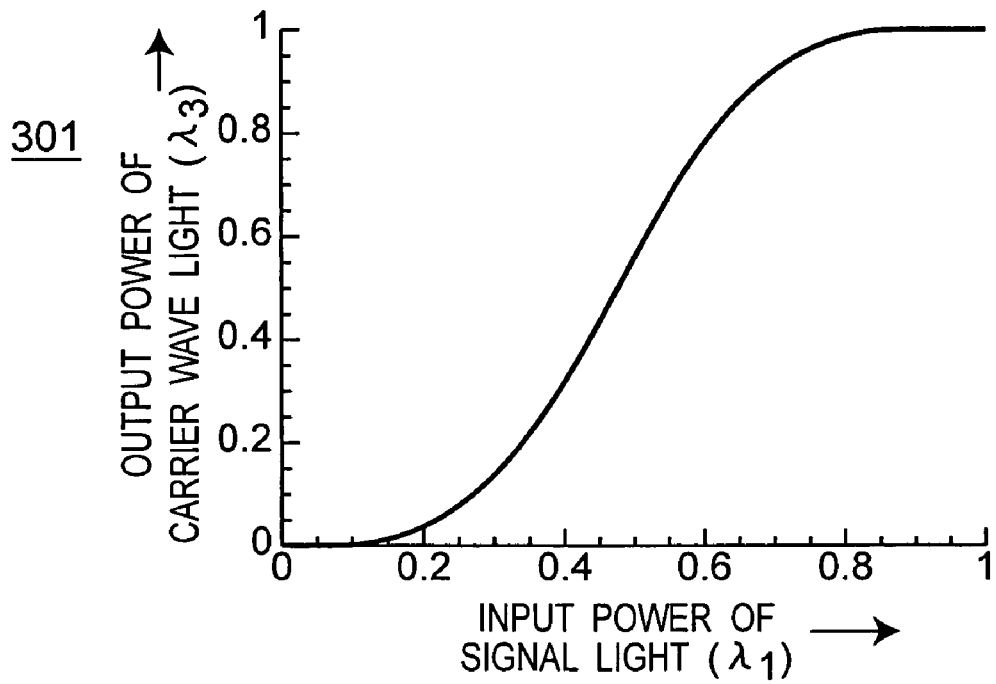
FIG. 12 is a graph showing an exemplary operation of an optical threshold processor 301 of FIG. 8.
Figure 13:
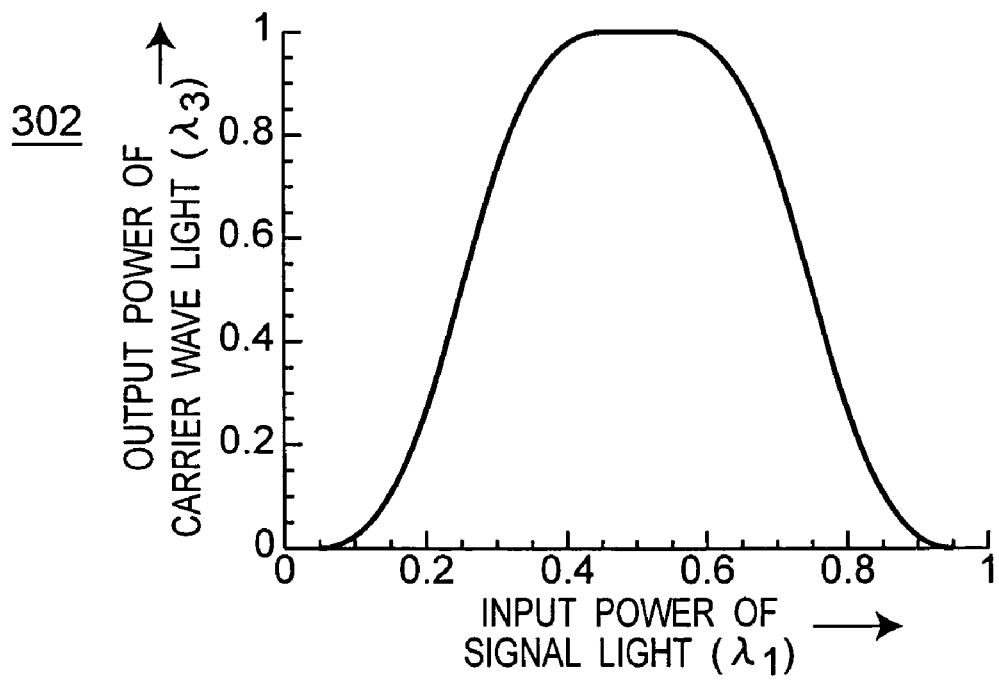
FIG. 13 is a graph showing an exemplary operation of an optical threshold processor 302 of FIG. 8.
Figure 14:
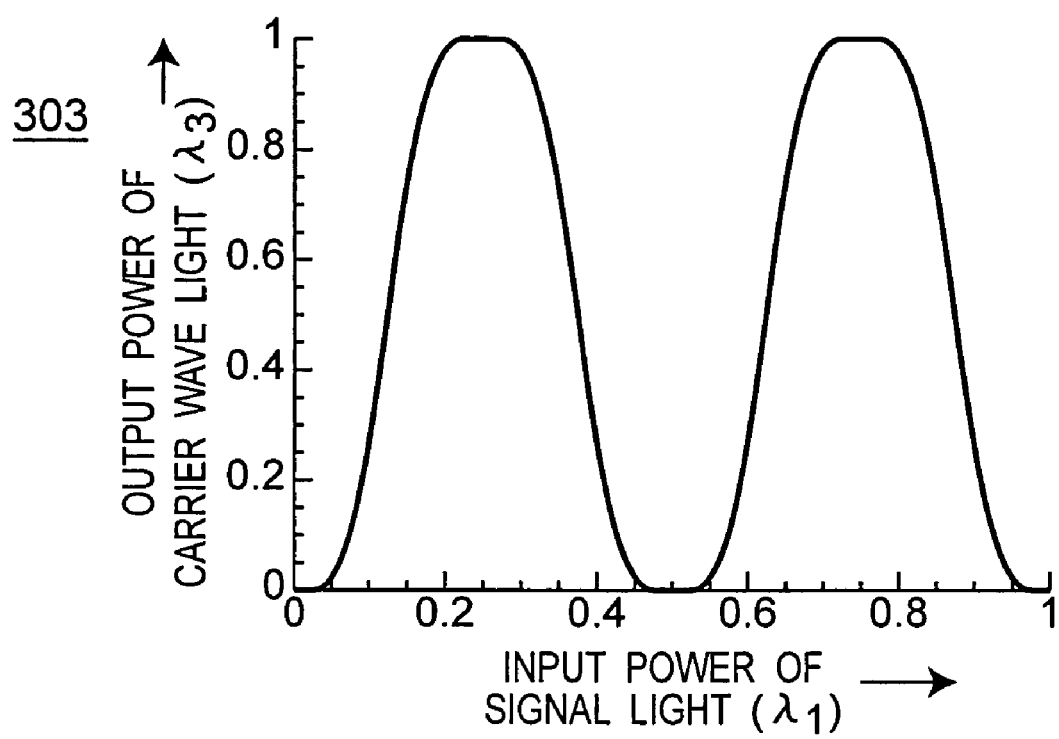
FIG. 14 is a graph showing an exemplary operation of an optical threshold processor 303 of FIG. 8.

FIG. 8 is a block diagram showing detailed configurations of the optical encoding circuit 200 and the optical quantization circuit 300 of FIG. 2. FIGS. 9 to 11 are graphs showing exemplary operations of the respective optical encoders 201, 202 and 203. FIG. 9 shows the exemplary operation of the optical encoder 201, FIG. 10 shows the exemplary operation of the optical encoder 202, and FIG. 11 shows the exemplary operation of the optical encoder 203. In addition, FIGS. 12 to 14 are graphs showing exemplary operations of the respective optical threshold processors 301, 302 and 303. FIG. 12 shows the exemplary operation of the optical threshold processor 301, FIG. 13 shows the exemplary operation of the optical threshold processor 302, and FIG. 14 shows the exemplary operation of the optical threshold processor 303.

FIGS. 9, 10 and 11 show the input-to-output characteristics of the optical encoders 201, 202 and 203 with respect to the light intensity, respectively, when the optical encoding circuit 200 and the optical quantization circuit 300 are constructed as shown in FIG. 8. In this case, as apparent from FIGS. 9 to 11, the optical encoders 201, 202 and 203 have period characteristics of the power level of output signal light with respect to the power level of input control light that are different from each other. In particular, there is the relationship of power-of-two among their periods, the optical encoder 201 has a period of "2T", the optical encoder 202 has a period of "T", and the optical encoder 203 has a period of "T/2". When the signal light shown in FIGS. 9 to 11 enter into the optical threshold processors 301, 302 and 303, respectively, the signal light can be quantized to some degree as shown in FIGS. 12 to 14, but there is still a demand for providing a further sharp quantization characteristic.

Figure 15:
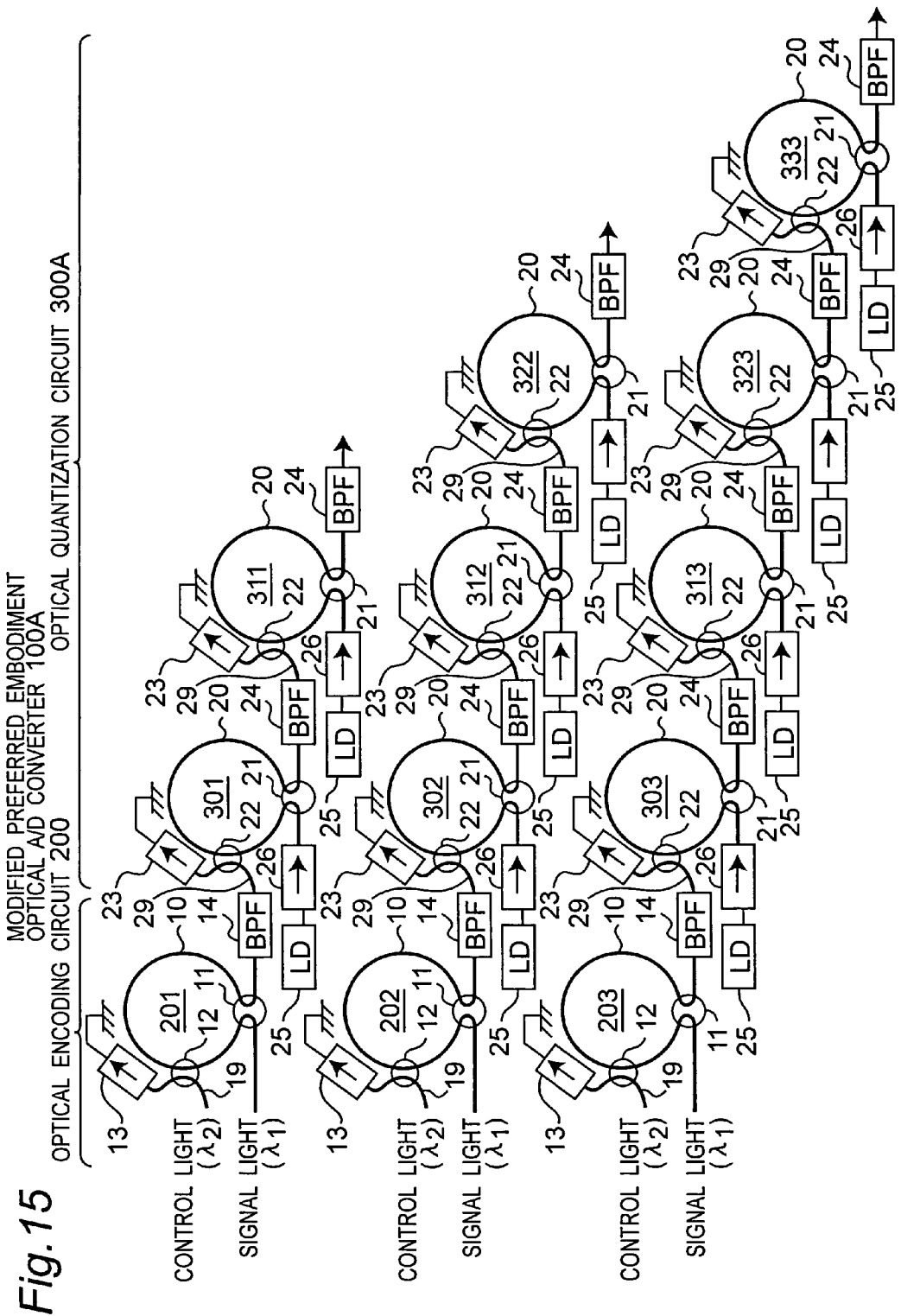
FIG. 15 is a block diagram showing a detailed configuration of an optical A/D converting device 100A according to a modified preferred embodiment of the present invention.
Figure 16:
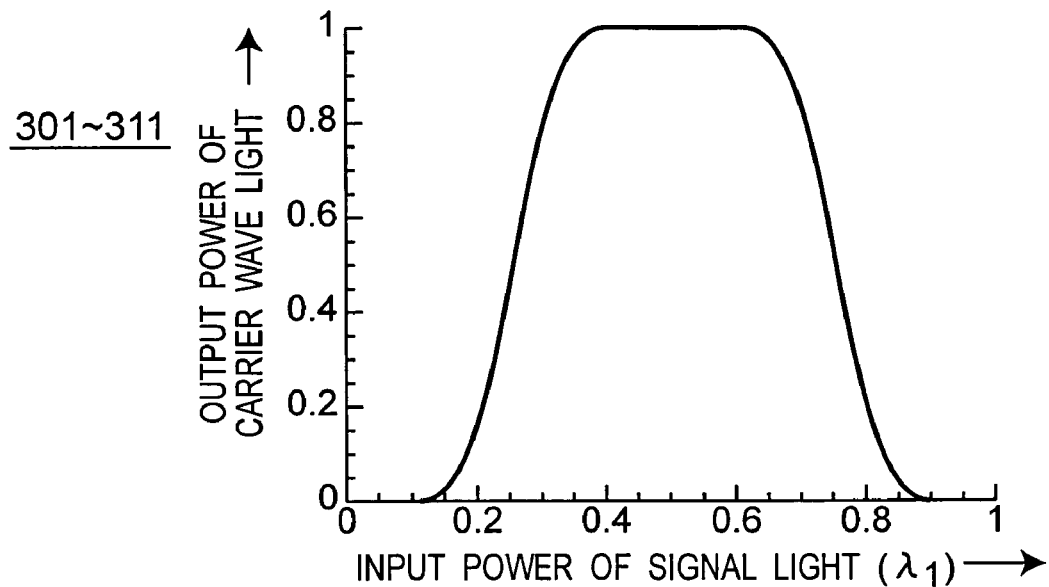
FIG. 16 is a graph showing an exemplary operation of optical threshold processors 301 and 311 of FIG. 15 which are connected in cascade to each other.
Figure 17:
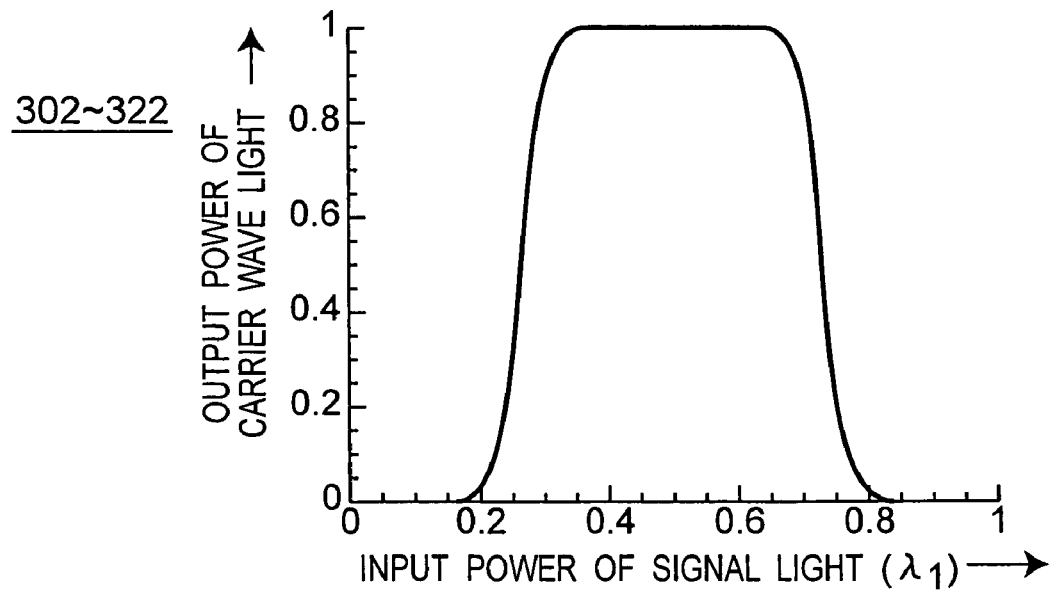
FIG. 17 is a graph showing an exemplary operation of optical threshold processors 302, 312 and 322 of FIG. 15 which are connected in cascade to each other.
Figure 18:
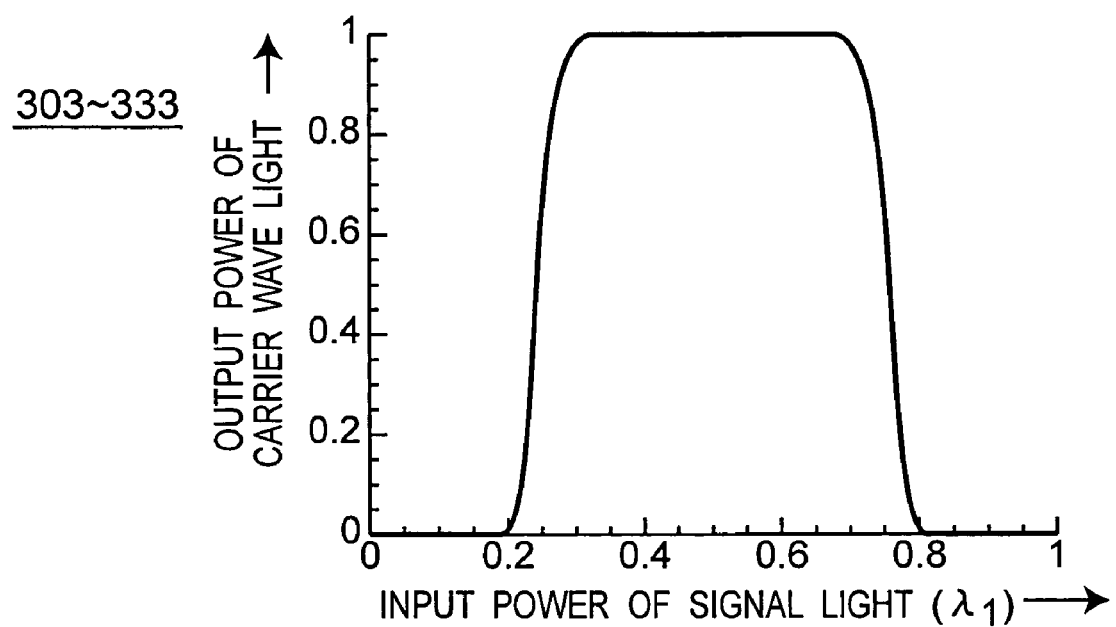
FIG. 18 is a graph showing an exemplary operation of optical threshold processors 303, 313, 323 and 333 of FIG. 15 which are connected in cascade to each other.

In order to realize this, as shown in FIG. 15, optical threshold processors are connected in cascade in plural stages, in an optical quantization circuit 300A. Referring to FIG. 15, optical threshold processors 301 and 311 which are connected in cascade to each other in two stages are connected subsequently to the optical encoder 201. In addition, optical threshold processors 302, 312 and 322 which are connected in cascade to each other in three stages are connected subsequently to the optical encoder 202. Further, optical threshold processors 303, 313, 323 and 333 which are connected in cascade to each other in four stages are connected subsequently to the optical encoder 203. FIGS. 16 to 18 show an exemplary operation of the optical quantization circuit 300A constructed as mentioned above. As apparent from FIGS. 16 to 18, the larger the number of stages of optical threshold processors connected in cascade become, the sharper and closer to rectangular the input-to-output characteristic with respect to the light intensity can become.

In the above mentioned preferred embodiment, the optical threshold processors 301, 302 and 303 are constructed using nonlinear optical loop mirrors, however, the present invention is not limited to this, and they may be constructed using nonlinear amplifying loop mirrors each including an amplifier in the loop of the nonlinear optical loop mirror (referred to as NALMs hereinafter, and see the non-patent document 4, for example).

In the above mentioned preferred embodiment, the optical encoders 201, 202 and 203 are constructed using nonlinear optical loop mirrors 10, and the optical threshold processors 301, 302 and 303 are constructed using nonlinear optical loop mirrors 20, however, the present invention is not limited to this, and the optical encoders 201, 202 and 203 and the optical threshold processors 301, 302 and 303 may be constructed using optical fiber cables or optical waveguides each having a nonlinear optical effect such as the optical Kerr effect. In this case, the optical Kerr effect is a phenomenon of a nonlinear optical effect generated in an optical fiber cable. Generally speaking, the optical Kerr effect refers to a nonlinear refractive-index phenomenon, in which the refractive-index changes depending on the intensity of the optical signal. For example, the non-patent documents 5 and 6 disclose that such a nonlinear optical effect realizes a period characteristic similar to that of the nonlinear optical loop mirror 10.

Figure 35:
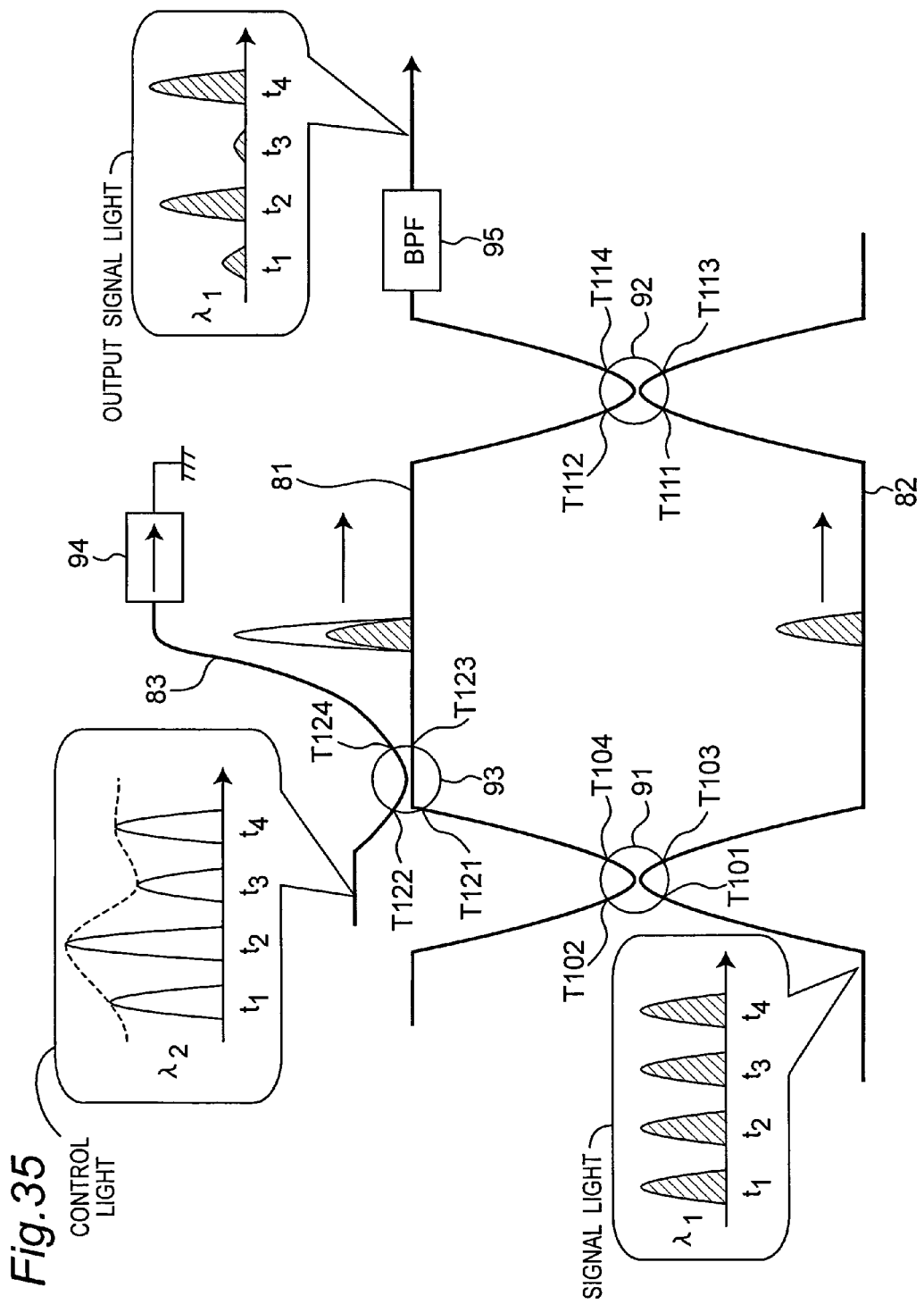
FIG. 35 is a block diagram showing a configuration of an optical encoder using a waveguide-type Mach-Zehnder interferometer according to a first modified preferred embodiment of the present invention.

FIG. 35 is a block diagram showing a configuration of an optical encoder using a waveguide-type Mach-Zehnder interferometer according to a first modified preferred embodiment of the present invention. As shown in FIG. 35, in the optical encoder using the waveguide-type Mach-Zehnder interferometer according to the first modified preferred embodiment, three optical waveguides 81, 82 and 83 are formed, and two optical waveguides 81 and 82 out of them are placed proximally to each other at least at two predetermined portions, so that they are optically coupled to each other at the two predetermined portions so as to form photo-couplers 91 and 92.

An input terminal of the photo-coupler 91 on the optical waveguide 82 is defined as T101, and an output terminal thereof is defined as T103. On the other hand, an input terminal of the photo-coupler 91 on the optical waveguide 81 is defined as T102, and an output terminal thereof is defined as T104. In addition, an input terminal of the photo-coupler 92 on the optical waveguide 82 is defined as T111, and an output terminal thereof is defined as T114. On the other hand, an input terminal of the photo-coupler 92 on the optical waveguide 81 is defined as T112, and an output terminal thereof is defined as T113. Further, an optical band-pass filter 95 for passing therethrough only output signal light, which is described later, is connected to the output terminal T114 of the photo-coupler 92.

In addition, between the output terminal T104 of the photo-coupler 91 and the input terminal T112 of the photo-coupler 92, the optical waveguide 83 is formed proximally to the optical waveguide 81 so that they are optically coupled to each other, to form a photo-coupler 93 at the portion where the optical waveguides 81 and 83 are proximally to each other. An input terminal of the photo-coupler 93 on the optical waveguide 81 is defined as T121, and an output terminal thereof is defined as T123. On the other hand, an input terminal of the photo-coupler 93 on the optical waveguide 83 is defined as T122 and an output terminal thereof is defined as T124. Further, the output terminal T124 of the photo-coupler 93 is terminated in a non-reflection state via an optical isolator 94.

In the optical encoder using the waveguide-type Mach-Zehnder interferometer constructed as mentioned above, by inputting a train of pulses of signal light having a wavelength of $\lambda_1$ and a predetermined period to the input terminal T101 of the photo-coupler 91, the pulse train of signal light is branched so as to enter into the optical waveguides 82 and 81. On the other hand, by inputting a train of analog pulses resulted from sampling of control light having a wavelength of $\lambda_2$ and a predetermined period to the input terminal T122 of the photo-coupler 93, the pulse train of control light enters into the optical waveguide 81. In this case, by using the XPM between the signal light and the control light, a phase change is caused only in the branched signal light branched by the photo-coupler 91 on the optical waveguide 81 in accordance with the pulse train of the control light, and thereafter, the two branched signal lights branched by the photo-coupler 91 are re-combined to each other by the photo-coupler 92. Due to this, the output level of the signal light can be changed according to the signal level of the control light. The output signal light outputted from the waveguide-type Mach-Zehnder interferometer is extracted from the photo-coupler 92 via the optical band-pass filter 95. The output signal light exhibits a periodic characteristic similar to that of the nonlinear loop mirror shown in FIG. 4, with respect to the output power of the control light. The optical encoder using the waveguide-type Mach-Zehnder interferometer optically encodes the control light and outputs an optically-encoded output signal light, in a manner similar to that of the optical encoder 201 of FIG. 3. In addition, the optical encoder in FIG. 35 may be operated as an optical threshold processor, in a manner similar to that of the optical threshold processor 301 of FIG. 6.

Figure 36:
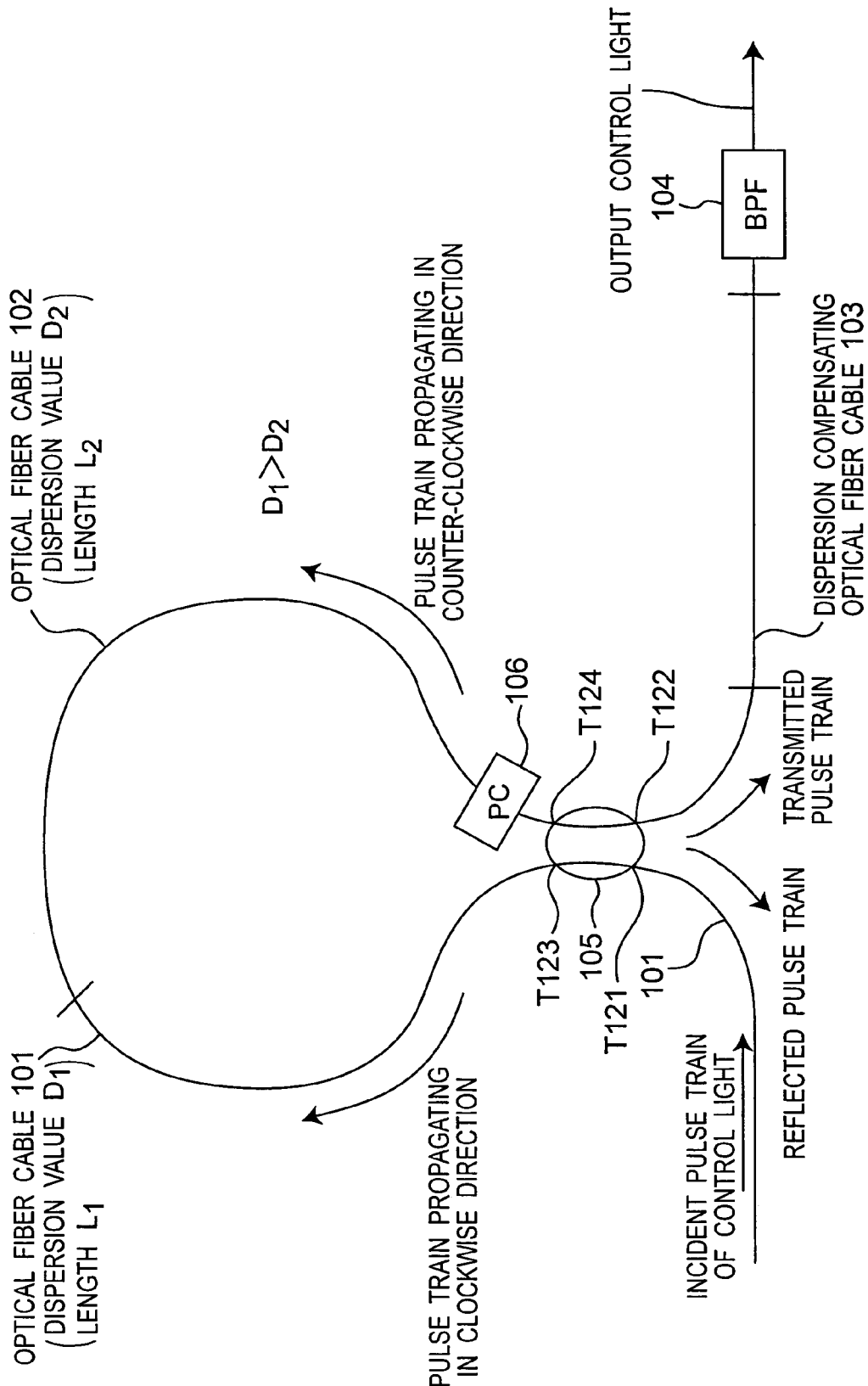
FIG. 36 is a block diagram showing a configuration of an optical encoder using a dispersion imbalanced-nonlinear optical loop mirror according to a second modified preferred embodiment of the present invention.

FIG. 36 is a block diagram showing a configuration of an optical encoder using a dispersion imbalanced-nonlinear optical loop mirror according to a second modified preferred embodiment of the present invention. The dispersion imbalanced-nonlinear optical loop mirror (referred to as a DI-NOLM hereinafter, and see the non-patent documents 7, 8 and 9, for example) in the optical encoder according to the second modified preferred embodiment has been known as a nonlinear optical loop mirror constructed only by optically-passive devices.

In the optical threshold processor using the DI-NOLM according to the second modified preferred embodiment, an optical fiber cable 101 having a dispersion value of $D_1$ and a length of $L_1$ and an optical fiber cable 102 having a dispersion value of $D_2$ ($D_2 < D_1$) and a length of $L_2$ are connected in cascade to each other, and an input end of the optical fiber cable 101 and an output end of the optical fiber cable 102 are placed proximally to each other so that they are optically coupled to each other, to form a photo-coupler 105 having four terminals T121, T122, T123 and T124. In addition, a polarization controller 106 is provided on the optical fiber cable 102 near the terminal T124 of the photo-coupler 105, and an optical band-pass filter 104 for extracting output control light is connected to the output terminal T122 of the photo-coupler 105 via the optical fiber cable 102 and a dispersion-compensating optical fiber cable 103.

The optical threshold processor using the DI-NOLM having the above mentioned configuration exhibits characteristics which depend on the intensity of control light which is incident light, in a manner similar to that of the nonlinear optical loop mirror (NOLM) or the nonlinear amplifying loop mirror (NALM). In addition, the polarization controller 106 is provided to adjust a polarized-wave at a looped portion, the dispersion-compensating optical fiber cable 103 compensates for the dispersions caused by the optical fiber cables 101 and 102 in the looped portion, and the polarization controller 106 and the dispersion-compensating optical fiber cable 103 are essential to the DI-NOLM.

When a single optical pulse is inputted to the input terminal T121 of the photo-coupler 105 of the DI-NOLM, the optical pulse is branched into a pulse propagating in the clockwise direction and an optical pulse propagating in the counter-clockwise direction with a ratio of 1:1 by the photo-coupler 105. As to the propagation of the optical pulse propagating in the clockwise direction, when the optical pulse enters into the optical fiber cable 101, the pulse width thereof is increased, and the peak power thereof is decreased, due to the larger dispersion (dispersion value $D_1$). Then, the optical pulse propagates through the optical fiber cable 102 having a significantly smaller dispersion value ($D_2 \cong 0$) while maintaining a decreased peak power. On the other hand, first of all, as to the propagation in the counter-clockwise direction, an incident pulse propagates through the optical fiber cable 102 having the smaller dispersion value while maintaining a larger peak power. Then, the optical pulse is entered into the optical fiber cable 101. Since the optical fiber cable 101 has the larger dispersion value, the optical pulse is subjected to a dispersion effect immediately after entering into the optical fiber cable 101, and due to this, the pulse width of the optical pulse increases, and the peak power of the optical pulse decreases. Comparing the optical pulse propagating in the clockwise direction with the optical pulse propagating in the counter-clockwise direction, since the optical pulse propagating in the counter-clockwise direction propagates over a longer distance with a higher peak power, the optical pulse propagating in the counter-clockwise direction is influenced by an SPM (Self Phase Modulation) in the looped portion more significantly than the optical pulse propagating in the clockwise direction. Accordingly, due to the difference between the SPM that the optical pulse propagating in the clockwise direction receives in the looped portion and the SPM that the optical pulse propagating in the counter-clockwise direction receives in the looped portion, it is possible to transmit or reflect the optical pulse of incident control light. The DI-NOLM has advantages that it requires no signal light and no optical amplifier, it is constituted only by optically-passive devices, it can totally reflect continuous waves (CW) by using the 3 dB photo-coupler 105, and the length of the optical fiber cable forming the looped portion can be set to be relatively longer because it employs the dispersion-compensating optical fiber cable 103. By the use of the DI-NOLM, it is possible to easily perform optical threshold processing with only optically-passive devices.

The optical threshold processor using the DI-NOLM constructed as mentioned above can be operated in a manner similar to that of the optical threshold processor 301 of FIG. 6.

Figure 37:
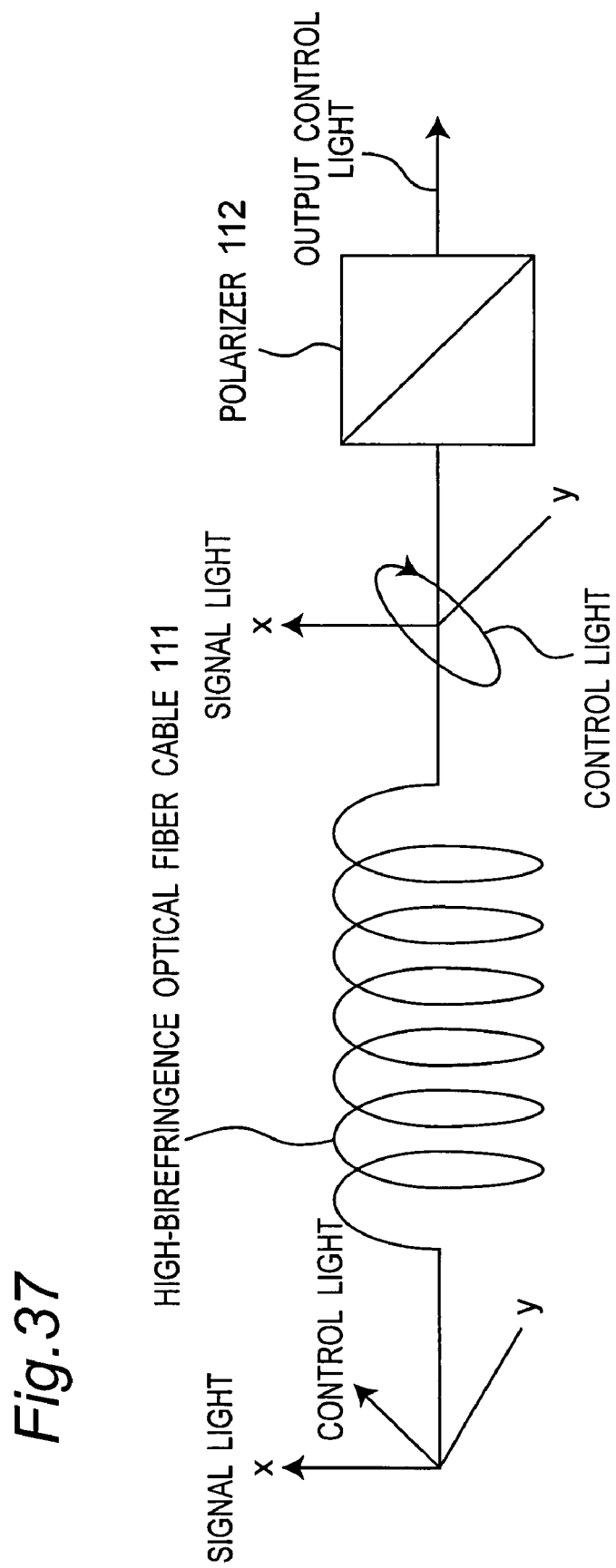
FIG. 37 is a block diagram showing a configuration of an optical encoder using a Kerr shutter having an optical Kerr effect according to a third modified preferred embodiment of the present invention.

FIG. 37 is a block diagram showing a configuration of an optical encoder using a Kerr shutter having the optical Kerr effect according to a third modified preferred embodiment of the present invention. As shown in FIG. 37, the Kerr shutter having the optical Kerr effect is constructed by including a high-birefringence optical fiber cable 111 having a birefringence of, for example, 2.0 or more and a polarizer 112 connected thereto. The Kerr shutter having the optical Kerr effect is the same as that disclosed in, for example, FIG. 6.1 of the non-patent document 5.

Referring to FIG. 37, signal light and control light are both inputted to the high-birefringence optical fiber cable 111 through its input end, so that they are angled by 45 degree with respect to each other with a linear polarization. When there is no signal light, the control light is interrupted by the polarizer 112, and is not outputted from the output end. However, when the signal light is inputted, the polarization of the control light is rotated due to the birefringence caused by the signal light, which allows the control light to pass through the polarizer 112 and to be outputted from the polarizer 112. The output power of the control light periodically changes depending on the intensity of the signal light.

The optical encoder using the Kerr shutter having the optical Kerr effect which is constructed as described above optically encodes the control light, and outputs optically-encoded output signal light, in a manner similar to that of the optical encoder 201 of FIG. 3. In addition, the optical encoder of FIG. 37 can be operated as an optical threshold processor, in a manner similar to that of the optical threshold processor 301 of FIG. 6.

FIRST IMPLEMENTAL EXAMPLE

Figure 19:
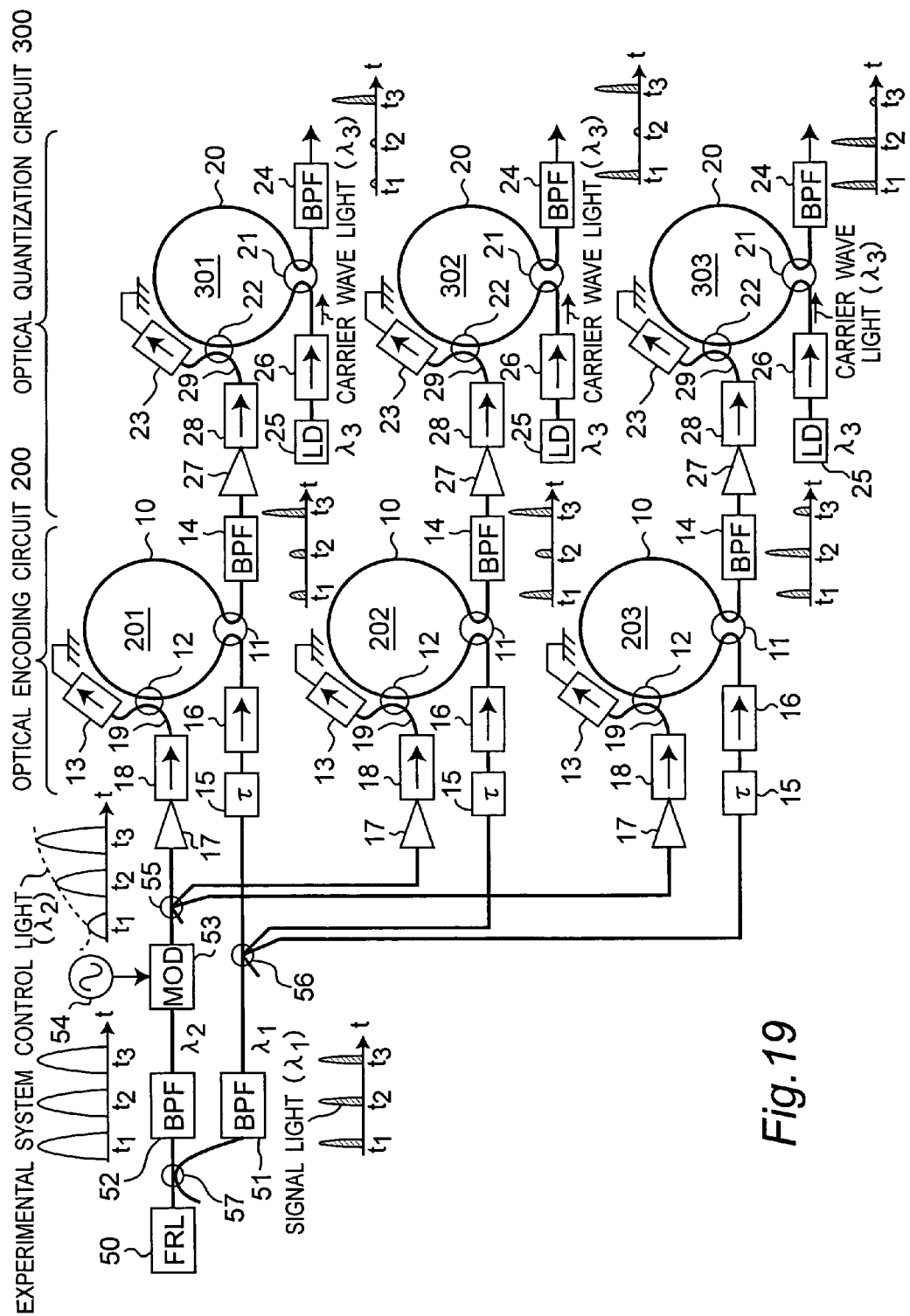
FIG. 19 is a block diagram showing a detailed configuration of an experimental system according to a present preferred embodiment.

FIG. 19 is a block diagram showing a detailed configuration of an experimental system according to the present preferred embodiment. In the experimental system of FIG. 19, a fiber ring laser (FRL) 50 generates an optical analog signal having a sampling frequency of, for example, 80 GHz, and outputs the optical analog signal to an optical splitter 57. The optical splitter 57 splits an inputted optical analog signal into two signals, and outputs the two signals to optical band-pass filters 51 and 52, respectively. The optical band-pass filter 51 band-pass filters an inputted optical analog signal so as to pass therethrough only components of a predetermined wavelength $\lambda_1$ included in the inputted optical analog signal, and outputs a train of pulses having a pulse width of, for example, 2 picoseconds to an optical splitter 56. The optical splitter 56 splits an inputted optical analog signal into three signals, and outputs the three signals to nonlinear optical loop mirrors 10 of respective optical encoders 201, 202 and 203 via delay circuits 15 and optical isolators 16.

On the other hand, the optical band-pass filter 52 band-pass filters an inputted optical analog signal so as to pass therethrough only components of a predetermined wavelength $\lambda_2$ included in the inputted optical analog signal, and outputs a train of pulses having a pulse width of, for example, 8 picoseconds to an optical modulator 53. The optical modulator 53 modulates an inputted optical analog signal according to a data signal from a data signal generator 54, and outputs a modulated optical analog signal to an optical splitter 56. In this case, the wavelength 2 is close to the wavelength $\lambda_1$. The optical splitter 55 splits an inputted optical analog signal into three signals, and outputs the three signals to the loops of the nonlinear optical loop mirrors 10 via photo-couplers 12 of the respective optical encoders 201, 202 and 203.

The respective optical encoders 201, 202 and 203 encode the signal light according to the signal level of control light, and the encoded signal light is outputted to the loops of the nonlinear optical loop mirrors 20 via optical amplifiers 27 and optical isolators 28 and via the photo-couplers 22 of the respective optical threshold processors 301, 302 and 303. On the other hand, the carrier wave light having the wavelength of $\lambda_3$ (in this case, the wavelength $\lambda_3$ is close to the wavelength $\lambda_1$) generated by the laser diodes 25 is inputted to the loops of the nonlinear optical loop mirrors 20 of the respective optical threshold processors 301, 302 and 303 via the optical isolators 26. Accordingly, each of the optical threshold processors 301, 302 and 303 quantizes the carrier wave light according to the signal level of the signal light, and a quantized carrier wave light is outputted to an external optical circuit via the optical band-pass filter 24.

Figure 20:
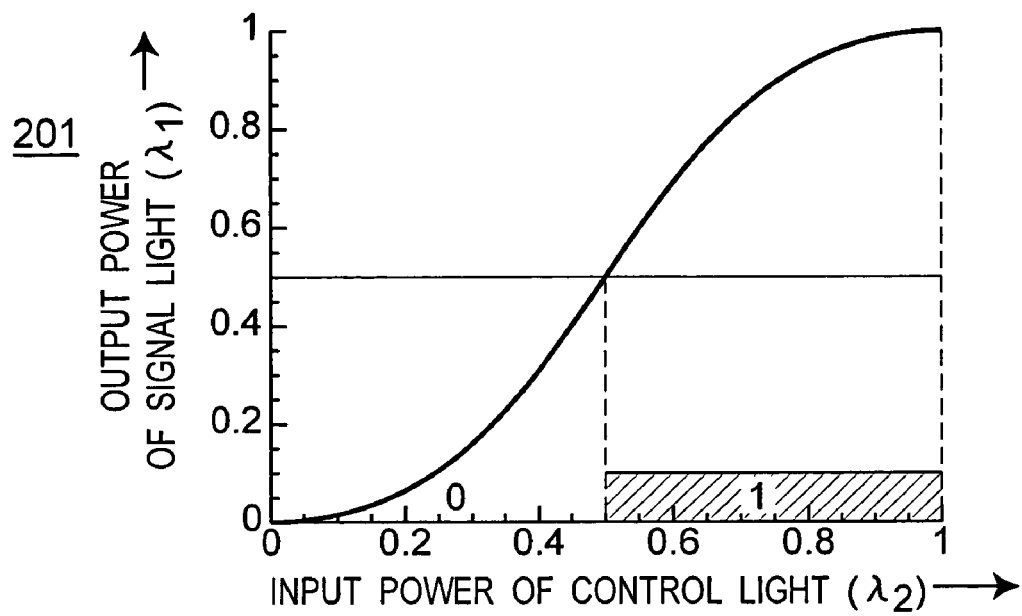
FIG. 20 is a graph showing an exemplary operation of encoding processing in an optical encoder 201 of FIG. 19.
Figure 21:
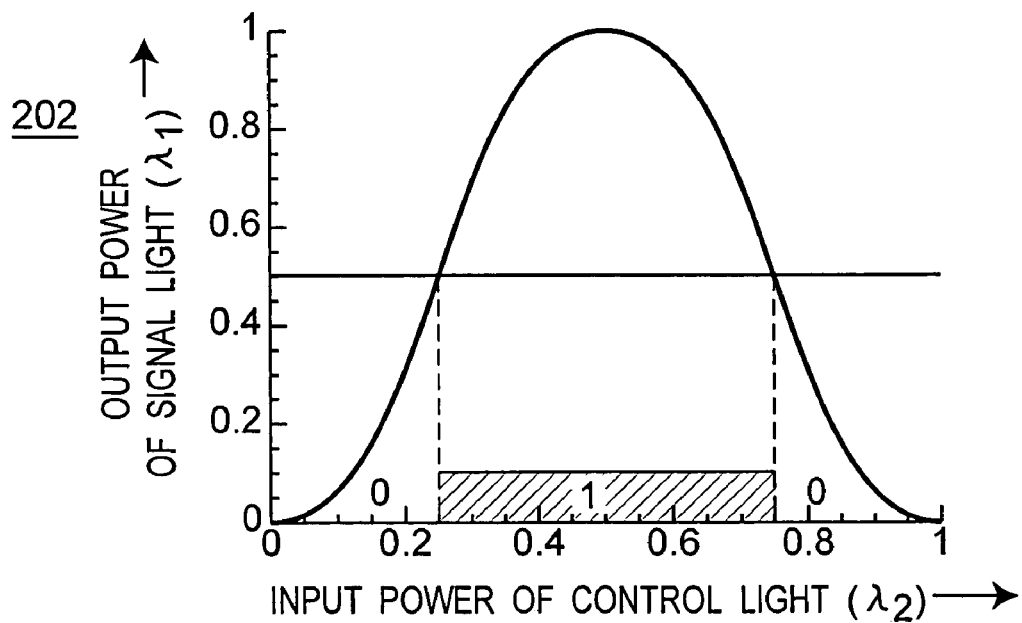
FIG. 21 is a graph showing an exemplary operation of encoding processing in an optical encoder 202 of FIG. 19.
Figure 22:
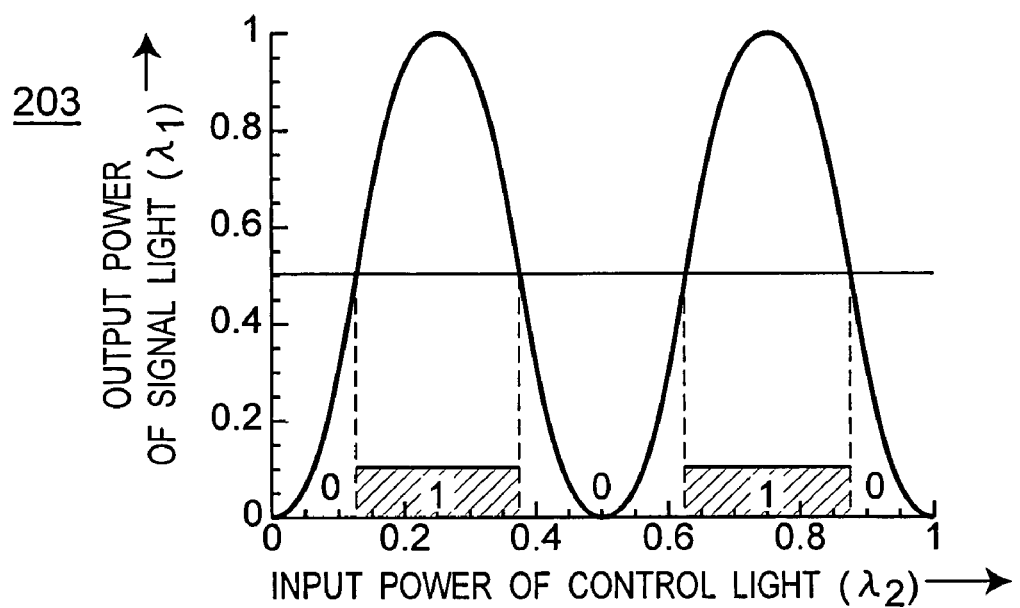
FIG. 22 is a graph showing an exemplary operation of encoding processing in an optical encoder 203 of FIG. 19.
Figure 23:
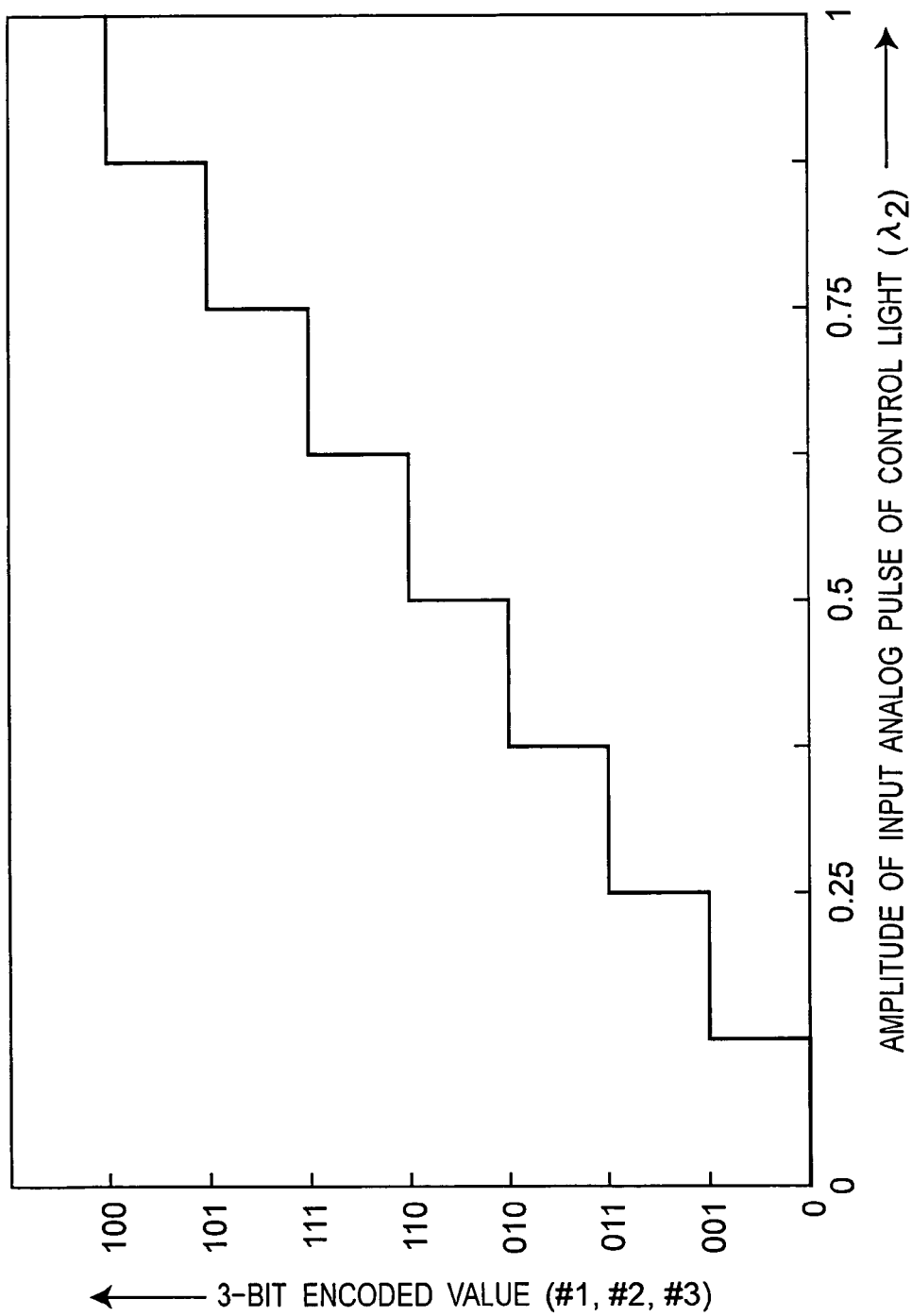
FIG. 23 is a graph showing a 3-bit encoded value (#1, #2 and #3) with respect to amplitude of input analog pulses of the control light ($\lambda_2$) which is resulted from the encoding processing using an optical encoding circuit 200 of FIG. 19.

FIGS. 20 to 22 are graphs showing exemplary operations of the encoding processing in the optical encoding circuit 200 of FIG. 19. FIG. 20 shows the exemplary operation of the encoding processing in the optical encoder 201, FIG. 21 shows the exemplary operation of the encoding processing in the optical encoder 202, and FIG. 22 shows the exemplary operation of the encoding processing in the optical encoder 203. In addition, FIG. 23 is a graph showing the 3-bit encoded value (#1, #2 and #3) with respect to the amplitude of input analog pulses of the control light ($\lambda_2$) which is resulted from the encoding processing using the optical encoding circuit 200 of FIG. 19. As shown in FIGS. 20 to 22, it is possible to perform proper encoding according to the input power level of the inputted control light, by setting the input-to-output characteristics of the respective optical encoders 201, 202 and 203 with respect to the light intensity. In addition, as shown in FIG. 23, the encoding is performed so that an encoded value corresponds to the amplitude of input analog pulses of the control light ($\lambda_2$) in an one-to-one manner, and, as previously described, the input-to-output characteristics of the respective optical encoders 201, 202 and 203 with respect to the light intensity (particularly, the period characteristics of the nonlinear optical loop mirrors 10) can be changed so as to provide a degree of freedom to the encoding processing.

Figure 24:
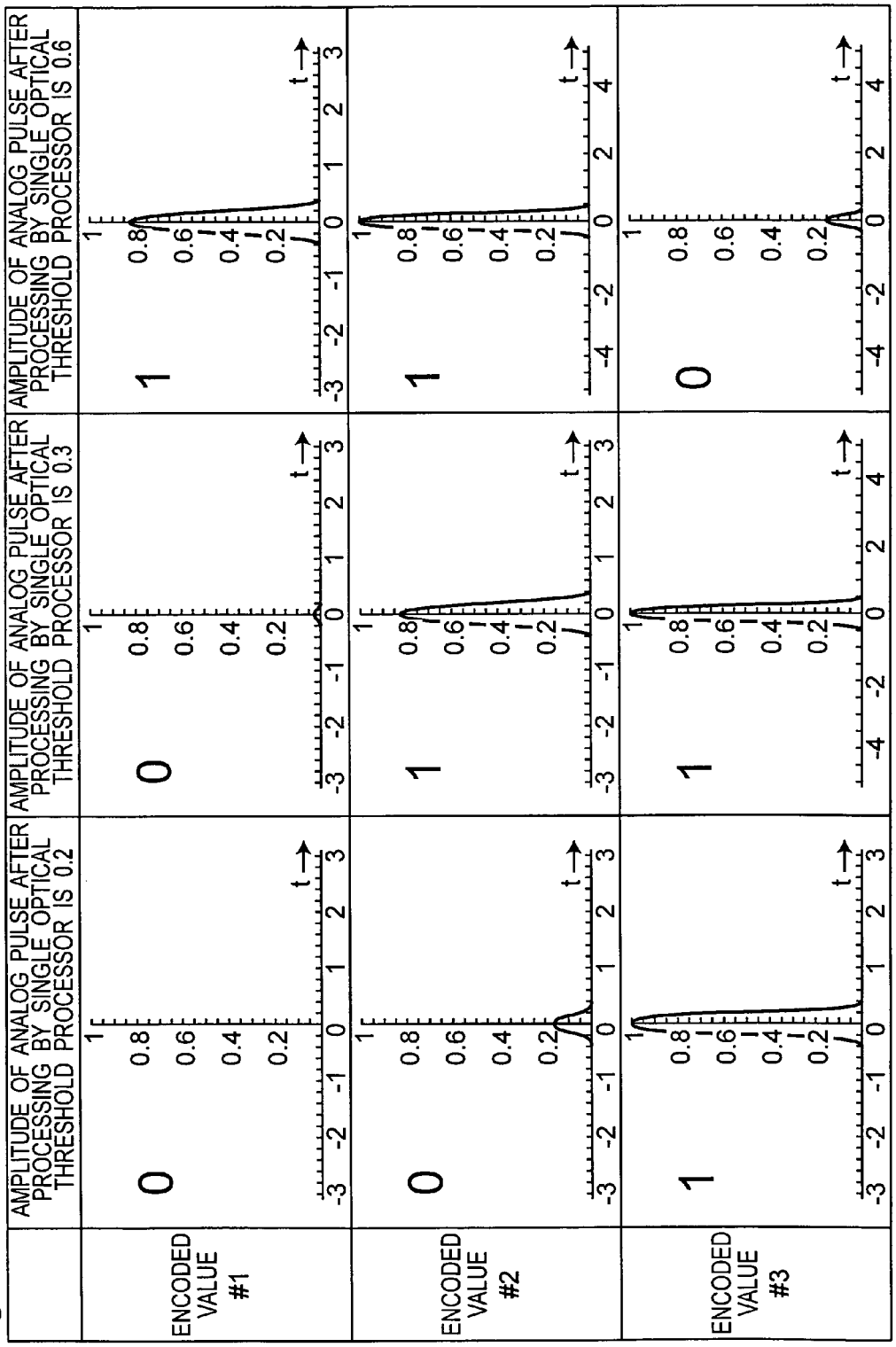
FIG. 24 is a diagram showing encoded 3-bit encoded values (#1, #2 and #3) and pulse waveforms thereof, when the amplitude of analog pulses after processing by a single optical threshold processor is changed, in the case where the experimental system is constructed by using ideal nonlinear optical loop mirrors in FIG. 19.

FIG. 24 is a diagram showing the 3-bit encoded values (#1, #2 and #3) and the pulse waveforms thereof which are resulted from encoding, when the amplitude of analog pulses after processing by a single optical threshold processor is changed, in the case where the experimental system is constructed by using ideal nonlinear optical loop mirrors in FIG. 19. As apparent from FIG. 24, it is possible to obtain optical digital signals which are properly encoded according to the amplitude of analog pulses.

SECOND IMPLEMENTAL EXAMPLE

Next, there will be described simulations conducted by the present inventors and the results thereof, hereinafter. The specification of the simulations is shown in the following tables.

TABLE 1

Specification of Simulations

| Type of the optical fiber cable | High-nonlinear optical fiber cable |
|---|---|
| Loss | 0.25 dB/km |
| Zero-dispersion wavelength | 1550 nm |
| Dispersion slope | 0.016 ps/nm$^2$/km |
| Nonlinearity | 12.6 W$^{-1}$km$^2$ |
| Length | 500 m |

(Remarks) A link simulator manufactured by R-soft Corporation was used.

TABLE 2

| Fiber ring laser (FRL) 61 | |
|---|---|
| Repetition frequency | 10 GHz |
| Center wavelength | 1560 nm |
| Pulse width | 10 ps |
| Peak power | 20 mW |
| Average power | 3.24 dBm |

TABLE 3

| Fiber ring laser (FRL) 62 | |
|---|---|
| Repetition frequency | 10 GHz |
| Center wavelength | 1550 nm |

TABLE 3-continued

Fiber ring laser (FRL) 62

| | |
|---|---|
| Pulse width | 40 ps |
| Peak power | 0 to 2 W |
| Average power | to 29 dBm |

Figure 25:
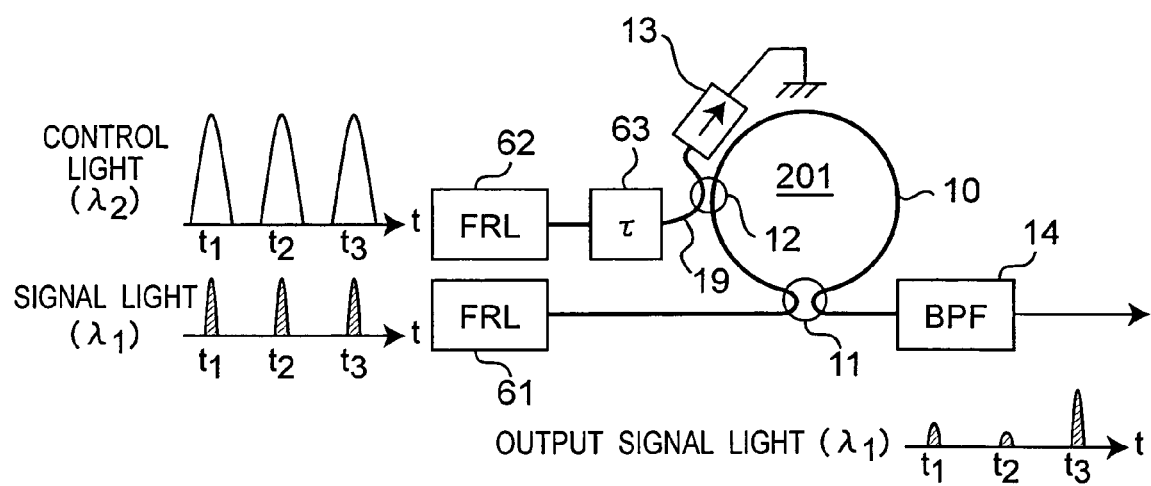
FIG. 25 is a block diagram showing a configuration of an experimental system for a first simulation according to the present preferred embodiment.

FIG. 25 is a block diagram showing a configuration of an experimental system for a first simulation according to the present preferred embodiment. Referring to FIG. 25, a fiber ring laser (FRL) 61 generates signal light having a wavelength of $\lambda_1$, and outputs a generated signal light to the loop of the nonlinear optical loop mirror 10 the optical encoder 201. On the other hand, a fiber ring laser (FRL) 62 generates control light having a wavelength of $\lambda_2$, and outputs a generated control light to the loop of the nonlinear optical loop mirror 10 of the optical encoder 201 via an optical delay circuit 63 and the photo-coupler 12. The optical encoder 201 encodes the signal light according to the signal level of the control light, and outputs encoded signal light via the optical band-pass filter 14.

Figure 26:
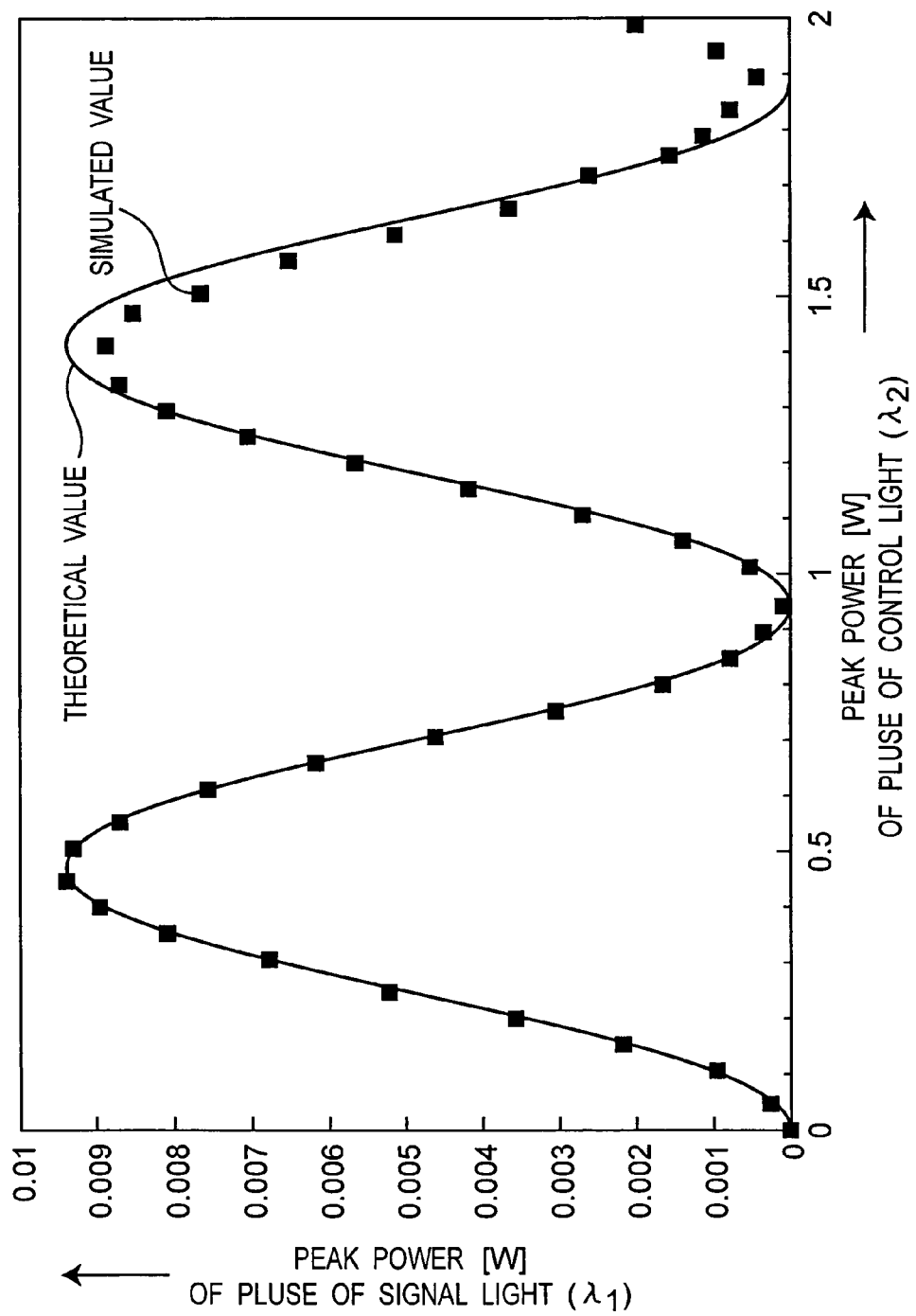
FIG. 26 is a graph showing peak power of pulses of the signal light ($\lambda_1$) with respect to peak power of pulses of the control light ($\lambda_2$), showing results of the first simulation of FIG. 25.

FIG. 26 is a graph showing peak power of pulses of the signal light ($\lambda_1$) with respect to peak power of pulses of the control light ($\lambda_2$), showing results of the first simulation. As apparent from FIG. 26, as results of the first simulation of FIG. 25, simulated values close to theoretical values of the period characteristic are obtained. In this simulation, four-optical-wave mixing was neglected. Further, it can be considered that the differences between the simulated values and the theoretical values are due to the walk-off caused by the dispersion in the nonlinear optical loop mirror 10.

THIRD IMPLEMENTAL EXAMPLE

Figure 27:
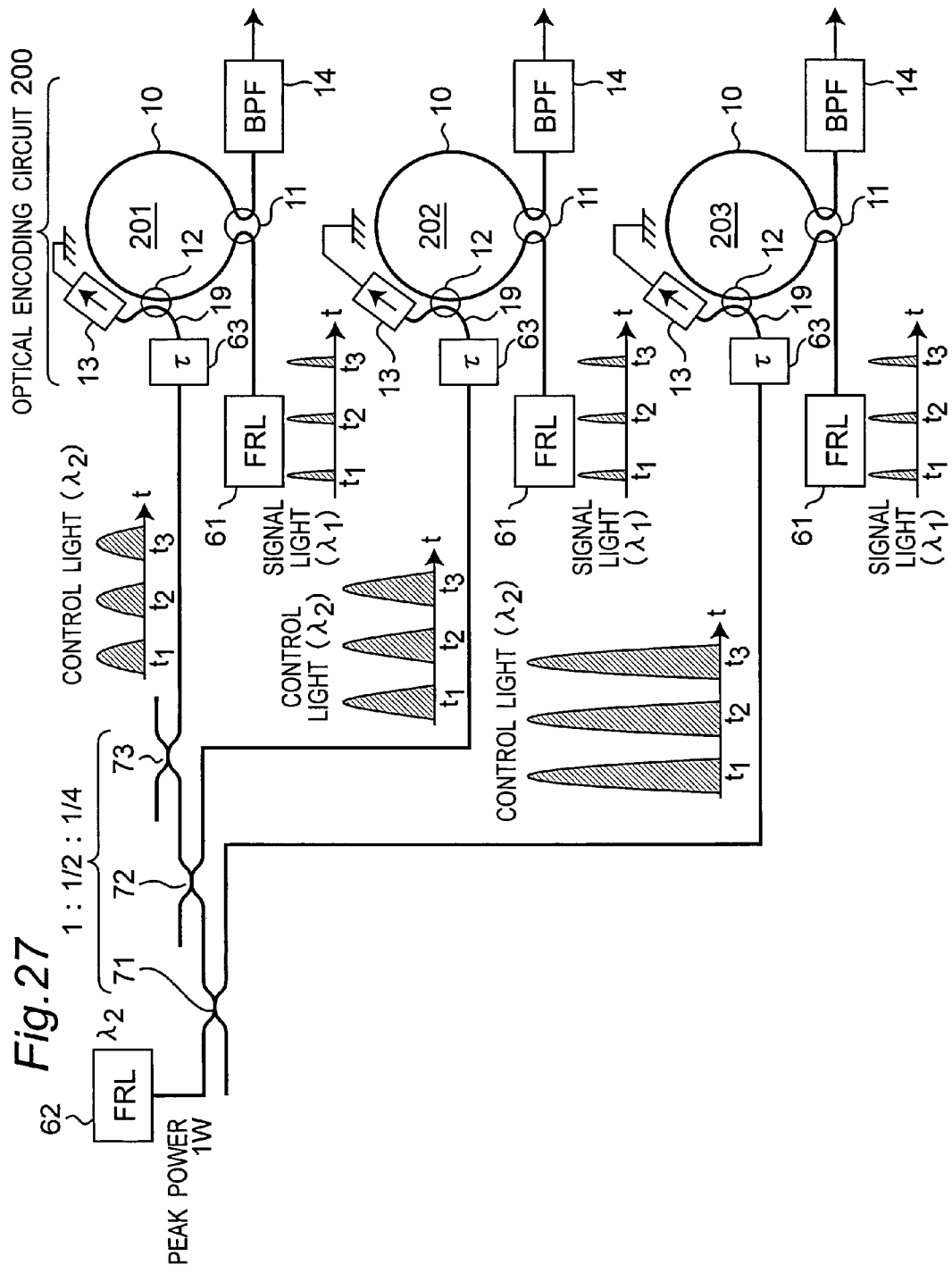
FIG. 27 is a block diagram showing a configuration of an experimental system for a second simulation according to the present preferred embodiment.

FIG. 27 is a block diagram showing a configuration of an experimental system for a second simulation according to the present preferred embodiment. In the second simulation of FIG. 27, as compared with the simulation of FIG. 25, levels of output signal light were measured, when control light with a peak power of 1 W generated by the fiber ring laser 62 was attenuated by three stages of 3 dB photo-couplers 71, 72 and 73 so as to generate control light having three optical signal levels, and generated control light are inputted to the optical encoders 201, 202 and 203, respectively. Assuming that the level of the control light from the photo-coupler 71 is 1, the level of the control light from the photo-coupler 72 is ½, and the level of the control light from the photo-coupler 73 is ¼.

Figure 28:
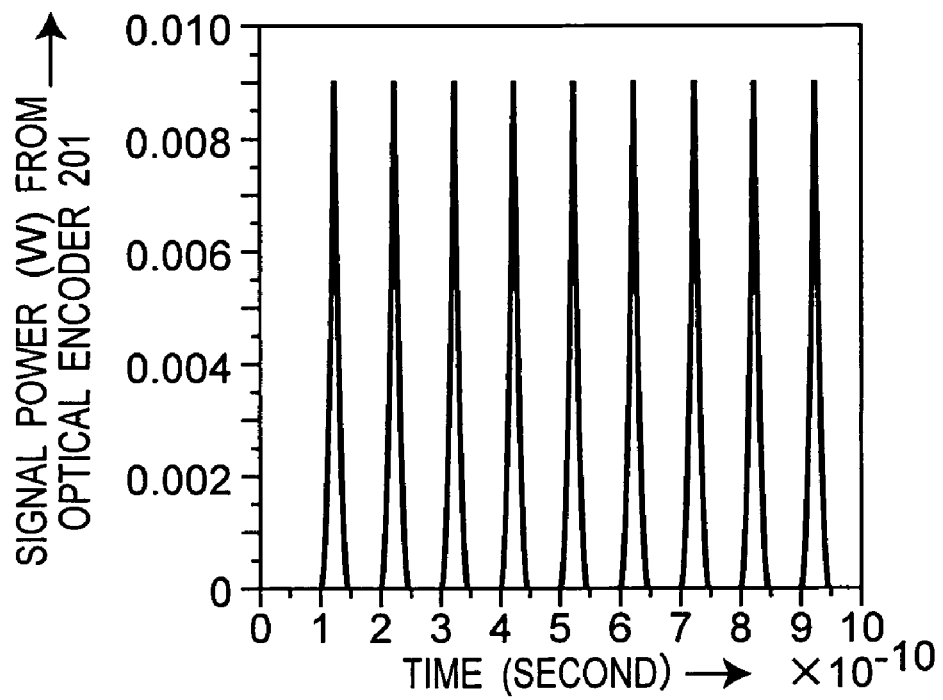
FIG. 28 is a waveform diagram showing a pulse waveform of signal power from the optical encoder 201, showing results of the second simulation of FIG. 27.
Figure 29:
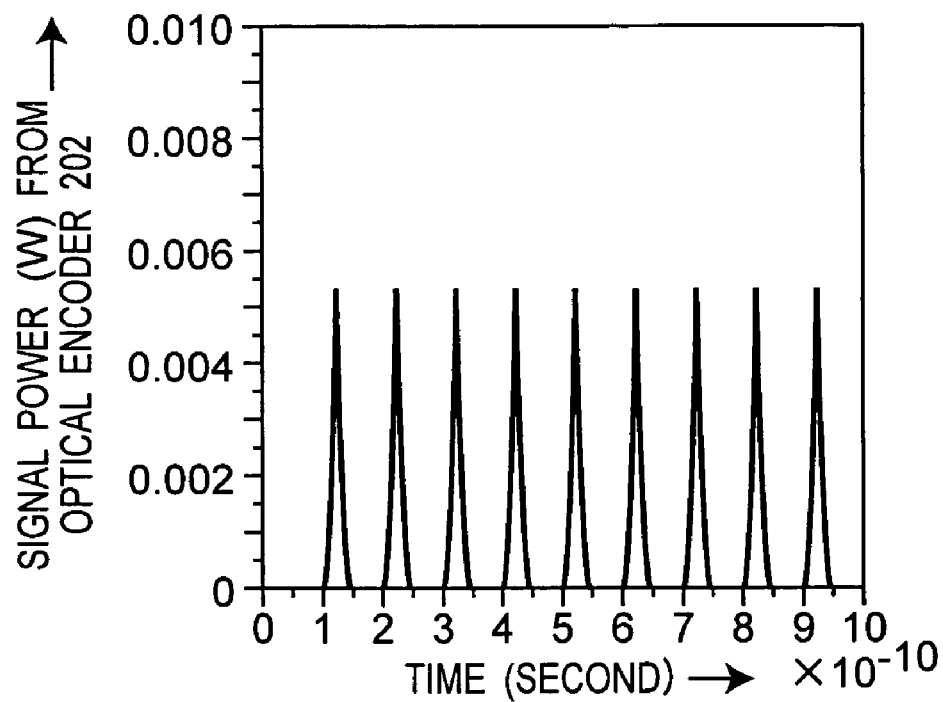
FIG. 29 is a waveform diagram showing a pulse waveform of signal power from the optical encoder 202, showing results of the second simulation of FIG. 27.
Figure 30:
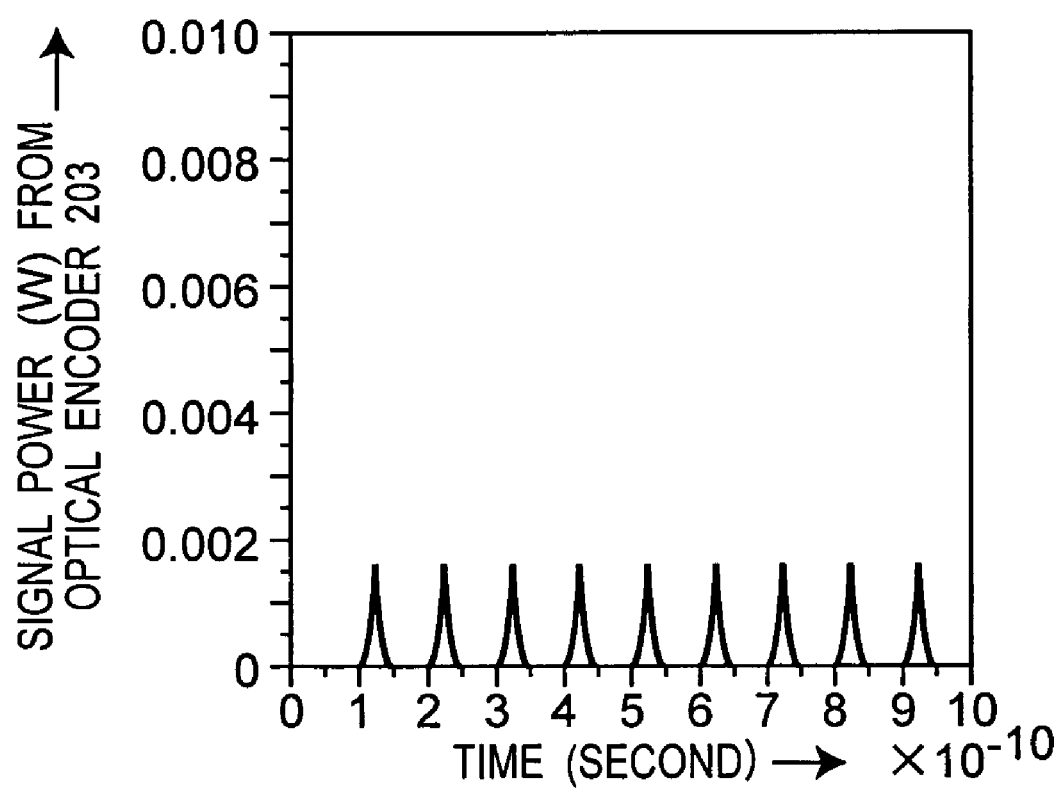
FIG. 30 is a waveform diagram showing a pulse waveform of signal power from the optical encoder 203, showing results of the second simulation of FIG. 27.

FIGS. 28 to 30 show results of the second simulation of FIG. 27. FIG. 28 is a waveform diagram showing a pulse waveform of the signal power from the optical encoder 201, FIG. 29 is a waveform diagram showing a pulse waveform of the signal power from the optical encoder 202, and FIG. 30 is a waveform diagram showing a pulse waveform of the signal power from the optical encoder 203. As apparent from FIGS. 28 to 30, the second simulation results in signal light encoded according to the levels of the control light inputted to the respective optical encoders 201, 202 and 203.

FOURTH IMPLEMENTAL EXAMPLE

Figure 31:
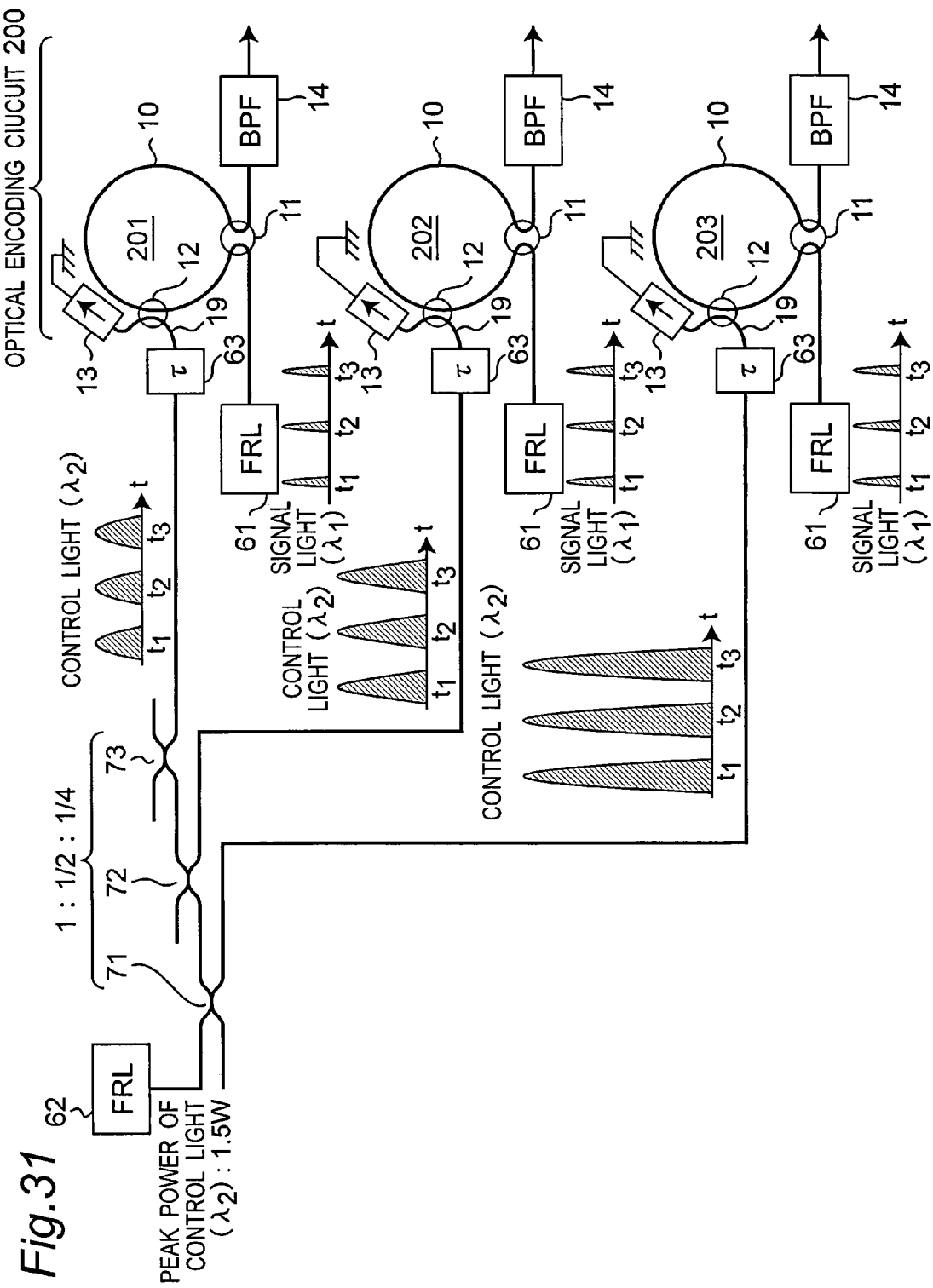
FIG. 31 is a block diagram showing a configuration of an experimental system for a third simulation according to the present preferred embodiment.

FIG. 31 is a block diagram showing a configuration of an experimental system for a third simulation according to the present preferred embodiment. In the third simulation of FIG. 31, as compared with the simulation of FIG. 27, the peak power of the control light generated by a fiber ring laser 62 is changed to 1.5 W, and the other configurations are the same as those of the second simulation.

Figure 32:
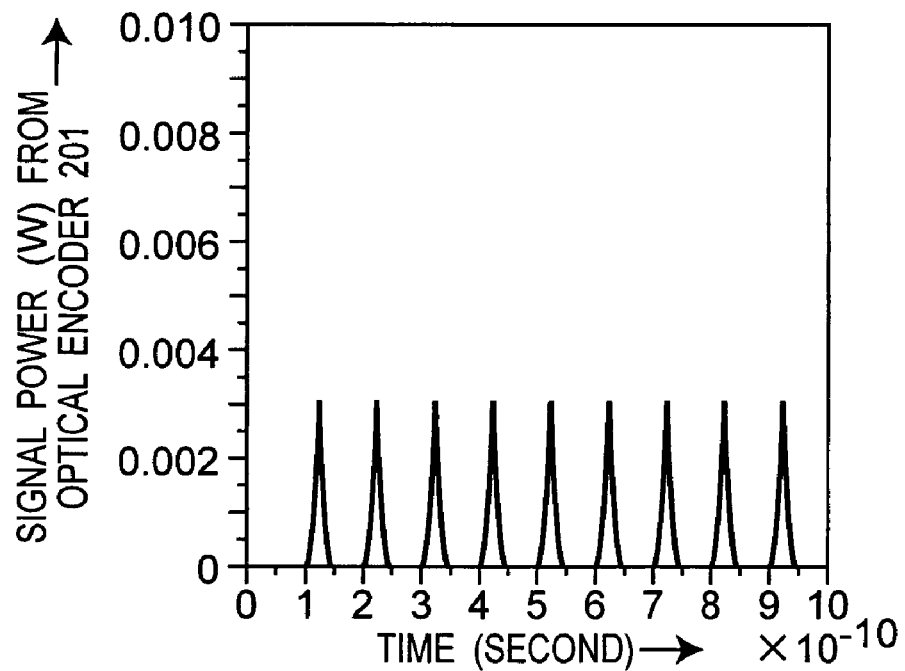
FIG. 32 is a waveform diagram showing a pulse waveform of signal power from the optical encoder 201, showing results of the third simulation of FIG. 31.
Figure 33:
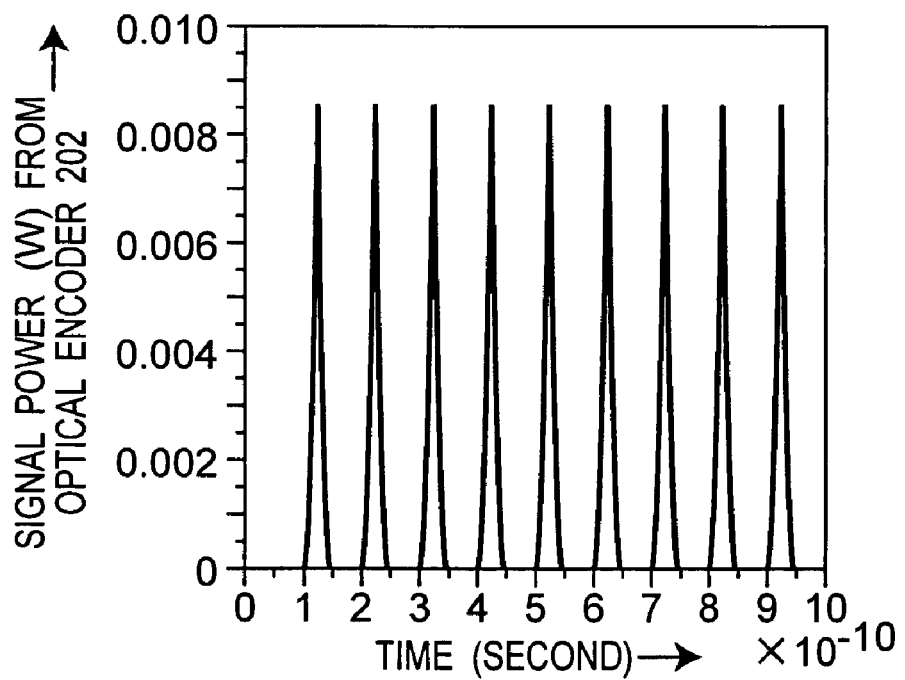
FIG. 33 is a waveform diagram showing a pulse waveform of signal power from the optical encoder 202, showing results of the third simulation of FIG. 31.
Figure 34:
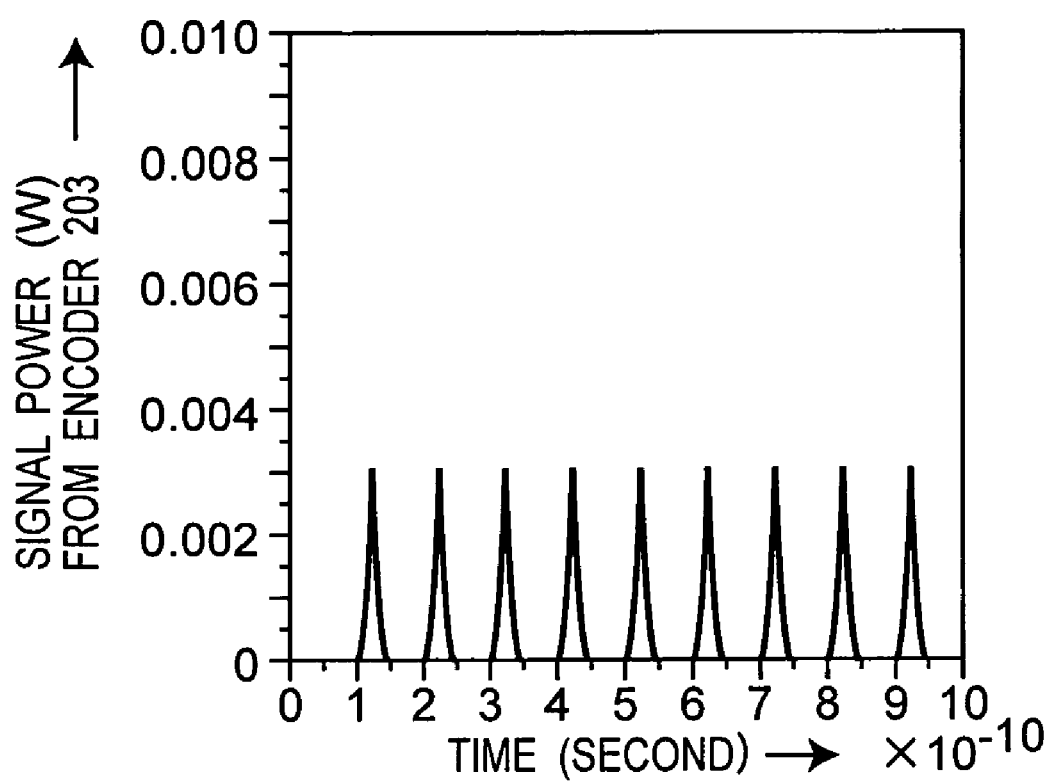
FIG. 34 is a waveform diagram showing a pulse waveform of signal power from the optical encoder 203, showing results of the third simulation of FIG. 31.

FIGS. 32 to 34 show the results of the third simulation of FIG. 31. FIG. 32 is a waveform diagram showing the pulse waveform of the signal power from the optical encoder 201, FIG. 33 is a waveform diagram showing the pulse waveform of the signal power from the optical encoder 202, and FIG. 34 is a waveform diagram showing the pulse waveform of the signal power from the optical encoder 203. As apparent from FIGS. 32 to 34, the third simulation of FIG. 31 results in signal light encoded according to the levels of the control light inputted to the respective optical encoders 201, 202 and 203. In addition, comparing the results of the simulations of FIGS. 28 to 30 and FIGS. 32 to 34, it can be seen that encoding was properly attained.

As described above, according to the optical A/D converter 100 according to the present preferred embodiment, sampled optical analog signals can be optically A/D-converted into optical digital signals, the upper limit of the sampling frequency can be the order of several hundreds GHz to several THz, in principle. Assuming that the limit of the sampling frequency of the A/D conversion for the electric circuit is several tens of GHz, it is possible to realize speeding-up by about two orders of magnitude. In addition, since the inputting and outputting are performed with optical signals, the optical A/D converter 100 is suitably applied to optical networks.

SECOND PREFERRED EMBODIMENT

There will be described a nonlinear optical loop mirror (referred to as a NOLM hereinafter) for use in the above mentioned optical A/D converter 100 and the like, hereinafter.

Figure 39:
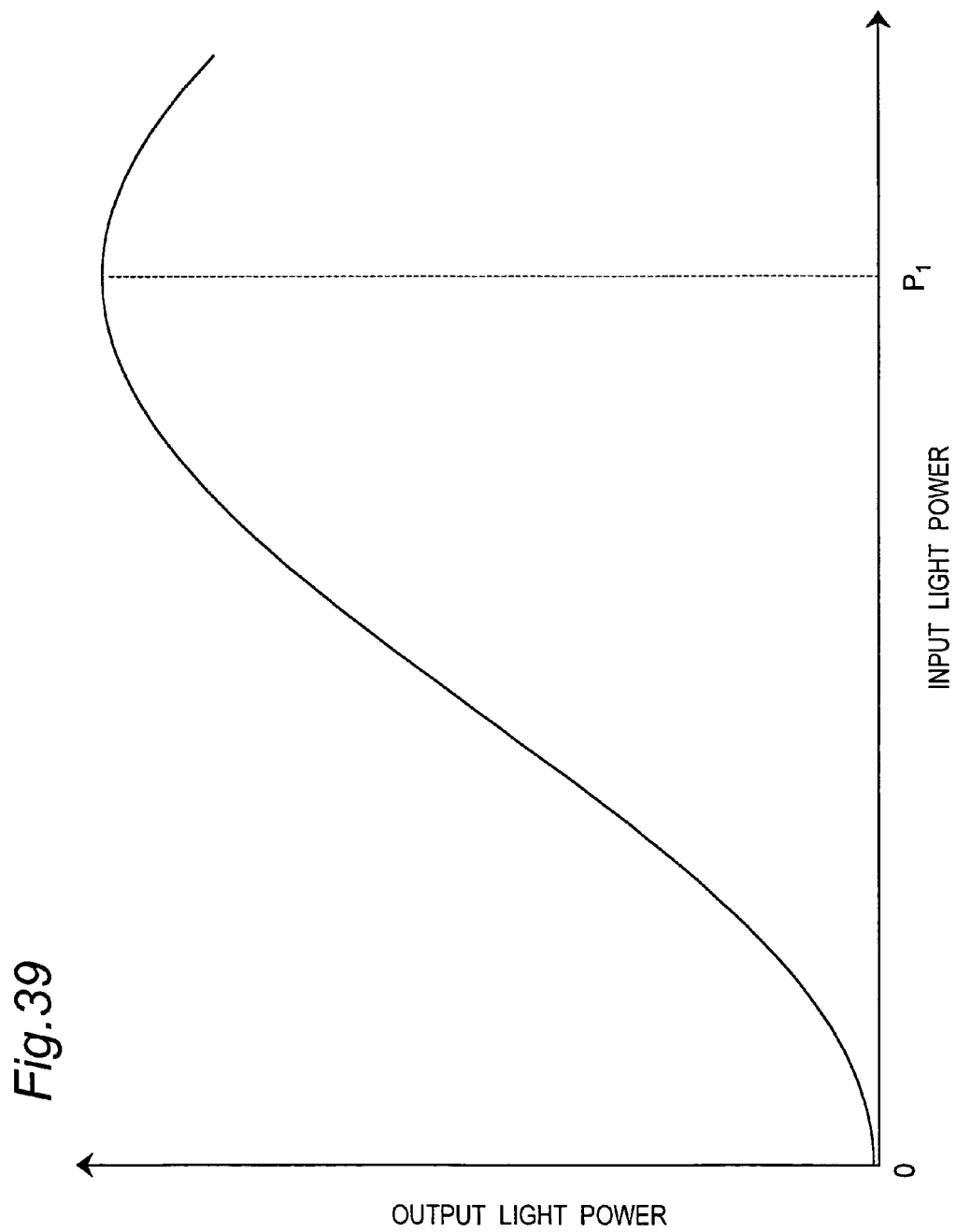
FIG. 39 is a diagram showing a relationship between an input signal light power and an output light power of the NOLM according to the prior art.

A conventionally-used NOLM has a relationship between the input light power and the output light power, as shown in FIG. 39. In this case, the terms of "the input light power" refer to the input power of signal light in case of an interference switch (self switch) which utilizes a phase shift caused by SPM (self-phase modulation) of an optical pulse, and the terms refer to the input power of control light in case of an interference switch (XPM switch) which utilizes a phase shift caused by XPM (cross-phase modulation) between the control light and the signal light. In addition, the terms of "the output light power" refers to the output optical power of signal light outputted from a transmission port of the NOLM. In addition, the control light and the signal light are in a form of pulses hereinafter, except when they are particularly specified.

When the input power is sufficiently small, the output power is also suppressed. On the other hand, when the input power is increased, the output power is also increased along a sinusoidal wave curve, and the output power reaches a peak value when the input power is $P_1$. By utilizing this transfer function, it is possible to realize a switch capable of controlling the reflection and transmission of signal light depending on presence and absence of the control light. Also, when a signal having amplitude fluctuated by transfer thereof is used as the control light, and switching of probe light is caused therefrom, even if the 0 level and the 1 level are fluctuated by noise, the fluctuation of the output is suppressed, which is expected to have a waveform reshaping effect. As described above, the NOLM having a transfer characteristic of a half-period sinusoidal-wave curve have been realized and utilized.

Such a NOLM was originated with our suggestion of an interference switch which utilizes a phase shift caused by SPM of optical pulses (See the non-patent document 3, for example) and an interference switch which utilizes a phase shift caused by XPM between control light and signal light (See the non-patent document 10, for example). In relation to them, there are a NOLM using a high-nonlinear fiber (See the patent document 2, for example), signal processing which utilizes FWM in a NOLM (See the patent document 3, for example), a NOLM capable of suppressing walk-off of control light and signal light for increasing the efficiency of XPM (See the patent document 5, the patent document 2, the patent document 6, the patent document 7, the patent document 8 and the patent document 10, for example) and a configuration in which fibers have a dispersion management configuration having an average dispersion of zero to reduce walk-off and also FWM which would cause reduction of the power of control light is suppressed to increase the efficiency of XPM (See the patent document 10, for example). In addition, various characteristics of NOLMs about polarization have been known (See the patent document 4 and the patent document 9, for example).

Figure 40:
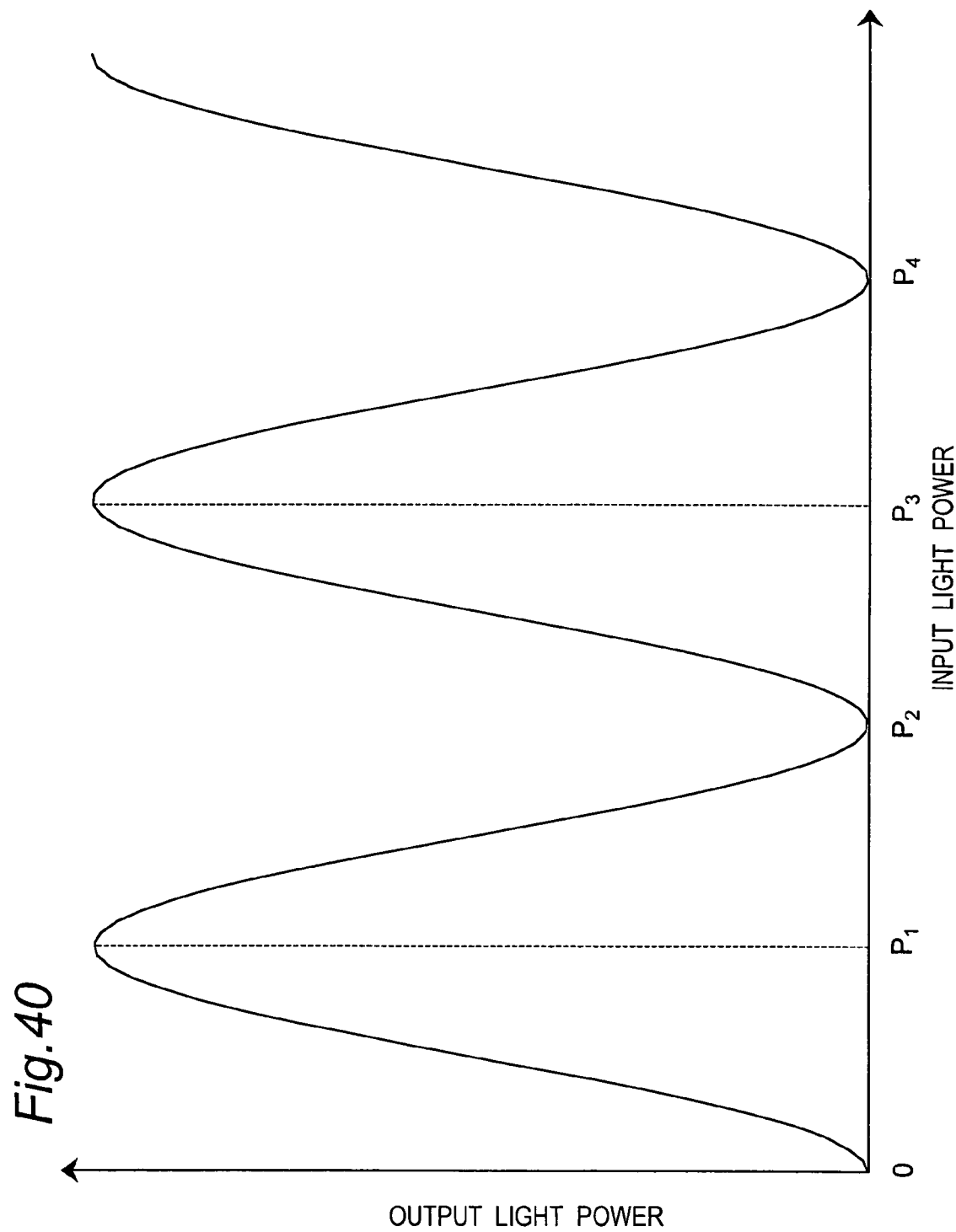
FIG. 40 is a diagram showing a relationship between the input light power and the output light power of the NOLM according to the second preferred embodiment of the present invention.

On the other hand, in an optical encoder and an optical threshold processor, a NOLM having a sinusoidal-wave curve transfer function with plural periods as shown in FIG. 40 is utilized, however, such a NOLM has not been realized in the prior art. As will be described later, a NOLM according to the preferred embodiment of the present invention has a transfer function with one or more periods and can exhibit characteristics suitable for various types of optical signal processing including optical A/D conversion.

Figure 38:
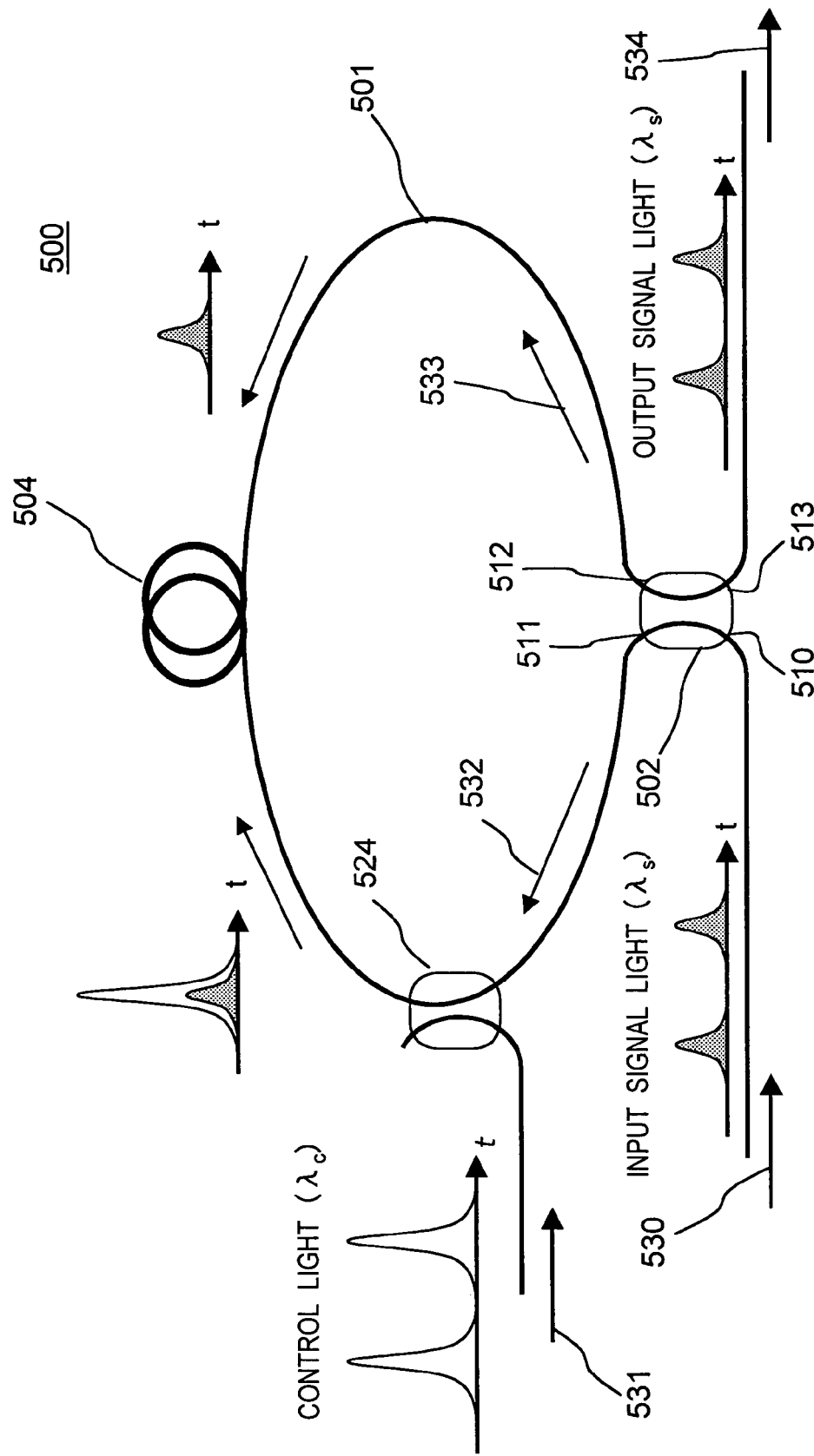
FIG. 38 is a diagram showing a configuration of a NOLM according to a prior art and a second preferred embodiment of the present invention.

FIG. 38 shows a configuration of a NOLM 500. The NOLM 500 is constituted by an optical fiber 501, a photo-coupler 502 connected thereto so as to branch an optical signal 530 inputted from an optical-signal input end 510 into two optical signals and output the two optical signals to both ends 511 and 512 of the optical fiber 501, respectively, and so as to branch and output optical signals outputted from the both ends 511 and 512 of the optical fiber 501 to the above mentioned optical-signal input end 510 and a further output end 513, a control-light inputting means 524 for inputting control light 531 to the above mentioned optical fiber 501, and a high nonlinear optical fiber (referred to as an HNLF hereinafter) 504 which is a nonlinear medium placed on the optical path of the above mentioned optical fiber 501. In this case, the input signal light 530 has an input power of Pin and a wavelength of $\lambda_S$, and the control light 531 has a peak power of PC, an average power of Pave and a wavelength of $\lambda_C$.

The signal light 530 with the input power of Pin which is inputted from the optical-signal input end 510 is branched into propagating light 532 which receives no phase change and propagating light 533 having a phase proceeding by $\pi/2$ through the photo-coupler 502, and these propagating lights 532 and 533 propagate in the clockwise and counter-clockwise directions on the figure, respectively, in the loop formed by the optical fiber 501. The propagating light 532 is coupled to the control light 531 having the peak power of $P_C$ and an average power of Pave which is inputted from the control-light inputting means 524, so that they are superimposed on each other over a possible largest range. Then, the propagating light 532 passes through the HNLF 504, which is a nonlinear medium having a nonlinearity coefficient of $\gamma$ and a length of "L", and is inputted to the photo-coupler 502 through the optical fiber end 512.

In addition, the propagating light 533 propagates in the loop formed by the fiber 501 in the counter-clockwise direction in the figure. Then, the propagating light 533 passes through the HNLF 504, and is inputted to the photo-coupler 502 through the optical fiber end 511 almost without being superimposed on the control light.

When there is no control light, there is hardly a difference between the phase shift which is generated in the light propagating in the clockwise direction and the phase shift which is generated in the light propagating in the counter-clockwise direction. Consequently, at the output end 513, the component of the propagating light 532 propagating in the clockwise direction which has received no phase shift and the component of the propagating light 533 propagating in the counter-clockwise direction which has received a phase shift of $\pi/2$ at the photo-coupler 502 twice are cancelled by each other, and this leads to an output of 0. In addition, at the input end 510, the respective components of the propagating lights 532 and 533, which have both received a phase shift of $\pi/2$ at the photo-coupler 502 a single time, are reinforced by each other, and therefore, returned light having substantially the same power as the input power is outputted to the input end 510 in the direction opposite to that of the input signal light 530.

When the control light 531 is present, the propagating light 532 propagates through the HNLF 504 while being superimposed on the control light 531, and this generates a phase shift in the propagating light 532 due to cross-phase modulation (XPM) depending on the power of the control light 531 which is caused between the propagating light 532 and the control light 531. On the other hand, the propagating light 533 hardly generates a phase shift caused by the XPM, and this causes a phase shift difference between the propagating light 532 and the propagating light 533, depending on the power of the control light 531. This enables controlling the power outputted to the input end 510 and another output end 513.

In this system, a power ratio of the output signal light 534 having an output power of Pout to the input signal light 530 having an input power of Pin is expressed by the following transfer function:

[Equation 5]

$$P\text{out}/P\text{in}=[1-\cos(\phi_{XPM})]/2 \qquad (5), \text{and}$$

[Equation 6]

$$\phi_{XPM}=2\gamma(Pc-P\text{ave})L \qquad (6).$$

In this case, in order to realize a transfer function having one or more periods, and more preferably, two or more periods, it is necessary that the phase shift difference $\phi_{XPM}=2\gamma(Pc-Pave)L$ in the signal light due to the XPM generated between the control light and the signal lights is at least $2\pi$ (corresponding to a single period and $P_2$ in FIG. 40) or $4\pi$ (corresponding to two periods and $P_4$ in FIG. 40). Namely, it is preferable that the cross-phase modulation (XPM) which is caused between the two branched optical signals and the above mentioned control signal generates a phase shift difference of $2\pi$ or more between these optical signals.

Therefore, the phase shift can be increased by efficiently generating XPM with the following methods.

(i) some or all of the nonlinearity and the distance of the HNLF 504 which is a nonlinear medium and the power of the control light 531 are increased.

(ii) the polarizations of the control light 531 and the signal light 530 are optimized (the efficiency of occurrence of XPM is maximized).

(iii) in order to prevent the wavelength difference between the control light 531 and the signal light 530 from generating a group delay (referred to as walk-off hereinafter) due to dispersion, the dispersion value of the HNLF 504 or the arrangement of the wavelengths of the signal light 530 and the control light 531 with respect to the given dispersion value is changed to suppress the walk-off.

(iv) the positions of the control light 531 and the signal light 530 in the time axis are optimized with considering the walk-off.

In addition, in order to realize the above mentioned (iii), it is possible to employ a method of using a fiber having an arbitrary length and a dispersion value of zero (a dispersion flat fiber; DFF) or a method of using a conventional dispersion shift fiber (DSF) having a constant dispersion slope in the fiber 504 and setting the zero-dispersion wavelength $\lambda_O$ of the fiber (DSF) between the wavelength $\lambda_C$ of the control light 531 and the wavelength $\lambda_S$ of the signal light 530. In the case of the latter method, when the zero-dispersion wavelength of the fiber (DSF) is fluctuated in the longitudinal direction, this will cause the walk-off proportional to the product of the wavelength difference $\Delta\lambda$ between the wavelength $\lambda_C$ and the wavelength $\lambda_S$ and the dispersion value and, therefore, it is necessary to reduce the product to the extent that the occurrence of the walk-off is not problematic. In this case, it is preferable that the absolute value of the product of the wavelength difference between the above mentioned control light signal and the above mentioned optical signal and the dispersion value of the above mentioned nonlinear medium is equal to or smaller than a value which suppresses the walk-off and also causes the phase shift difference of $2\pi$ or more between the two branched optical signals, where the phase shift is caused by cross-phase modulation (XPM) which occurs among these optical signals and the control light signal.

In any of the cases, the wavelength $\lambda_C$ is made closer to the zero-dispersion wavelength $\lambda_O$ and the dispersion value for the wavelength $\lambda_C$ becomes closer to 0. In this case, a parametric gain is caused in the signal light 530 due to degenerate four-wave mixing (FWM) caused by the control light 531 which serves as pump light. Due to this phenomenon, the signal light 530 is amplified as it propagates in the clockwise direction along with the control light 531, while the signal light 530 propagating solo in the counter-clockwise direction receives no gain, and this leads to a state where the powers of the propagating lights 532 and 533 are unbalanced. When such unbalance becomes prominent, the output powers obtained at the input powers $P_2$ and $P_4$ in FIG. 40 will not become sufficiently smaller, and this will cause serious problems.

The important point of the transfer function of FIG. 40 is that the output powers with respect to the input powers $P_2$ and $P_4$ are equal to or smaller than an optimally-set threshold value, assuming that the peak value (the output power value with respect to the input powers $P_1$ and $P_3$) is 1.

Namely, by applying a previously-set threshold value to the output signal of the NOLM, it is possible to realize binary signal processing which is basic digital information processing. For example, in the case where the threshold value is set to 0.5, when the above mentioned parametric processing causes a gain larger than 3 dB with respect to input powers of $P_2$ and $P_4$, this causes light which is not intended to be transmitted due to phase interference to be transmitted since its power exceeds 0.5, which makes it impossible to perform binary signal processing. Generally speaking, it is necessary that an inequality of G<2Tth+1 holds with respect to the threshold value Tth (0<Tth<1; the ratio between the output power at $P_2$ and $P_4$ and the output power at $P_1$ and $P_3$) and the parametric gain G (>1; the ratio between the input power and the output power of propagating light 532 in the nonlinear medium). This enables suppressing the output power with respect to the input powers $P_2$ and $P_2$ to be equal to or smaller than a desired threshold value, so as to realize optical binary signal processing including quantization and encoding processings for optical A/D conversion. This fact has not been known, although it is a significantly important knowledge for realizing a NOLM having a transfer function of FIG. 40.

Therefore, in order to suppress the parametric gain that the signal light 530 propagating in the same direction as that of the control light 531 receives from the control light 531 to be equal to or smaller than a predetermined value (for example, 3 dB), the following method will be suggested in the preferred embodiment of the present invention. The non-patent document 5 describes that, when continuous light having a frequency of $\omega_C$ which is a linearly-polarized light is used as pump light in an optical fiber, generally speaking, the degenerate parametric gain "G" that signal light having a frequency of $\omega_S$ and propagating in the same direction at the same polarization state as when the pump light receives is expressed by the following equation. The terms of "pump light" used in the discussion corresponds to the control light in the NOLM according to the preferred embodiment of the present invention.

[Equation 7]

$$G(z)=1+(\gamma^2 P_o^2/g^2)\sin h^2(gz) \quad (7),$$

[Equation 8]

$$g^2=\gamma_2 P_o^2-\kappa_2/4 \quad (8),$$

[Equation 9]

$$\kappa=\Delta k+2\gamma P_O \quad (9), \text{ and}$$

[Equation 10]

$$\Delta k=\Delta\omega^2 k_O'' \quad (10).$$

In these equations, z, $\gamma$, $P_O$, $k_O''$ and $\Delta\omega$ designate the fiber length [m], the nonlinearity constant [$W^{-1}m^{-1}$] of the fiber, the power [W] of the pump light, the dispersion value [$s^2/m$] of the fiber, and the frequency difference [$s^{-1}$] between the pump light and the signal light, respectively, and the effects of dispersion and loss of four and larger orders in the fiber are neglected. By giving these values, the parametric gain that the signal light receives can be uniquely determined from the equations (7) to (10). For example, in the case of z=0.32 [km], $\gamma$=17.5 [$W^{-1}$ $km^{-1}$] and $P_O$=2 [W], the gain change with respect to the value of $\Delta\omega$ will be considered. Further, it is assumed that a fiber dispersion value D [ps/nm] which satisfies a relationship of $k_O''$=−1.284D with respect to k"[$ps^2/km$] is employed as the fiber dispersion value, and the frequency difference $\Delta\omega$ can be expressed by $\Delta\omega=2\pi c\Delta\lambda/\lambda$ using the wavelength difference $\Delta\lambda=|\lambda_C-\lambda_S|$ between the pump light and the signal light. Further, c=2.998*$10^8$ [m/s] and $\lambda$=1.55 [$\mu$m] designate the velocity of light in a vacuum and the wavelength of carrier wave. First, FIG. 41 shows the parametric gain obtained from the calculations of the equations (7) to (10), in the case where the wavelength difference $\Delta\lambda$ between the pump light and the signal light is set to 10 nm and the fiber dispersion value $D(\lambda_C)$ for the wavelength $\lambda_C$ of the pump light is changed.

Figure 41:
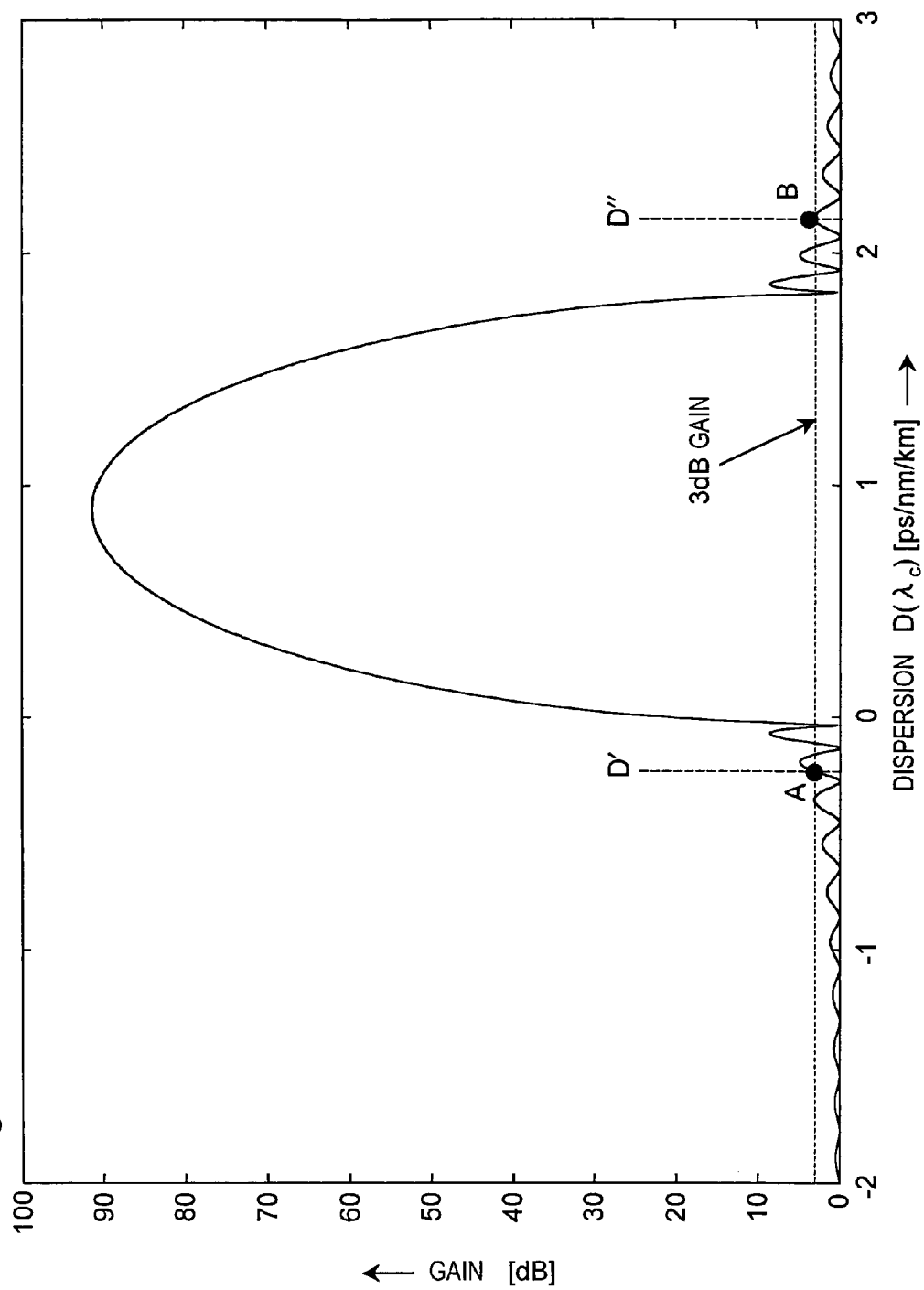
FIG. 41 is a diagram showing a relationship between a parametric gain and a dispersion value D ($\lambda_C$) of an optical fiber.

Referring to FIG. 41, a large gain observed at D≅1 [ps/nm/km] is known as a modulation instability phenomenon which occurs in an anomalous dispersion region. For example, in order to suppress the parametric gain to be equal to or smaller than 3 dB, it is necessary that the dispersion value is set to be smaller than the dispersion value D' at a point "A" in the normal dispersion region or larger than the dispersion value D" at a point "B" in the anomalous dispersion region. In FIG. 41, generally speaking, |D'|<|D"|, and it is preferable to utilize the normal dispersion value D' having a smaller absolute value, in view of the reduction of walk-off which is proportional to the absolute value of the dispersion value. In addition, when pulses having large energy propagate through an anomalous dispersion fiber, this will excite higher-order solutions so as to degrade the waveform of the control light, which may result in degradation of the efficiency of XPM. Accordingly, in view of this point, it is not preferable to use the anomalous dispersion value D", as compared with the use of D'. However, if the walk-off and the waveform degradation due to soliton excitation are not problematic, it is also possible to set the fiber dispersion value to be anomalous dispersion, under the condition of D>D" in FIG. 41.

Figure 42:
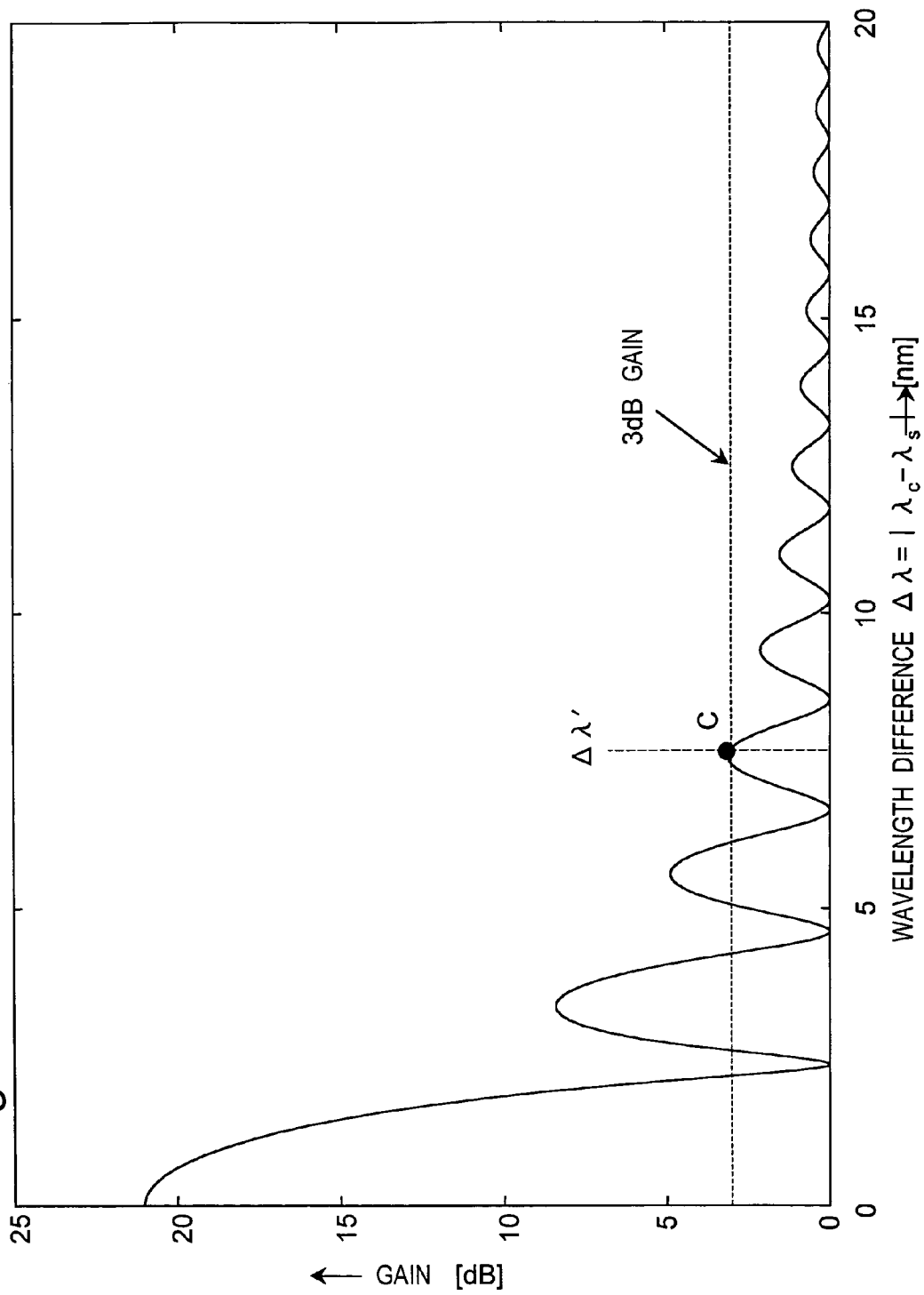
FIG. 42 is a diagram showing the relationship between the parametric gain and the wavelength difference $\Delta\lambda$ between the signal light and the control light.

Next, FIG. 42 shows the parametric gain obtained from the equations (7) to (10), in the case where the dispersion value "D" is set to −0.62 [ps/nm/km] and the wavelength difference $\Delta\lambda=|\lambda_C-\lambda_S|$ between the pump light and the signal light is changed. FIG. 42 shows that the parametric gain can be suppressed by increasing $\Delta\lambda$. When it is desired to minimize the influence of the dispersion such as walk-off and waveform expansion under the condition where the parametric gain should be set to be equal to or smaller than 3 dB, the wavelength difference between the pump light and the signal light can be set to a value of $\Delta\lambda'$ at a point "C" in FIG. 42.

There has been described that, in order to suppress the parametric gain to be equal to or smaller than a certain value, it is effective to set the fiber dispersion value for the wavelength of the pump light to a value smaller than a minimum dispersion value (corresponding to the point "A" of FIG. 41) which can provide a parametric gain equal to or larger than the certain value or larger than a maximum dispersion value (corresponding to the point "B" of FIG. 41) which can provide a parametric gain equal to or larger than the certain value, and it is effective to set the wavelength difference between the pump light and the signal light to be larger than a maximum wavelength difference (corresponding to the point "C" of FIG. 42) which can provide a parametric gain equal to or larger than the certain value. Also, the points A, B and C of FIGS. 41 and 42 may be provided on envelopes in the respective graphs. Namely, it is effective to satisfy any one of the following conditions.

(a) The dispersion value of the nonlinear medium is equal to or smaller than a minimum dispersion value which causes the parametric gain that occurs between the above mentioned optical signal and the above mentioned control light signal to be equal to or larger than a predetermined value.

(b). The dispersion value of the nonlinear medium is equal to or larger than a maximum dispersion value which causes the parametric gain that occurs between the above mentioned optical signal and the above mentioned control light signal to be equal to or larger than a predetermined value.

In addition, it is preferable that the wavelength difference between the above mentioned control light signal and the above mentioned input optical signal is larger than a maximum wavelength difference which causes a parametric gain equal to or larger than a predetermined value, between the above mentioned optical signal and the above mentioned control light signal.

Considering the parametric processing which occurs between the control light 531 and the signal light 530 (propagating light 532) which propagate in the same direction in the NOLM 500 of FIG. 38 being studied, errors may be induced in the result of the calculations of the equations (7) to (10), due to various factors such as the fact that the control light and the signal light are pulses having power which change depending on time, not continuous light having a single frequency, and the fact that the efficiency of the FWM between the control light and the signal light pulses is degraded due to walk-off and disagreement of the polarization among the pulses. However, the dependence of the parametric gain shown in FIGS. 41 and 42 on various types of parameters can be experimentally determined even with respect to pulses in the NOLM 500, which can provide concrete instructions on how to set the dispersion value or the wavelength difference.

Figure 43:
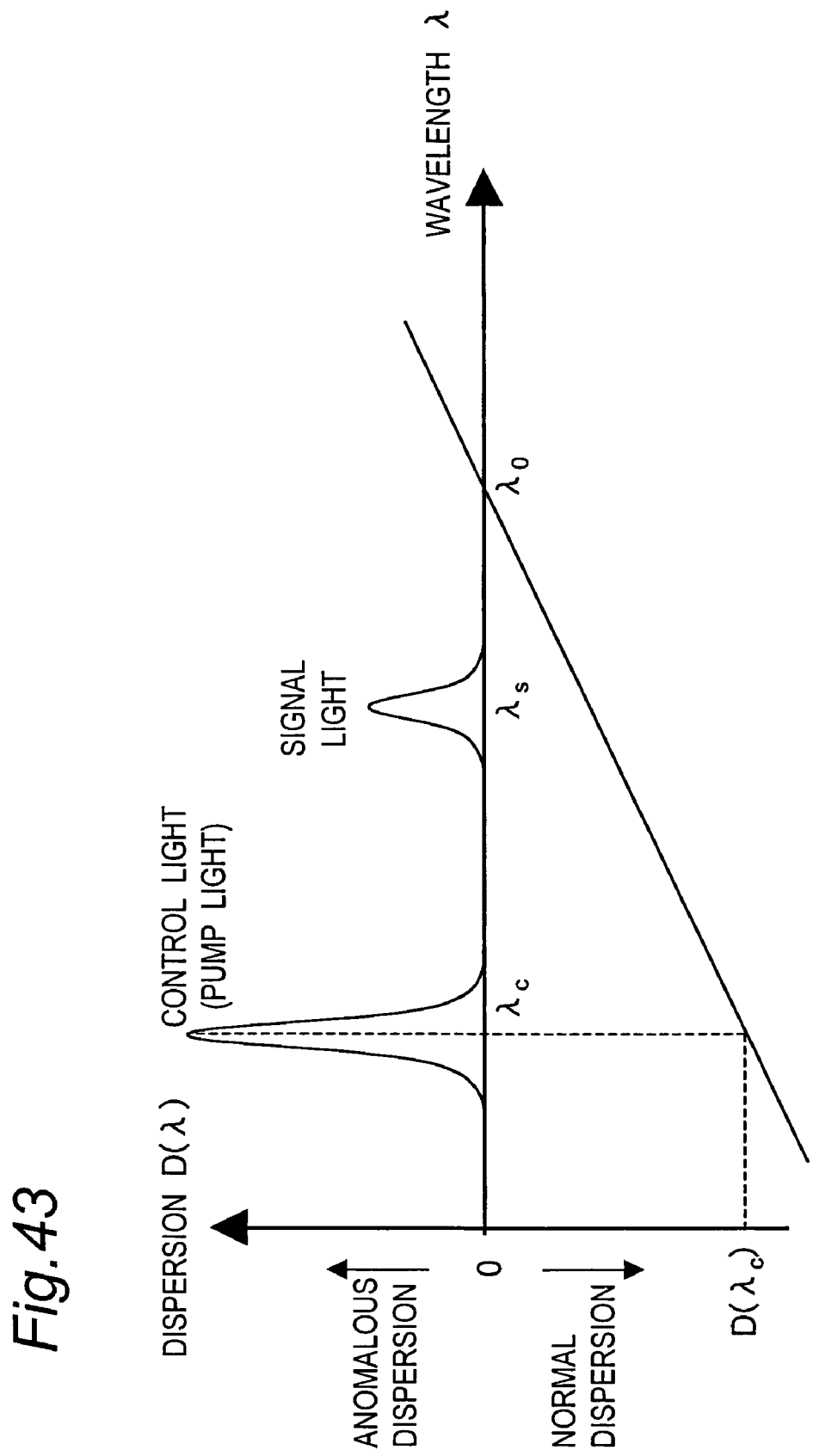
FIG. 43 is a diagram showing a relationship between the dispersion value of the optical fiber and an arrangement of wavelengths of the signal light and the control light (in the case of $dD/d\lambda>0$).
Figure 44:
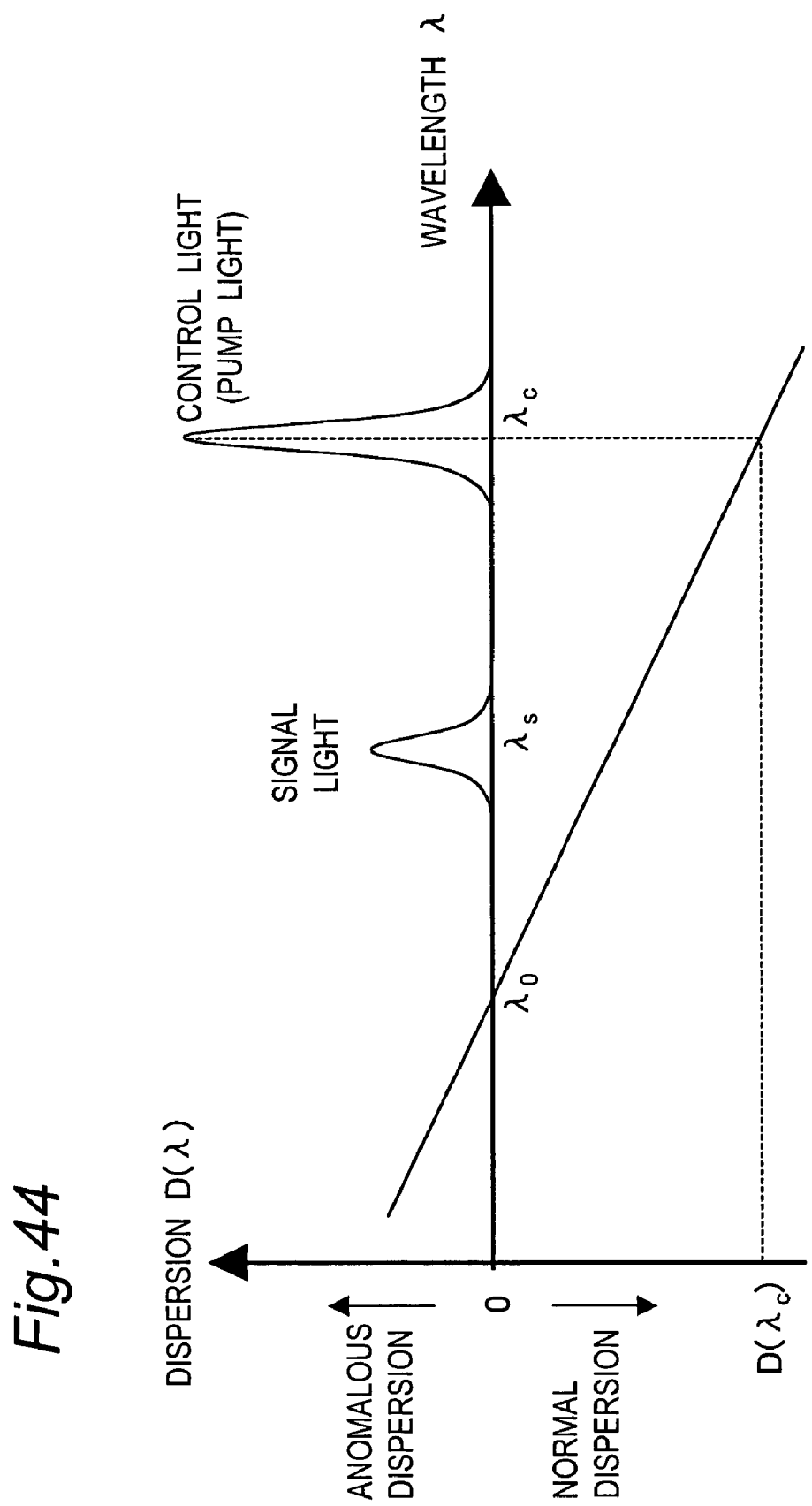
FIG. 44 is a diagram showing a relationship between the dispersion value of the optical fiber and the arrangement of the wavelengths of the signal light and the control light (in the case of $dD/d\lambda<0$).

FIGS. 43 and 44 show a fiber wavelength dispersion characteristic and arrangement of the wavelengths of control light and signal light which can effectively suppress the parametric gain which is caused between control light 531 and signal light 530 (propagating light 532) propagating in the same direction in the NOLM 500. FIG. 43 shows a fiber wavelength dispersion characteristic in the case of $dD/d\lambda>0$, and a relationship of $\lambda_C>\lambda_S>\lambda_O$ holds. Further, in FIGS. 41 and 42, it is assumed that the relationships of $D(\lambda_C)<D'$ and $\Delta\lambda=|\lambda_C-\lambda_S|>\Delta\lambda'$ are satisfied with respect to the dispersion value $D'$ and the wavelength difference $\Delta\lambda'$ of this case. FIG. 44 shows a case of $dD/d\lambda<0$, and the other conditions are the same as those of FIG. 43. In addition, in the case where the dispersion value "D" of the above mentioned nonlinear medium differentiated with respect to the wavelength $\lambda$ is negative ($dD/d\lambda<0$) with respect to the wavelengths of the above mentioned input optical signal and the above mentioned control light signal, it is possible to satisfy a relationship of $\lambda_O<\lambda_S<\lambda_C$.

As the normal dispersion value D ($\lambda_C(<0)$) for the wavelength $\lambda_C$ of the control light 531 which is pump light and the wavelength difference $\Delta\lambda$ between the control light 531 and the signal light 530 are increased, the parametric gain can be decreased. However, when the normal dispersion value D and the wavelength difference $\Delta\lambda$ are excessively increased, this will cause an increase of walk-off and degradation of the efficiency of XPM due to distortion of the waveforms of respective pulses caused by dispersion, which is not preferable. Accordingly, by designing the NOLM for optimally setting the walk-off and the time difference between the control light 531 and the signal light 530 or their polarizations such that the parametric gain that the signal light 530 receives is equal to or smaller than a certain value and also the reduction of the efficiency of XPM is prevented, it is possible to realize a NOLM having a transfer function of FIG. 40. Further, since the walk-off is proportional to the absolute value of the product of the wavelength difference $\Delta\lambda$ between the control light 531 and the signal light 530 and the dispersion value D ($\lambda_C$) for the wavelength $\lambda_C$ of the control light 531, it is preferable to reduce the product. Also, even if the wavelengths of the control light and the signal light are interchanged in FIGS. 43 and 44, this will cause no problem as long as a relationship of $D(\lambda_C)<D'$ is satisfied. Further, by structuring the NOLM such that the polarizations of the fibers and the nonlinear medium in the loop or the states thereof are always maintained, it is possible to efficiently generate XPM. Concretely speaking, the control light and the signal light can be made substantially identical linearly-polarized light, by using polarization maintenance fibers. In this case, the gain of the signal light caused by the parametric processing is also increased, but the previously-described designing method can be employed in view of this point.

Figure 45:
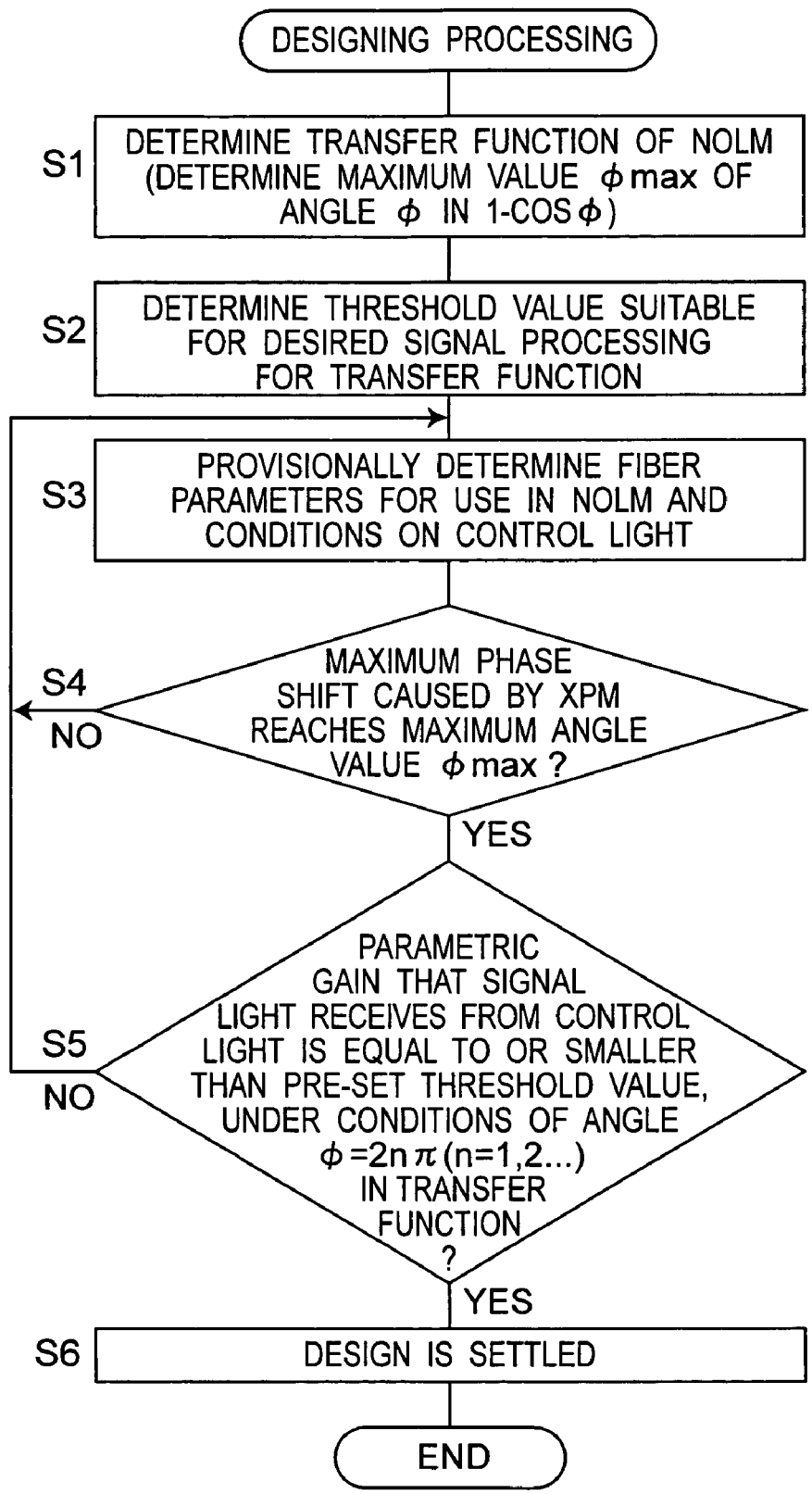
FIG. 45 is a flow chart showing a procedure of designing processing of the NOLM according to the second preferred embodiment of the present invention.

A method for designing a NOLM having a transfer function of FIG. 40 has been described, and FIG. 45 shows the method briefly. The NOLM according to the preferred embodiment of the present invention is designed according to the procedure of designing processing shown in a flow chart of FIG. 45.

Referring to FIG. 45, first of all, at step S1, the transfer function of the NOLM is determined, namely, the maximum value $\phi$max of the angle $\phi$ in $1-\cos\phi$ is determined. Next, at step S2, a threshold value suitable for desired signal processing is determined for the transfer function and, at step S3, fiber parameters for use in the NOLM and the conditions on the control light are provisionally determined. Then, it is determined at step S4 whether or not the maximum phase shift value caused by XPM reaches the maximum angle φmax. If YES at step S4, the control flow goes to step S5. On the other hand, if NO at the determination of step S4, the control flow returns to step S3. Further, at step S5, it is determined whether or not the parametric gain that the signal light receives from control light is equal to or smaller than the pre-set threshold value, under conditions of the angle φ is 2nπ (n=1, 2, . . . ) in the transfer characteristic. If YES at step S5, the control flow goes to step S6. On the other hand, if NO at the determination of step S5, the control flow returns to step S3. Further, at step S6, the design is settled under the current conditions, and the designing processing ends.

With the preferred embodiment of the present invention, there is realized a NOLM capable of providing a controllable range for the output light power exceeding a single period and also suppressing the output light power at phase differences of 2nπ (n=1, 2, . . . ) to be equal to or smaller than a threshold value required for optical signal processing (for example, quantization and encoding processings for optical analog-to-digital conversion), with respect to the peak power. One of applications thereof is optical A/D conversion. As the other possible aspects, the NOLM may be applied to decoding for multi-level communication such as QAM, PSK, ASK. From a different viewpoint, it is possible to realize a switching device which actively utilizes the parametric gain that signal light receives from control light, rather than switching which utilizes XPM in a NOLM. In this case, it is preferable that the power value of the above mentioned output optical signal when the phase shift difference caused between the two branched optical signals is 2nπ (where "n" is an integer equal to or larger than 1), is processed as "0" in optical analog-to-digital conversion processing, and the above mentioned phase shift difference is caused by the cross-phase modulation (XPM) between these optical signals and the control light signal.

FIFTH IMPLEMENTAL EXAMPLE

Figure 46:
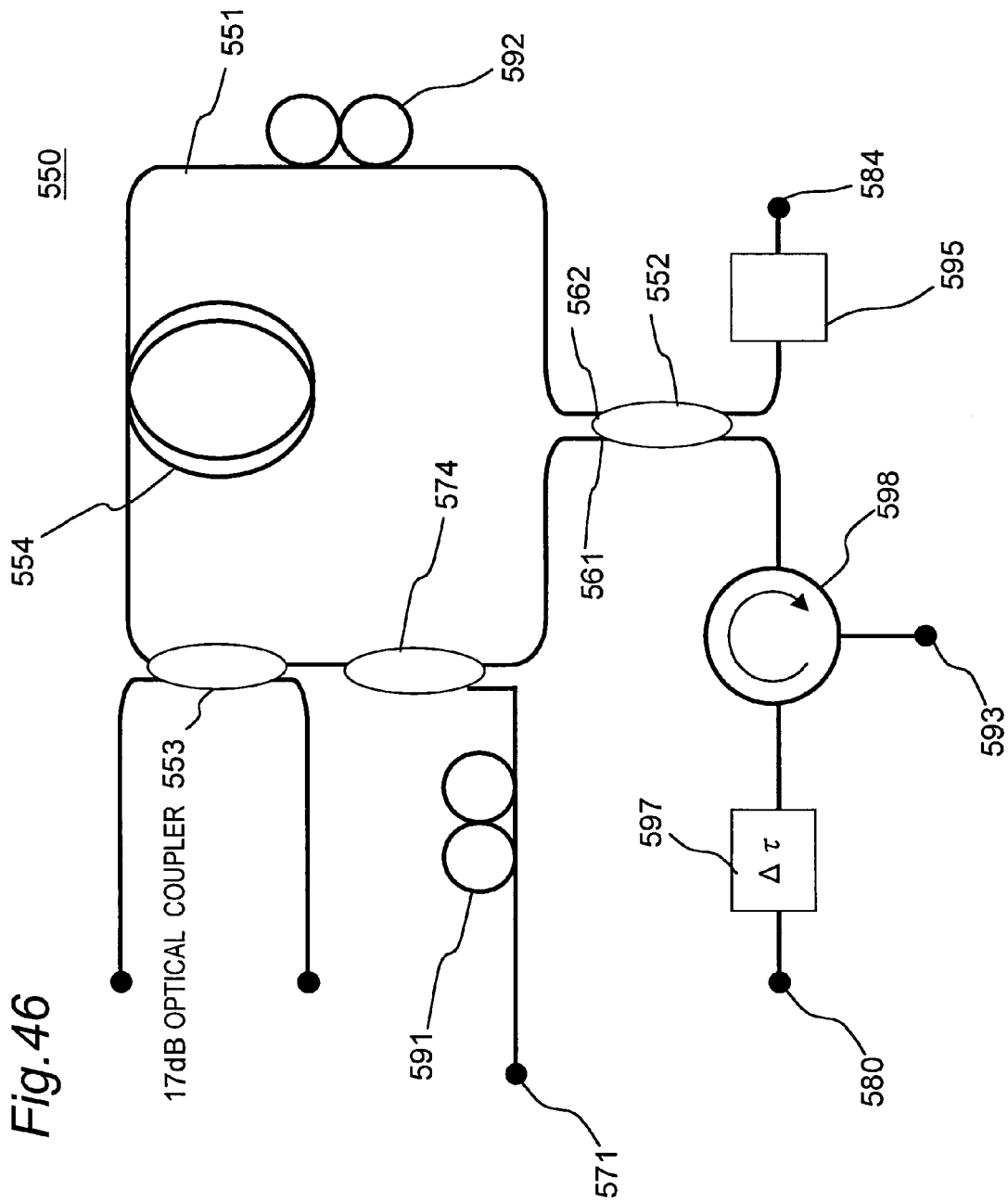
FIG. 46 is a diagram showing one implemental example of the NOLM according to the second preferred embodiment of the present invention.

FIG. 46 shows an aspect of a NOLM 550 according to the preferred embodiment of the present invention. On the assumption that signal processing is performed in the case where the threshold value for the transfer function of the NOLM 550 is set to 0.5, there will be described later an implemental example of the NOLM adaptable thereto.

In the NOLM 550, signal light is inputted to an input end 580, and the signal light is branched into two signal lights by a 3 dB-coupler 552. The two signal lights propagate through an optical fiber 551 in the opposite directions, respectively. The signal light propagating in the clockwise direction is combined with control light inputted from a control-light input end 571 via a WDM coupler 574, so that they are superimposed on each other over a wide range, and then the signal light propagates through an HNLF (high nonlinear fiber) 554 via a 17 dB coupler 553. The HNLF 554 used in the NOLM 550 has a fiber length of 380 m, a nonlinearity constant of 17.5 $W^{-1} km^{-1}$, a zero-dispersion wavelength of 1575 nm, a dispersion slope of 0.027 ps/nm, and a fiber loss of 0.67 dB/km. In addition, the control light having a train of pulses having a width of about 15 ps has a wavelength of 1552 nm, the signal light having a train of pulses having a width of about 3.4 ps has a wavelength of 1568 nm, each of these pulse trains has a repetition frequency of 10 GHz, and the wavelength difference between the control light and the signal light is 16 nm. In addition, a dispersion value of the HNLF 554 is −0.62 ps/nm/km, namely a normal dispersion value, for the wavelength of the control light. The dispersion value of the HNLF 554 is a normal dispersion value in the above mentioned example, however, it may be an anomalous dispersion value.

In order to generate an XPM efficiently, the amount of the time delay of the signal light and the polarization of the control light are set to optimal states. The concrete contents of the stated is described below.

(A) Adjustment of the polarization of the signal light: First of all, the signal light is entered into the NOLM 550 through the input end 580, at a state where the control light does not enter the NOLM 550, and a polarization controller (PC) 592 of the loop is operated so as to create such a state that the signal light is totally reflected back to the input end. Then, the signal light is detected using an optical circulator 598 at a reflected-light photo-detection end 593. Concretely speaking, the polarization controller (PC) 592 in the loop is adjusted so that the signal lights propagating in the clockwise direction and the counter-clockwise direction which are resulted from branching by the 3 dB coupler are identically polarized when the signal lights finish the propagation through the loop and reach the terminals 562 and 561, respectively. At this state, the NOLM 550 works as a loop mirror having a reflectivity of 100% and a transmittance of 0%.

(B) Adjustment of the delay line: Then, the control light is entered into the NOLM 550 and the power of the control light is gradually increased. The amount of delay at a delay line 597 is changed near a first leading edge of the transfer characteristic of the NOLM 550 (near a point at which the phase shift $\phi_{XPM}$ of the signal light caused by XPM is 0), so that the output power of the signal light becomes a maximum value. Then, the power of the control light is further increased until it reaches a first valley ($\phi_{XPM}=2\pi$) of the transfer characteristic. At this state, the amount of delay is finely adjusted so that the power of the signal light at the output end 584 becomes a minimum value. By causing the pulses of the signal light and the pulses of the control light propagating through the HNLF 554 to be superimposed on each other over a wider range as described above, it is possible to efficiently generate an XPM.

(C) Adjustment of the polarization of the control light: The power of the control light is increased near the first leading edge of the transfer characteristic of the NOLM 550, and a polarization controller (PC) 591 on the propagation path for entering the control light is adjusted so as to maximize the power of the output signal light. This can provide a condition which can cause the relationship between the polarization states of the control light and the signal light to maximize the efficiency of generation of the XPM.

(D) Selection of a band-pass filter: Since the signal light and the control light for use in the present experiment are in an "L" band range and a "C" band range, respectively, a C/L-band WDM coupler 595 having a smaller loss is employed instead of a band pass filter, at the output end, in order to separate the signal light and the control light from each other.

(E) Synchronization between the signal light and the control light: Synchronization between the signal light and the control light has been easily established, since both of them are generated from a single light source through wavelength conversion in the present implemental example. In cases where the signal light and the control light are inputted separately from each other, the efficiency of generation of XPM can be increased by establishing the synchronization so that both the pulses are superimposed on each other over a possible greatest range in the HNLF.

Figure 47:
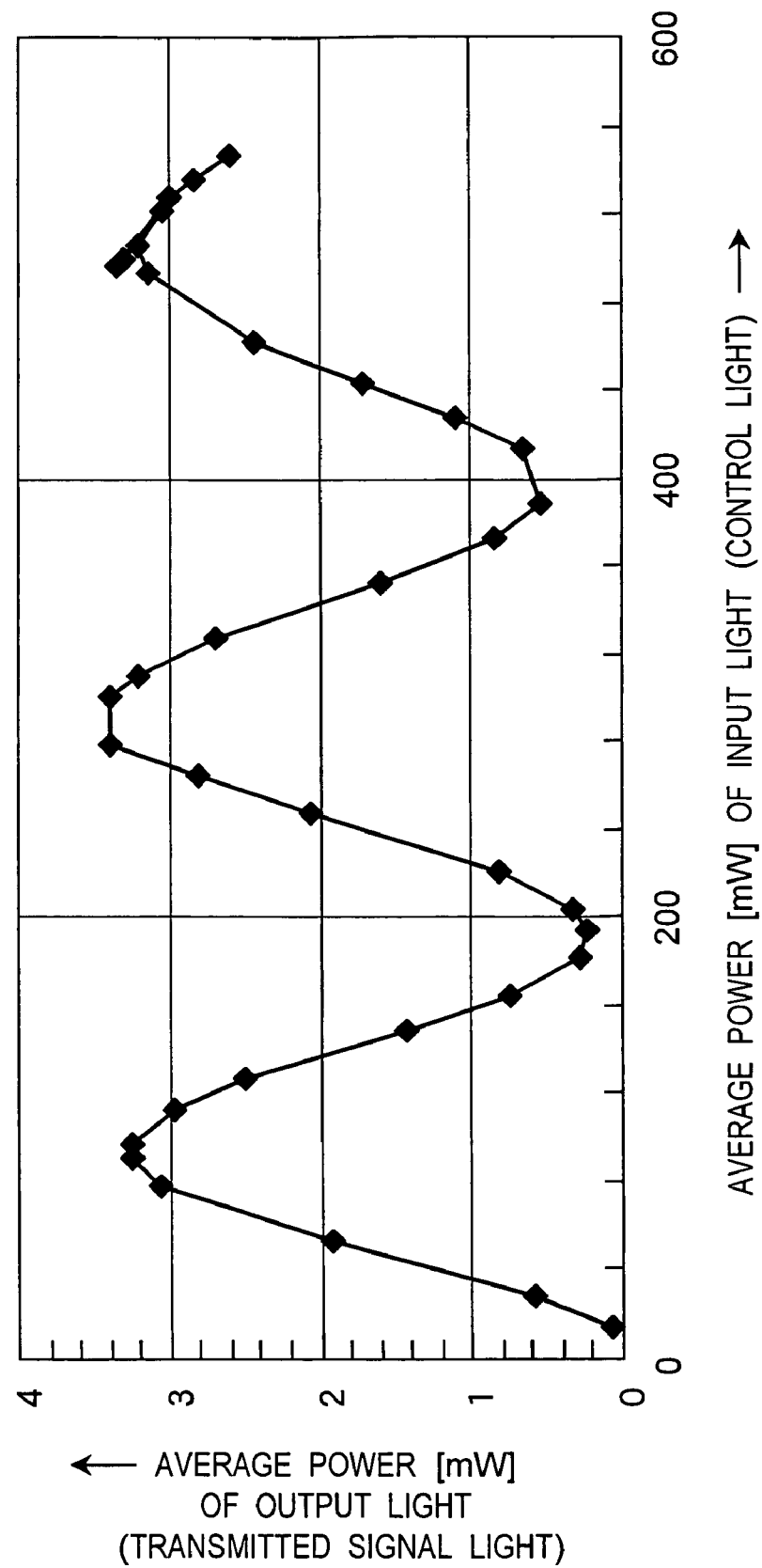
FIG. 47 is a diagram showing results of measurement of a transfer characteristic of the NOLM according to the present preferred embodiment.

FIG. 47 shows the transfer function of the NOLM 550 obtained in the present preferred embodiment. As shown in FIG. 47, there was realized a NOLM having a transfer function, in which a phase reaches 5π in the signal light due to XPM between the control light and the signal light, and in which the output powers at phase shifts of 2π and 4π are equal to or sufficiently smaller than half of its peak value.

SIXTH IMPLEMENTAL EXAMPLE

Figure 48:
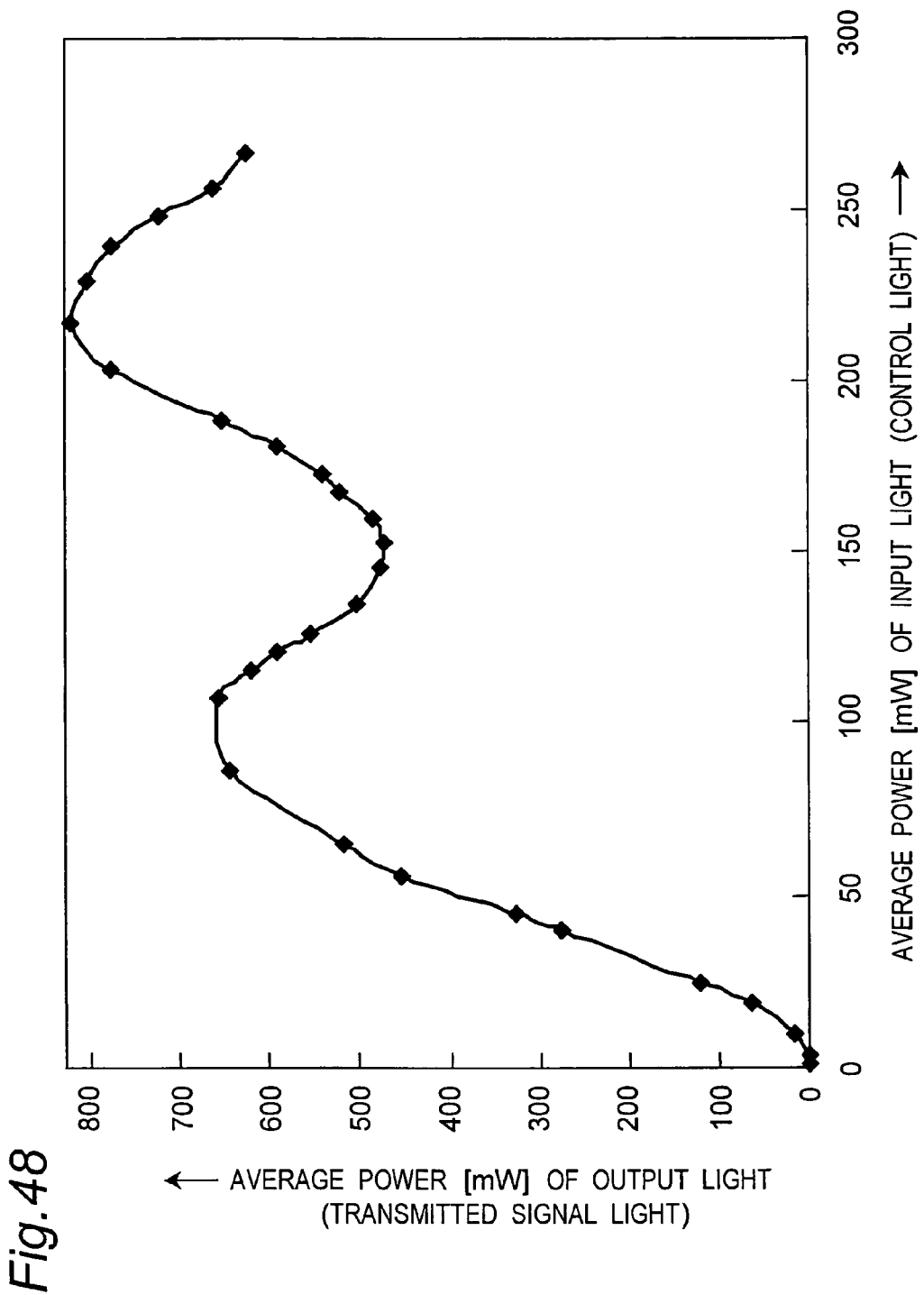
FIG. 48 is a diagram showing a transfer function of a NOLM with a high-nonlinear fiber (HNLF) different from that employed in FIG. 47.

On the other hand, FIG. 48 shows a resultant transfer function measured in a manner similar to above, when as an HNLF 554 used in a NOLM 550, a fiber having a fiber length of 380 m, a nonlinearity constant of 17.5 $W^{-1}$ $km^{-1}$, a zero-dispersion wavelength of 1560 nm, and a dispersion slope of 0.024 $ps/nm^2/km$ was used, the wavelengths of the control light and the signal light were set to 1550 nm and 1570 nm, respectively (with a wavelength difference of 20 nm), the pulse width of the control light was set to 8.5 ps, and the other conditions were set to the same as above. The transfer function includes plural periods by efficiently generating the XPM.

In this case, the dispersion value for the wavelength of the control light was −0.24 ps/nm/km, which was normal dispersion, but the value thereof was small. Accordingly, the signal light received a larger parametric gain. Namely, the powers of the signal lights propagating in the clockwise direction and in the counter-clockwise direction were imbalanced, and the interference therebetween did not work preferably. Accordingly, the output powers at phase shifts of the signal light of π and 3π are not equal to or smaller than 0.5. As a result, a desired transfer characteristic was not obtained and, namely, the condition that the output light power at $\phi_{XPM}=2\pi$ be equal to or smaller than half of the output light power at $\phi_{XPM}=\pi$ was not satisfied.

SEVENTH IMPLEMENTAL EXAMPLE

Figure 49:
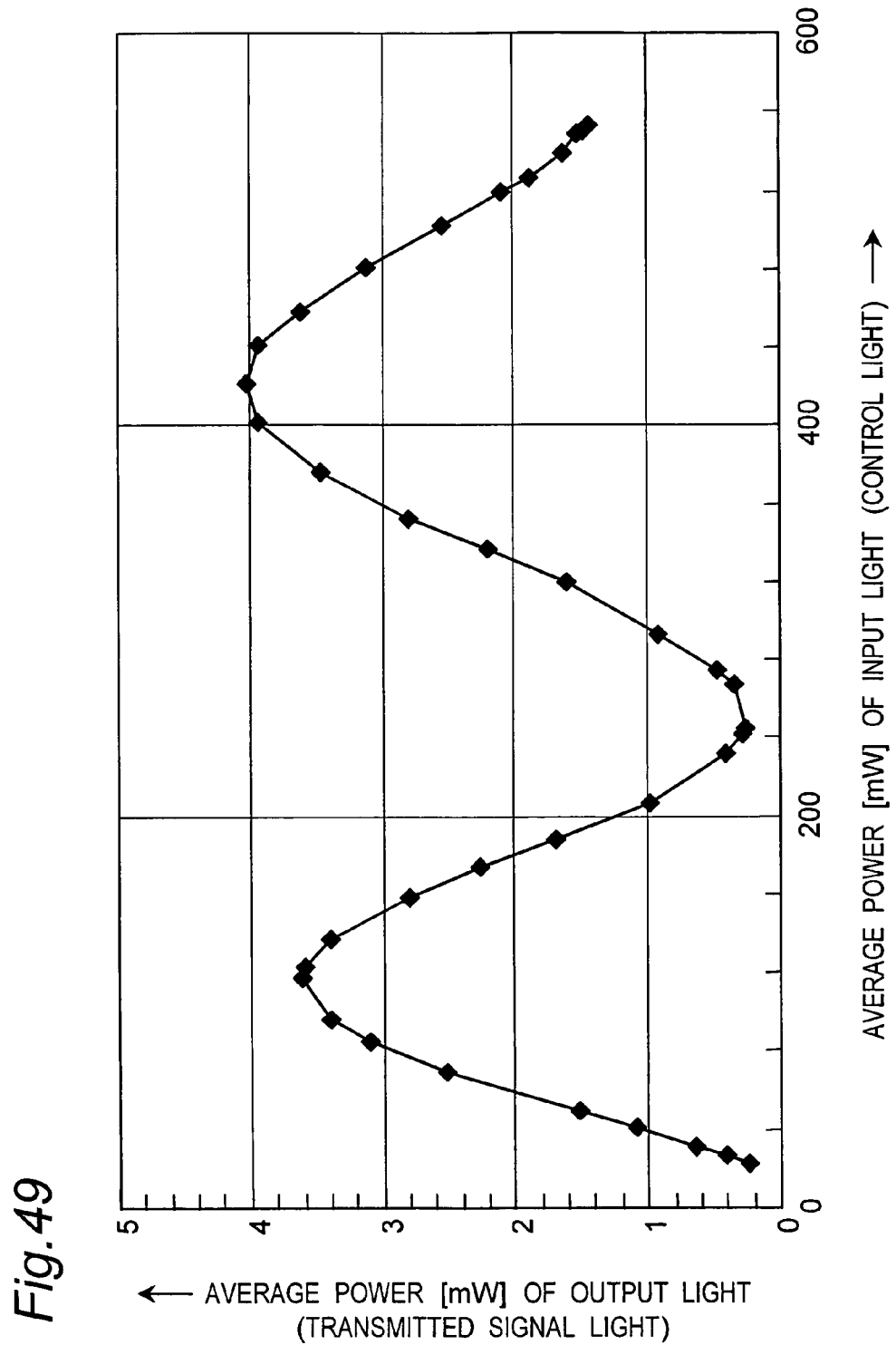
FIG. 49 is a diagram showing results of measurement of a transfer characteristic of a NOLM according to a further implemental example of the second preferred embodiment of the present invention.
Figure 50:
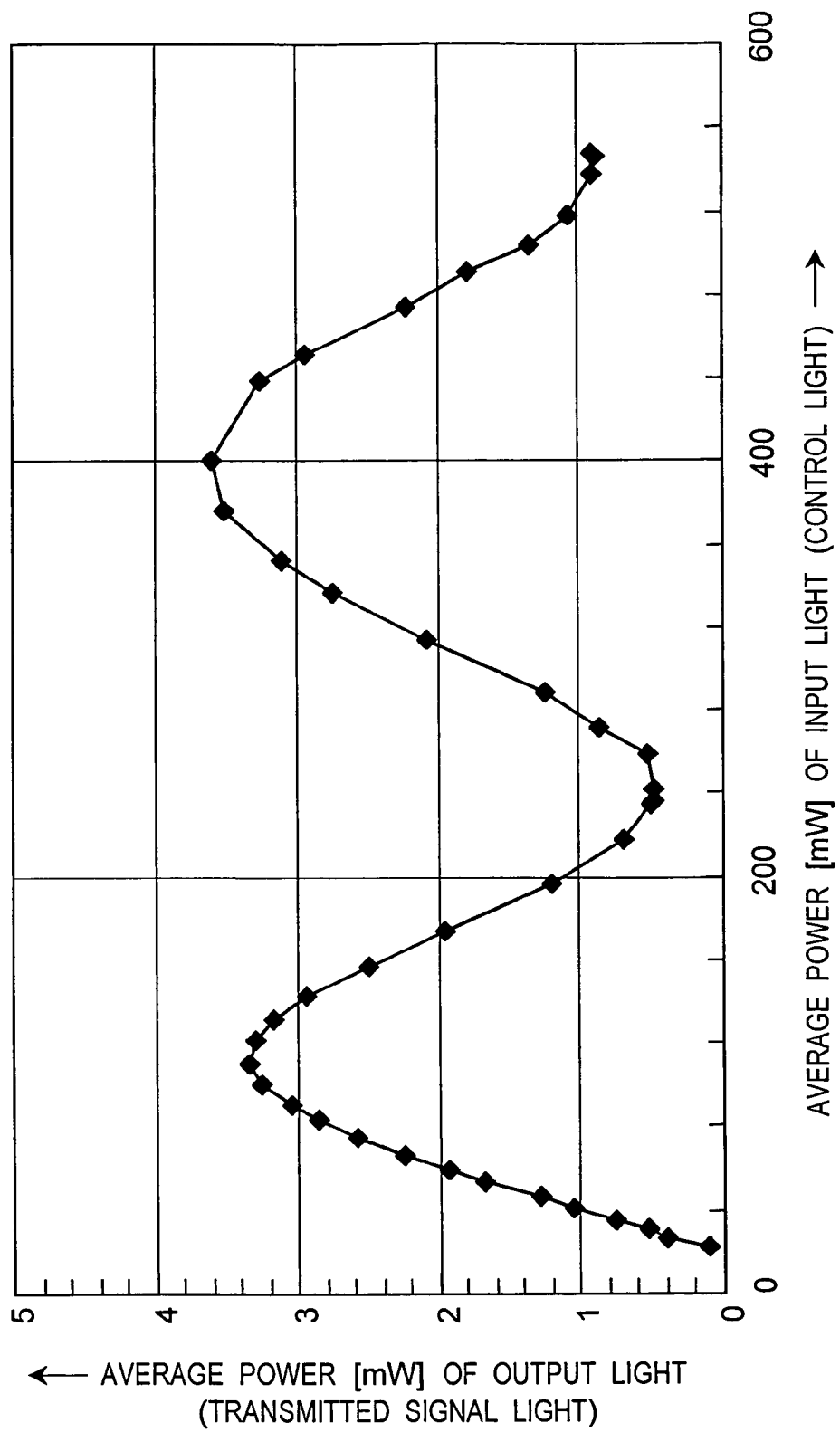
FIG. 50 is a diagram showing results of measurement of a transfer characteristic of a NOLM according to a further other implemental example of the second preferred embodiment of the present invention.

As another implemental example, there will be described two other cases where different fibers having different parameters were used as the HNLF 554 of the NOLM 550 of FIG. 46 to realize a multi-period NOLM.
(1) FIG. 49 shows a transfer characteristic of a NOLM including an HNLF having a fiber length of 406 m, a nonlinear constant of 12 $W^{-1}$ $km^{-1}$, a zero-dispersion wavelength of 1567 nm, a dispersion slope of 0.021 $ps/nm^2/km$ (the dispersion value for the wavelength of control light was −0.315 ps/nm/km), and a fiber loss of 0.426 dB/km.
(2) FIG. 50 shows a transfer characteristic of a NOLM including an HNLF having a fiber length of 403 m, a nonlinear constant of 12 $W^{-1}$ $km^{-1}$, a zero-dispersion wavelength of 1568 nm, a dispersion slope of 0.021 $ps/nm^2/km$ (the dispersion value for the wavelength of control light was −0.336 ps/nm/km), and a fiber loss of 0.411 dB/km.

Accordingly, in the present preferred embodiment, it is preferable that any one of the following conditions is satisfied.
(a) the dispersion value of the above mentioned nonlinear medium for the wavelength of the above mentioned control light signal is equal to or smaller than −0.062 ps/nm/km, and the wavelength difference between the above mentioned input signal light and the above mentioned control light is equal to or larger than 16 nm.
(b) the dispersion value of the above mentioned nonlinear medium for the wavelength of the above mentioned control light signal is equal to or smaller than −0.315 ps/nm/km, and the wavelength difference between the above mentioned input signal light and the above mentioned control light is equal to or larger than 20 nm.

One of applications of the NOLM realized according to the preferred embodiment of the present invention is optical A/D conversion. As the other possible aspects, the NOLM may be applied to decoding for multi-level communication such as QAM, PSK, or ASK. From a different viewpoint, it is possible to realize a switching device which actively utilizes the parametric gain that signal light receives from the control light, rather than switching which utilizes XPM in the NOLM.

As described above, the NOLM having the transfer characteristic of FIG. 40 can be realized by making a design characterized by designing a gain which the signal light propagating in the same direction as that of control light receives, due to parametric processing caused by the control light in an optical fiber in the NOLM according to the preferred embodiment of the present invention, to be suppressed to be equal to or smaller than a permissible value determined with respect to a set threshold value.

THIRD PREFERRED EMBODIMENT

Figure 51:
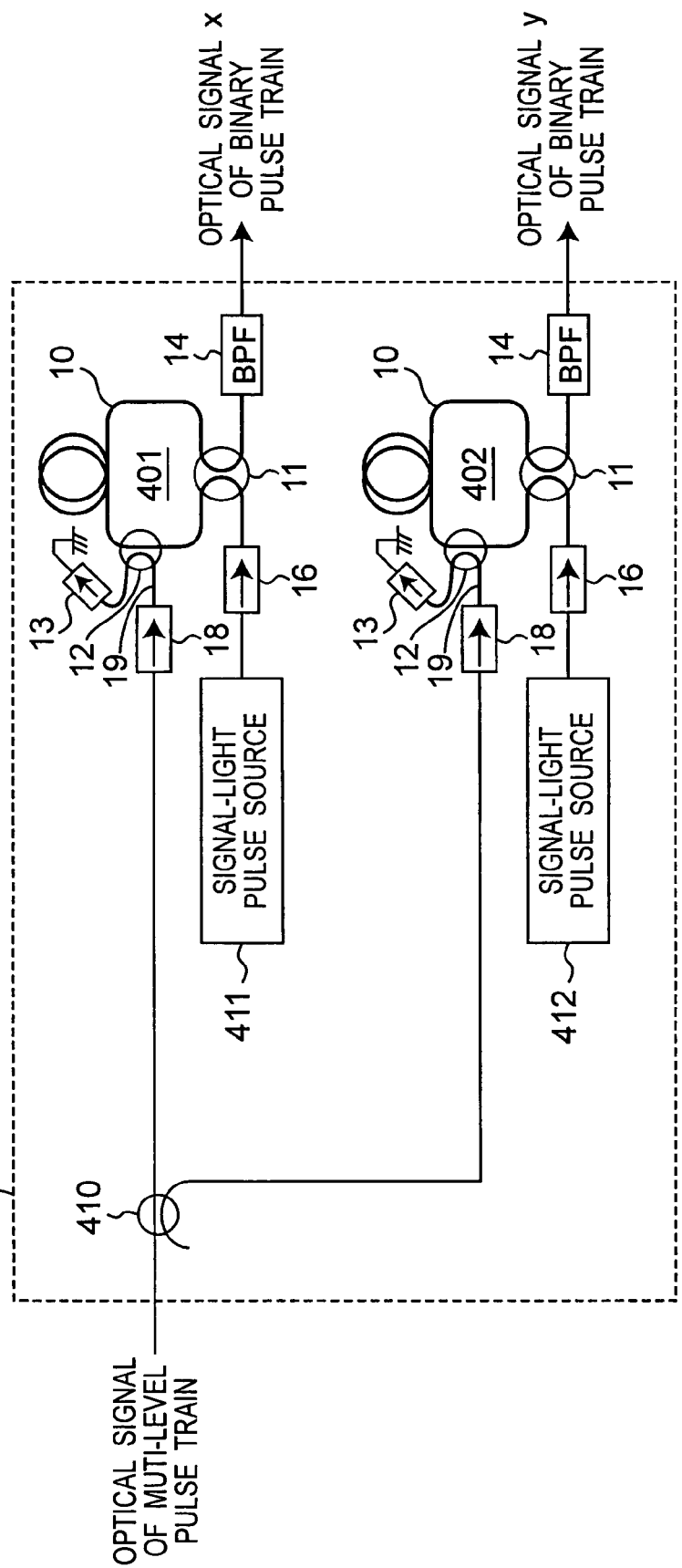
FIG. 51 is a block diagram showing a configuration of a multi-level optical signal decoder 400 according to a third preferred embodiment of the present invention.
Figure 52:
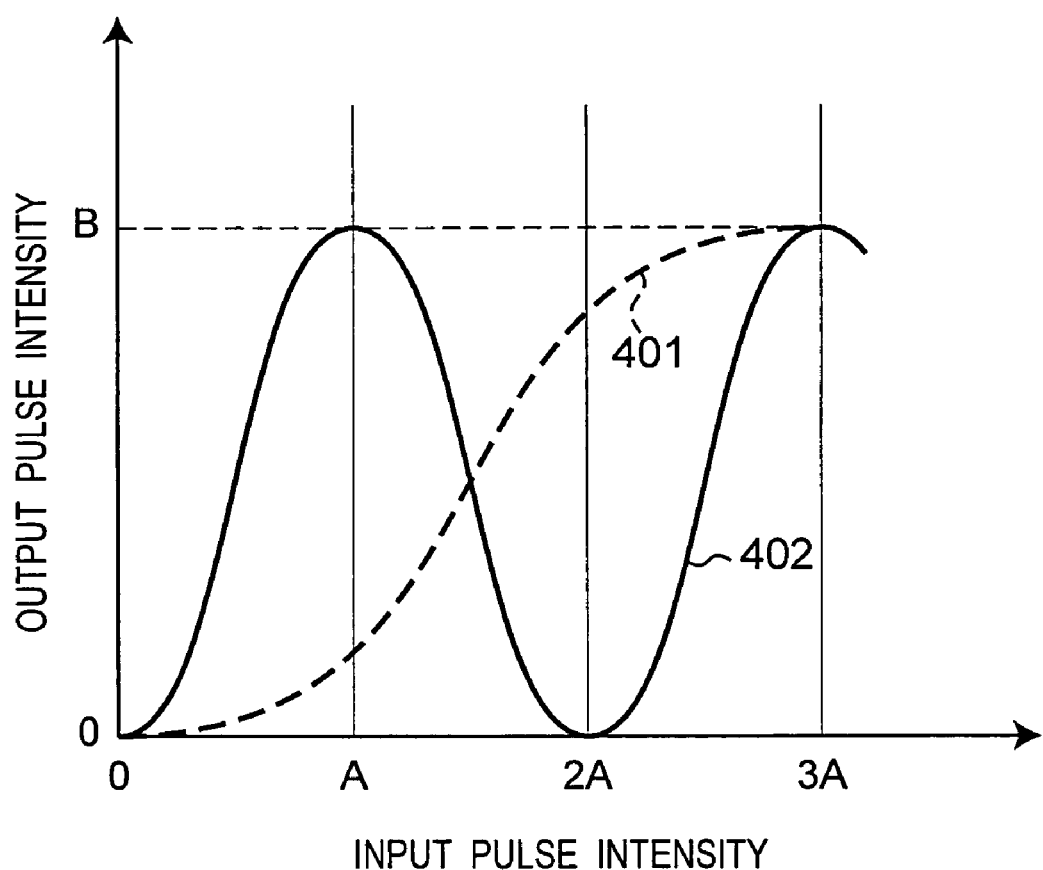
FIG. 52 is a graph showing an output pulse intensity with respect to an input pulse intensity of respective optical signal processors 401 and 402 of FIG. 51.

FIG. 51 is a block diagram showing a configuration of a multi-level optical signal decoder 400 according to a third preferred embodiment of the present invention, and FIG. 52 is a graph showing the output pulse intensity with respect to the input pulse intensity of optical signal processors 401 and 402 of FIG. 51.

Referring to FIG. 51, the multi-level optical signal decoder 400 is used in, for example, a multi-level optical communication system, and constructed by including a 3 dB photo-coupler 410 and two optical signal processors 401 and 402. In this case, the optical signal processor 401 is constructed by including the NOLM 10, the two photo-couplers 11 and 12, the optical isolator 13, the optical band-pass filter 14, the optical isolators 16 and 18, the optical fiber cable 19, and a signal light pulse source 411, in a manner similar to that of the optical encoder 201 of FIG. 3. Signal light pulses from the signal light pulse source 411 are inputted to the optical fiber cable of the NOLM 10 of the optical signal processor 401 via the optical isolator 16. In addition, the optical signal processor 402 is constructed by including the NOLM 10, the two photo-couplers 11 and 12, the optical isolator 13, the optical band-pass filter 14, the optical isolators 16 and 18, the optical fiber cable 19, and a signal light pulse source 412, in a manner similar to that of the optical encoder 201 of FIG. 3. Signal light pulses from the signal light pulse source 412 are inputted to the optical fiber cable of the NOLM 10 of the optical signal processor 402 via the optical isolator 16. In this case, the optical signal processors 401 and 402 have transfer functions with different periods as shown in FIG. 52. Concretely speaking, the period of the transfer function of the optical signal processor 401 is set to be three times that of the transfer function of the optical signal processor 402.

In the multi-level optical signal decoder 400 constructed as described above, an optical signal of a multi-level pulse train is inputted to the photo-coupler 410, and is branched into two optical signals of multi-level pulse trains. One of the two branched optical signals of multi-level pulse trains is inputted to the NOLM 10 of the optical signal processor 401 via the optical isolator 18, the optical fiber cable 19 and the photo-coupler 12. At this time, the optical signal of the multi-level pulse train is combined with the above mentioned signal light pulses, and thereafter, subjected to the above mentioned nonlinear optical processing, and a resultant light signal "x" of a binary pulse train is outputted from the photo-coupler 11 through the optical band-pass filter 14. In addition, another branched optical signal of the multi-level pulse train is inputted to the NOLM 10 of the optical signal processor 402 via the optical isolator 18, the optical fiber cable 19 and the photo-coupler 12. At this time, the optical signal of the multi-level pulse train is combined with the above mentioned signal light pulses, and thereafter, subjected to the above mentioned non-linear optical processing, and a resultant light signal "y" of a binary pulse train is outputted from the photo-coupler 11 via the optical band-pass filter 14.

Next, there will be described below an exemplary application of a light intensity multi-level communication system using the multi-level optical signal decoder 400 in the case of quaternary input and binary output.

Figure 53:
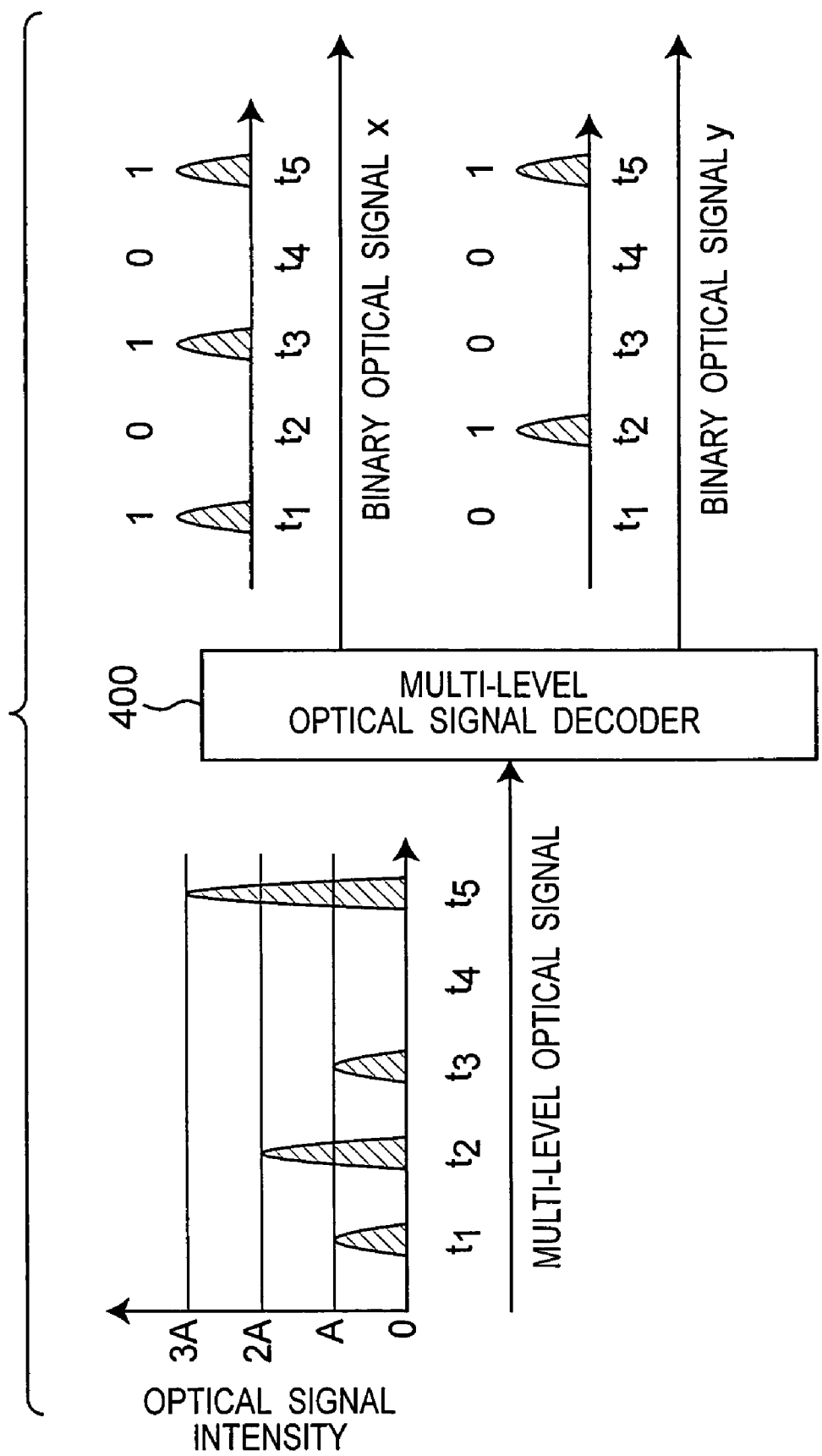
FIG. 53 is a block diagram showing a configuration of a decoding device for use in an optical intensity multi-level communication system using the multi-level optical signal decoder 400 of FIG. 51 according to a first exemplary application.

FIG. 53 is a block diagram showing s configuration of a decoding device for use in a light intensity multi-level communication system showing a first exemplary application using the multi-level optical signal decoder 400 of FIG. 51, and FIG. 54 is a table showing exemplary code allocation for the decoding device of FIG. 53. In the first exemplary application of FIGS. 53 and 54, in the case of code allocation with respect to the light intensity as shown in FIG. 54, when a quaternary multi-level optical signal is inputted to the optical signal decoder 400, two binary optical signals "x" and "y" can be obtained. As described above, by defining the amplitude of an optical signal to be multi-levels, it is possible to increase the efficiency of frequency utilization.

Figure 55:
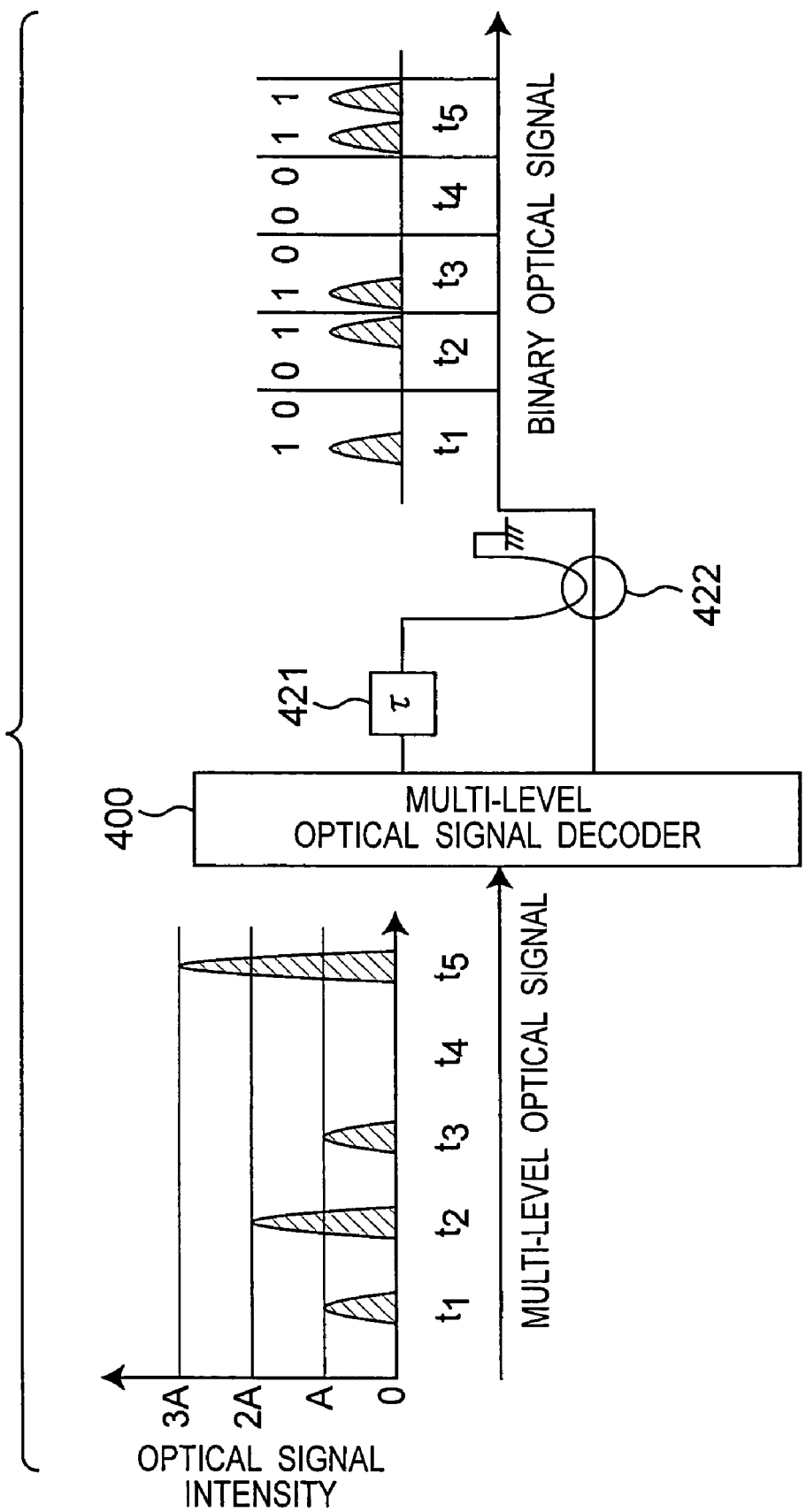
FIG. 55 is a block diagram showing a configuration of a decoding device for use in an optical intensity multi-level communication system according to a second exemplary application using the multi-level optical signal decoder 400 of FIG. 51.

FIG. 55 is a block diagram showing a configuration of a decoding device for use in a light intensity multi-level communication system indicating a second exemplary application using the multi-level optical signal decoder 400 of FIG. 51, and FIG. 56 is a table showing exemplary code allocation for the decoding device of FIG. 55. In the second exemplary application in FIGS. 55 and 56, in the case of code allocation with respect to the light intensity as shown in FIG. 56, when a quaternary multi-level optical signal is inputted to the multi-level optical signal decoder 400, two output light signals are generated from the multi-level optical signal decoder 400 and, one of the two output light signals passes through an optical delay circuit 421 for delaying the pulse period of the original multi-level optical signal by half. Then, the passed optical signal is combined with another output light signal through a 3 dB photo-coupler 422 to provide a time-division multiplexed binary optical signal.

In the above mentioned preferred embodiments, the two optical signal processors 401 and 402 are placed in parallel to form the multi-level optical signal decoder 400, however, the present invention is not limited to this. Three or more optical signal processors having different transfer characteristics may be placed in parallel to form a multi-level optical signal decoder.

FORTH PREFERRED EMBODIMENT

Figure 57:
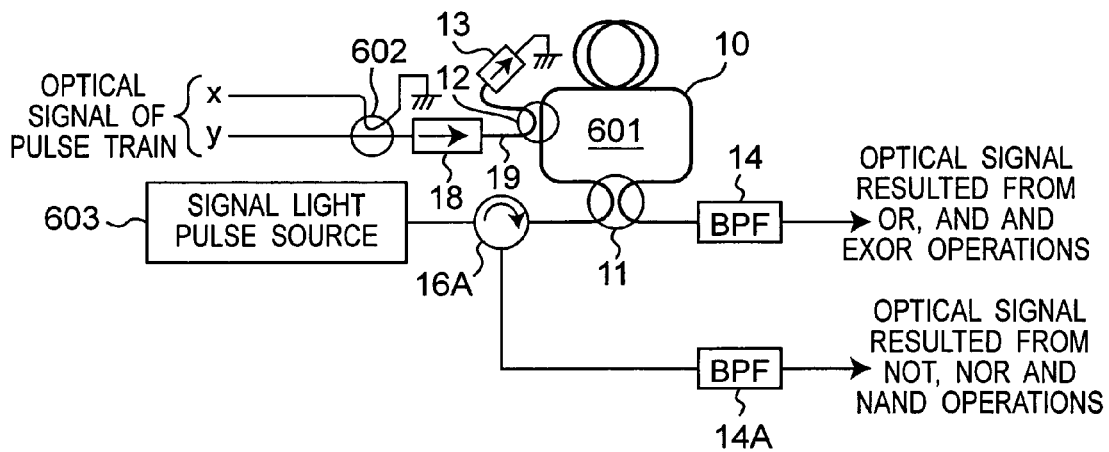
FIG. 57 is a block diagram showing a configuration of an optical logic operation circuit 600 according to a forth preferred embodiment of the present invention.
Figure 58:
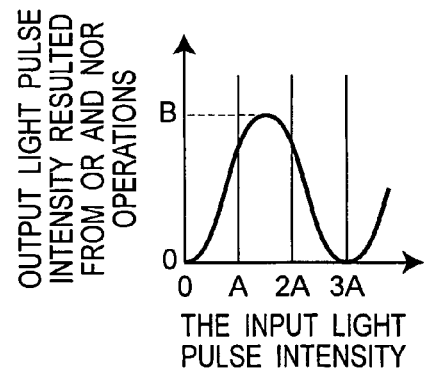
FIG. 58 is a graph showing an output optical pulse intensity with respect to the input optical pulse intensity which is resulted from an OR operation of the optical logic operation circuit 600 of FIG. 57.
Figure 59:
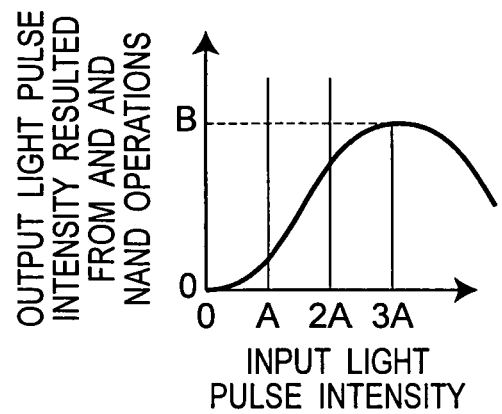
FIG. 59 is a graph showing an output optical pulse intensity with respect to the input optical pulse intensity which is resulted from an AND operation of the optical logic operation circuit 600 of FIG. 57.
Figure 60:
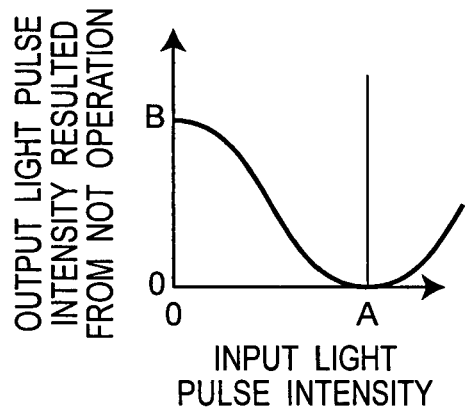
FIG. 60 is a graph showing an output optical pulse intensity with respect to the input optical pulse intensity which is resulted from a NOT operation of the optical logic operation circuit 600 of FIG. 57.
Figure 61:
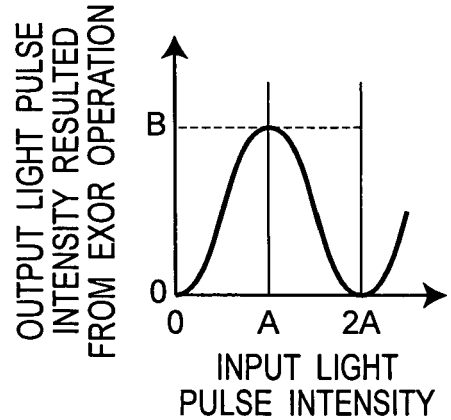
FIG. 61 is a graph showing an output optical pulse intensity with respect to the input optical pulse intensity which is resulted from an EXOR operation of the optical logic operation circuit 600 of FIG. 57.

FIG. 57 is a block diagram showing a configuration of an optical logic operation circuit 600 according to a forth preferred embodiment of the present invention. FIG. 58 is a graph showing an output light pulse intensity with respect to the input light pulse intensity, which is resulted from an OR operation of the optical logic operation circuit 600 of FIG. 57. FIG. 59 is a graph showing an output light pulse intensity with respect to the input light pulse intensity, which is resulted from an AND operation of the optical logic operation circuit 600 of FIG. 57. FIG. 60 is a graph showing an output light pulse intensity with respect to the input light pulse intensity, which is resulted from a NOT operation of the optical logic operation circuit 600 of FIG. 57. FIG. 61 is a graph showing an output light pulse intensity with respect to the input light pulse intensity, which is resulted from an EXOR operation of the optical logic operation circuit 600 of FIG. 57.

Referring to FIG. 57, the optical logic operation circuit 600 is constructed by including an optical signal processor 601 and a 3 dB photo-coupler 602. In this case, the optical signal processor 601 is constructed by including the NOLM 10, the two photo-couplers 11 and 12, the optical isolator 13, the two optical band-pass filters 14 and 14A, then optical isolator 18, the optical fiber cable 19, an optical circulator 16A, and a signal light pulse source 603, in a manner similar to that of the optical encoder 201 of FIG. 3. Signal light pulses from the signal light pulse source 603 are inputted to the optical fiber cable of the NOLM 10 of the optical signal processor 601 via the optical circulator 16A. In this case, two pulse trains of binary signals "x" and "y", which are input signals for the optical logic operation, are combined with each other by the photo-coupler 602, and thereafter, a combined signal is inputted to the NOLM 10 of the optical signal processor 601 via the optical isolator 18, the optical fiber cable 19, and the photo-coupler 12. Then, the combined signal is combined with the above mentioned signal light pulses in the NOLM 10, subjected to the above mentioned nonlinear optical processing, and thereafter, a processed optical signal is outputted as an optical signal resulted from a first operation from the photo-coupler 11 via the optical band-pass filter 14, and the processed optical signal is outputted as an optical signal resulted from a second operation from the photo-coupler 11 via the optical isolator 16A and the optical band-pass filter 14A.

In this case, the optical signal processor 601 has different transfer functions as will be described later, depending on the type of operation of the optical logic circuit, as shown in, for example, FIGS. 58 to 61. In this case, the transfer function is a function of the output light pulse intensity with respect to the input light pulse intensity, and the peak-to-peak amplitude of the output pulse intensity is "B".

(a) In the case of the OR operation and a NOR operation, as shown in FIG. 58, the transfer function has an output light pulse intensity of 0 with respect to an input light pulse intensity of 0, and accordingly, the output light pulse intensity is increased with increasing input light pulse intensity, along a sinusoidal wave shape with a period of 3 A. In this case, an optical signal resulted from the OR operation can be obtained from the optical band-pass filter 14, and an optical signal resulted from the NOR operation can be obtained from the optical band-pass filter 14A.

(b) In the case of the AND operation and a NAND operation, as shown in FIG. 59, the transfer function has an output light pulse intensity of 0 with respect to an input light pulse intensity of 0, and accordingly, the output light pulse intensity is increased with increasing input light pulse intensity, along a sinusoidal wave shape with a period of 6 A. In this case, an optical signal resulted from the AND operation can be obtained from the optical band-pass filter 14, and an optical signal resulted from the NAND operation can be obtained from the optical band-pass filter 14A.

(c) In the case of the NOT operation, as shown in FIG. 60, the transfer function has an output light pulse intensity of "B" with respect to an input light pulse intensity of 0, and accordingly, the output light pulse intensity is changed with increasing input light pulse intensity, along a sinusoidal wave shape with a period of 2 A. In this case, an optical signal resulted from the NOT operation can be obtained from the optical band-pass filter 14A.

(d) In the case of the EXOR operation, as shown in FIG. 61, the transfer function has an output light pulse intensity of 0 with respect to an input light pulse intensity of 0, and accordingly, the output light pulse intensity is changed with increasing input light pulse intensity, along a sinusoidal wave shape with a period of 2 A. In this case, an optical signal resulted from the EXOR operation can be obtained from the optical band-pass filter 14.

As described above, in the case of inputting two binary optical signals "x" and "y", when only the pulses of the optical signal "x" or only the pulses of the optical signal "y" are inputted to the NOLM 10, the optical signal has an optical intensity of "A", and when the pulses of the two optical signals "x" and "y" are inputted to the NOLM 10, a combined optical signal has an optical intensity of 2 A. As shown in FIGS. 58 to 61, by properly adjusting the transfer function of the optical signal processor 601, it is possible to realize the above mentioned various optical logic operations with significantly simple optical circuits.

EIGHTH IMPLEMENTAL EXAMPLE

Fourth Experimental System

Figure 62:
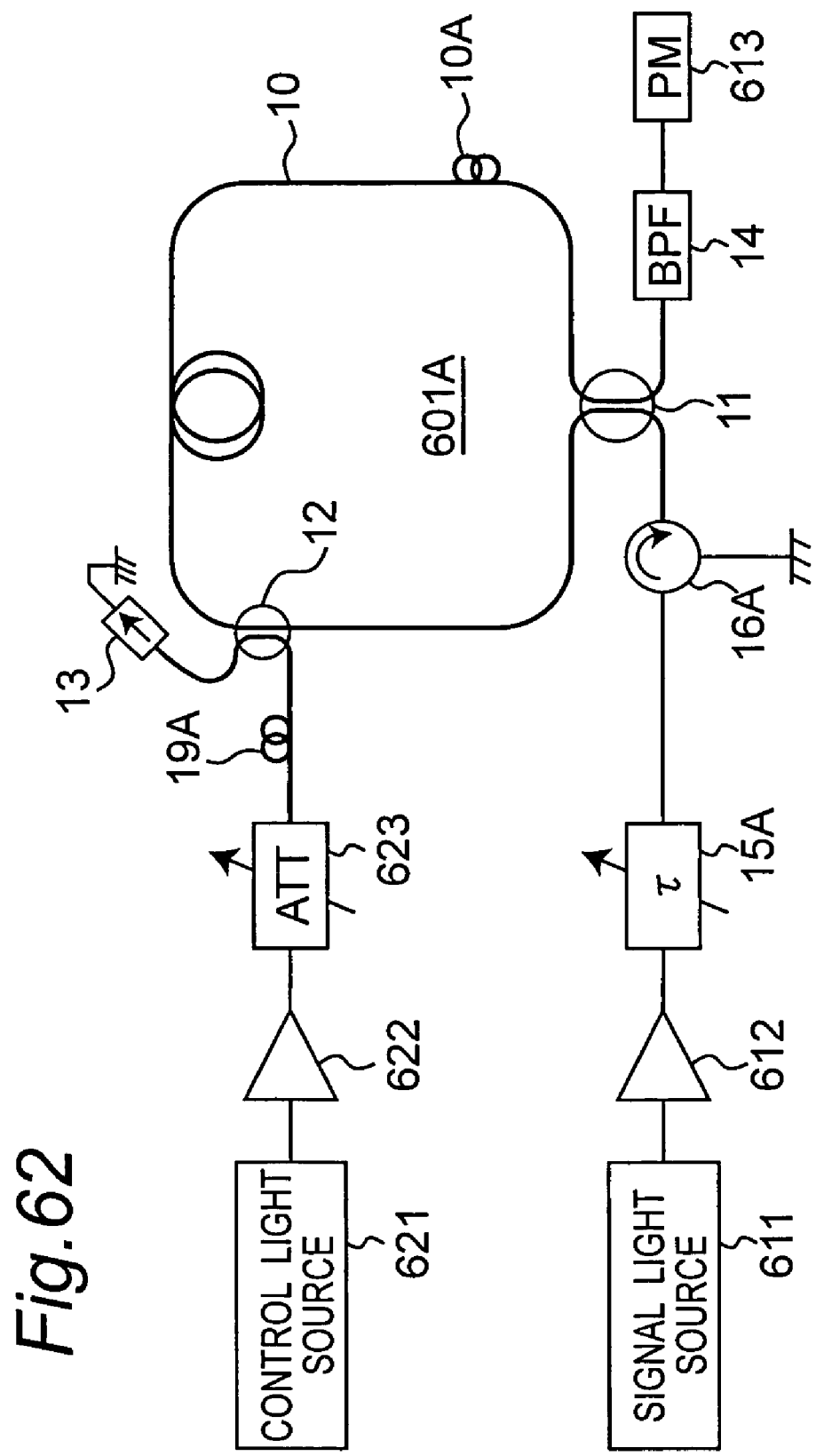
FIG. 62 is a block diagram showing a configuration of a forth experimental system according to a preferred embodiment of the present invention.
Figure 63:
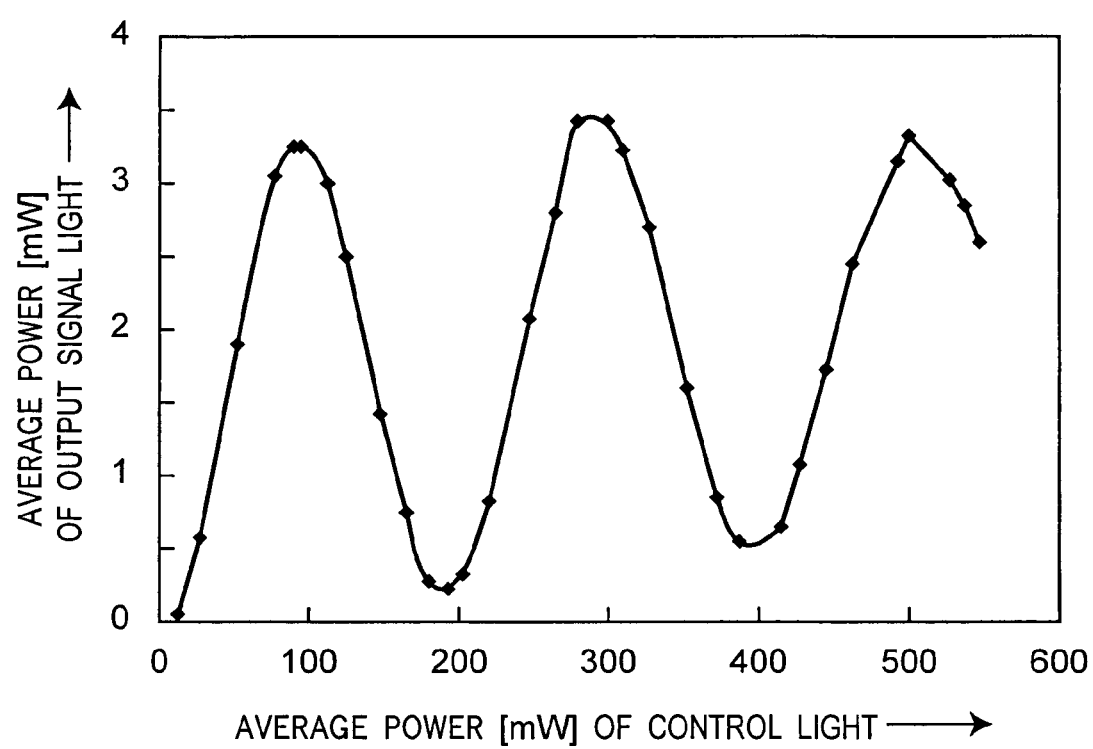
FIG. 63 is a graph showing an average power of the output signal light with respect to the average power of the control light, showing results of experiments with the forth experimental system of FIG. 62.

FIG. 62 is a block diagram showing a configuration of a fourth experimental system according to the preferred embodiment of the present invention, and FIG. 63 is a graph showing an average power of the output signal light with respect to the average power of the control light, showing results of experiments with the fourth experimental system of FIG. 62.

In the fourth experimental system of FIG. 62, in a manner similar to that of the optical encoder 201 of FIG. 3, an optical signal processor 601A is constructed by including the NOLM 10 including a polarization controller 10A on the optical fiber cable, the two photo-couplers 11 and 12, the optical isolator 13, the optical band-pass filter 14, an optical circulator 16A, and a polarization controller 19A. A signal light source 611 generates signal light pulses having a wavelength of 1568 nm and a pulse frequency of 10 GHz, and inputs generated signal light pulses to the NOLM 10 of the optical signal processor 601A via an erbium-doped fiber optical amplifier 612, a variable optical delay circuit 15A, an optical isolator 16A, and a photo-coupler 11. On the other hand, a signal light source 621 generates control light pulses having a wavelength of 1552 nm and a pulse frequency of 10 GHz, and inputs generated control light pulses to the NOLM 10 of the optical signal processor 601A via an erbium-doped fiber optical amplifier 622, a variable optical attenuator 623, the polarization controller 19A and the photo-coupler 12. In this case, the high-nonlinear fiber used in the NOLM 10 has a length "L" of 400 m and a nonlinearity coefficient $\gamma$ of 16.6 $W^{-1}$ $km^{-1}$.

A function with substantially a sinusoidal wave shape which spans 2.5 or more periods could be obtained as a transfer function obtained with the fourth experimental system of FIG. 62 constructed as mentioned above, as shown in FIG. 63.

NINTH IMPLEMENTAL EXAMPLE

Fifth Experimental System

Figure 64:
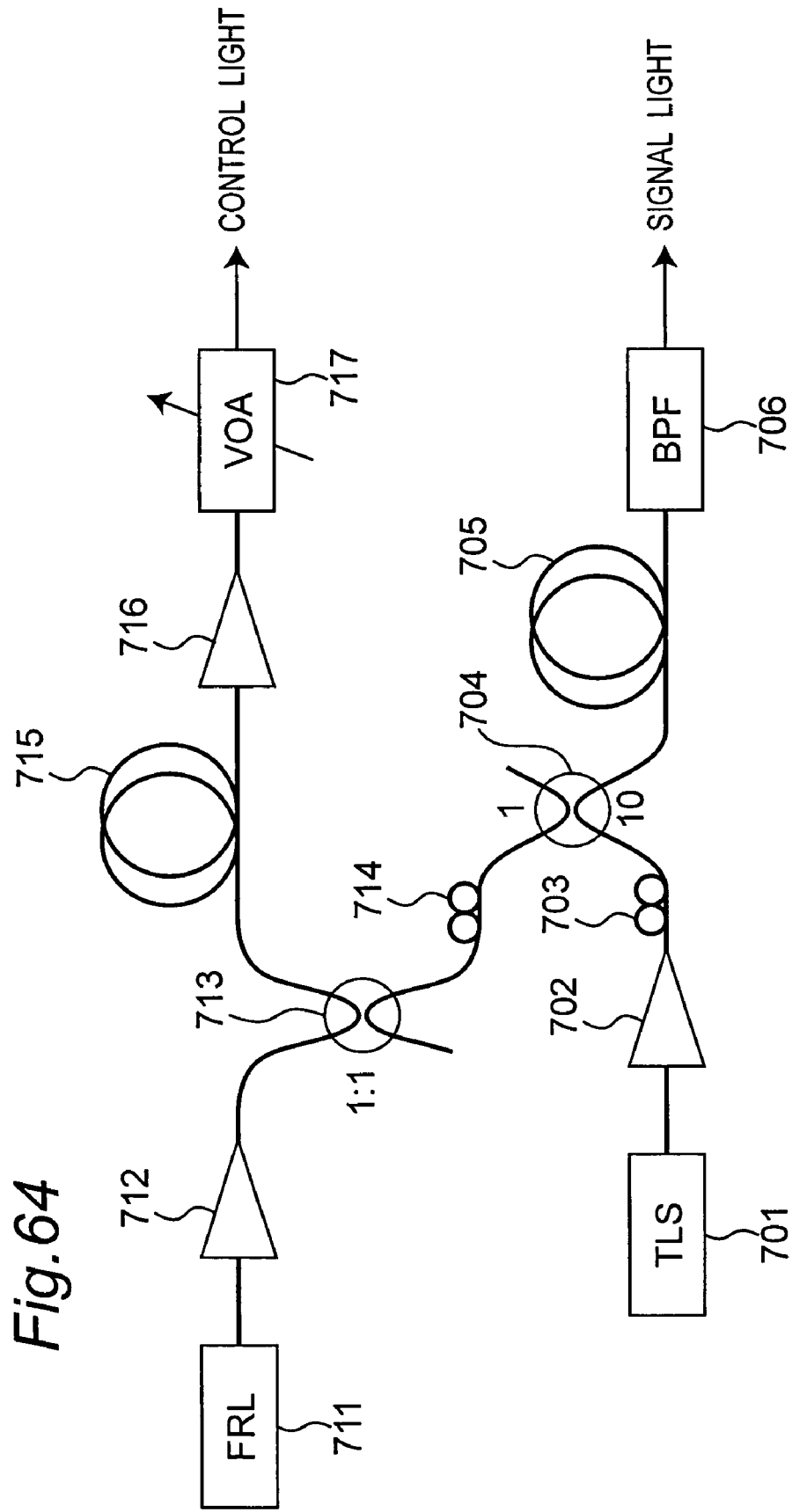
FIG. 64 is a block diagram showing a configuration of a first portion of a fifth experimental system according to the preferred embodiment of the present invention.
Figure 65:
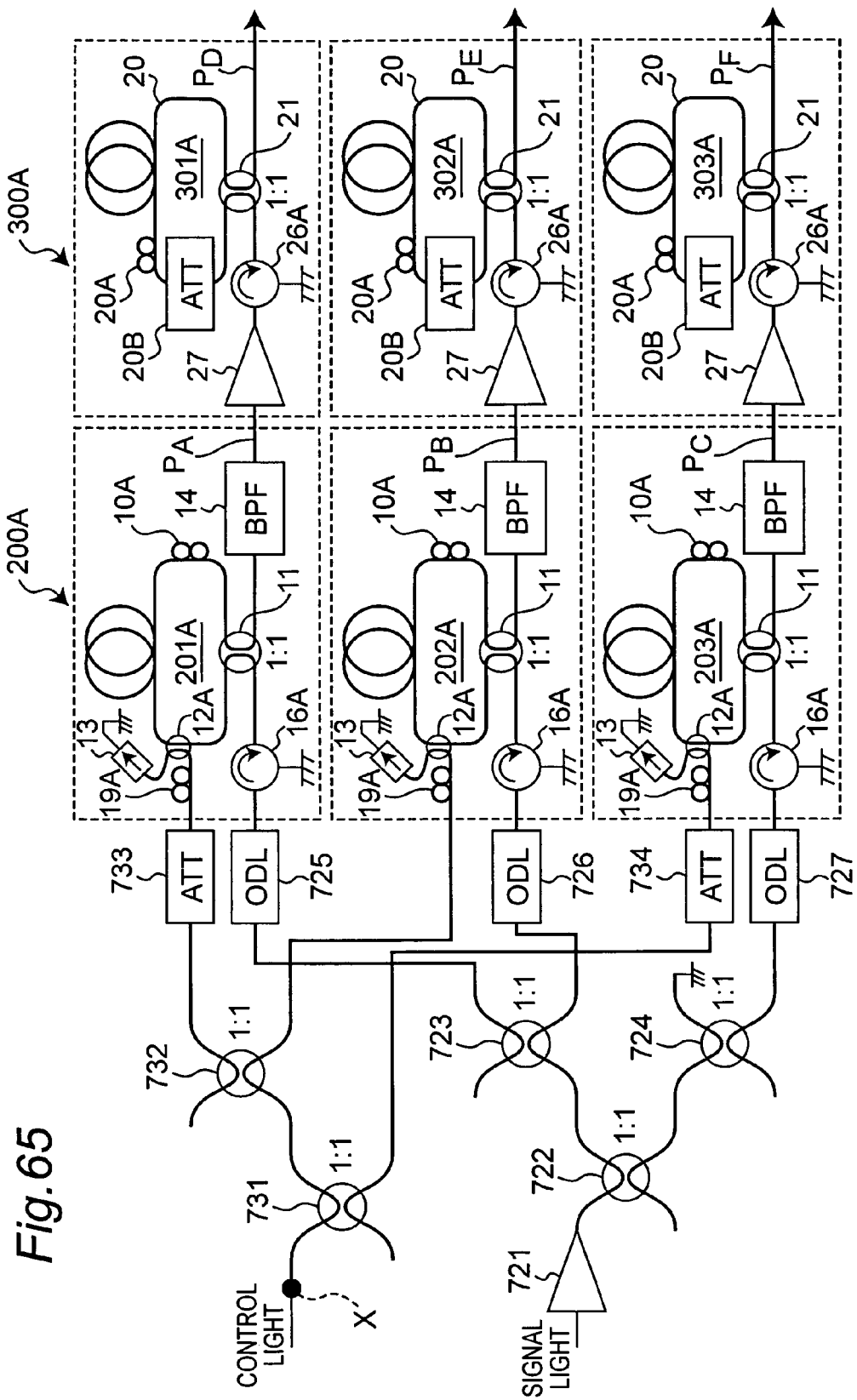
FIG. 65 is a block diagram showing a configuration of a second portion of the fifth experimental system according to the preferred embodiment of the present invention.

FIGS. 64 and 65 are block diagrams each showing a configuration of a fifth experimental system according to the preferred embodiment of the present invention. FIG. 64 shows an optical circuit portion which generates signal light and control light in the fifth experimental system, and FIG. 65 shows an optical circuit portion which encodes a generated signal light and control light and performs threshold value processing thereon.

FIG. 64 shows an experimental system for 3-bit optical quantization and encoding with a sampling rate of 10 GS/s. A laser light source 711 which is a 10-GHz regeneration-mode synchronization-type fiber ring laser (FRL) which operates with a wavelength of 1552 nm and a pulse frequency of 3 ps is employed in order to generate control light pulses. The control pulses outputted from the laser light source 711 are inputted to a 3 dB photo-coupler 713 via an optical amplifier 712, and split into two pulse trains of control light. One of the two split pulse trains of control light is outputted as control light via a dispersion-compensating optical fiber cable (DCF) 715, an optical amplifier 716, and a variable optical attenuator (VOA) 717. Another split control pulses are inputted to a photo-coupler 704 via a polarization controller 714. On the other hand, a variable laser light source 701 which is a CW laser diode light source generates signal light pulses with a wavelength of 1560 nm, and the signal light pulses are inputted to the photo-coupler 704 via an optical amplifier 702 and a polarization controller 703. The two pulse lights are combined by the photo-coupler 704, and combined pulse light is outputted as signal light via a high-nonlinear optical fiber cable (HNLF) 505 and an optical band-pass filter 706. Namely, the above mentioned optical circuit portion generates signal light pulses with a carrier wave wavelength of 1568 nm and a time width of 3 ps which are synchronized with the control light pulses, using four-wave mixing (FWM). In addition, the pulse width of the control light pulses is extended to 11 ps, using the dispersion-compensating optical fiber cable (DCF) 715. The variable optical attenuator (VOA) 717 is used subsequently to the dispersion-compensating optical fiber cable (DCF) 715 to emulate the level of optical pulses resulted from sampling of analog optical signals. The amounts of the optical delays of three optical delay circuits (ODLs) 725, 726 and 727 in FIG. 65 are set such that the signal light pulses are superimposed on the control light pulses.

Referring to FIG. 65, three optical encoders 201A, 202A and 203A are placed in parallel to form an optical encoding circuit 200A, and three optical threshold processors 301A, 302A and 303A are placed in parallel to form an optical quantization circuit 300A. In this case, each of the optical encoders 201A, 202A and 203A includes the NOLM 10 including the polarization controller 10A, two photo-couplers 11 and 12A, the optical isolator 13, the optical band-pass filter 14, the optical circulator 16A, and the polarization controller 19A, in a manner similar to that of the optical encoder 201 of FIG. 3. Signal light is inputted to the optical fiber cable of the NOLM 10 of the optical encoder 201A via the optical circulator 16A and the photo-coupler 11, and the control light is inputted to the NOLM 10 via the polarization controller 19A and the photo-coupler 12A. In addition, each of the optical threshold processors 301A, 302A and 303A is constructed by including the NOLM 20, the photo-coupler 21, an optical circulator 26A, the optical amplifier 27, and an optical attenuator 20B and a polarization controller 20A which are inserted on the optical fiber cable of the NOLM 20. Output light from each of the optical encoders 201A, 202A and 203A is inputted to the NOLM 20 via the optical amplifier 27, the optical circulator 26A and the photo-coupler 21.

The signal light generated by the optical circuit portion of FIG. 64 passes through an optical amplifier 721, and the passed signal light is split into three signal lights by the three photo-couplers 722, 723 and 724. The first signal light is inputted to the optical circulator 16A in the optical encoder 201A via the optical delay circuit 725. In addition, the second signal light is inputted to the optical circulator 16A in the optical encoder 202A via the optical delay circuit 726. Further, the third signal light is inputted to the optical circulator 16A of the optical encoder 203A via the optical delay circuit 727.

On the other hand, the control light generated by the optical circuit portion of FIG. 64 is inputted to the photo-coupler 731 via a connection point "X", and split into two control lights. One of the two split control lights is further split into two optical signals by a photo-coupler 732. One of the optical signals is inputted to the polarization controller 19A in the optical encoder 201A in the optical encoding circuit 200A via the optical attenuator 733, and then subjected to optical encoding processing by the optical encoder 201A and optical threshold processing by the optical threshold processor 301A. Another optical signal from the photo-coupler 732 is inputted to the polarization controller 19A in the optical encoder 202A in the optical encoding circuit 200A, and subjected to optical encoding processing by the optical encoder 202A and optical threshold processing by the optical threshold processor 302A. In addition, another optical signal from the photo-coupler 731 is inputted to the polarization controller 19A in the optical encoder 203A of the optical encoding circuit 200A via an optical attenuator 734, and subjected to optical encoding processing by the optical encoder 203A and optical threshold processing by the optical threshold processor 303A.

In the fifth experimental system constructed as mentioned above, relative periodicities of the transfer functions of the respective optical encoders 201A, 202A and 203A were properly adjusted using the optical attenuators 733 and 734, so that the optical encoders 201A, 202A and 203A have transfer functions with a half period, a single period and two periods, respectively, with respect to control light pulses with a maximum level. The HNLFs in the NOLMs 10A of the respective optical encoders 201A, 202A and 203A had lengths "L" of 380 m, 403 m and 406 m and nonlinearity coefficients γ of 17.5 $W^{-1}$ $km^{-1}$, 12.0 $W^{-1}$ $km^{-1}$ and 12.0 $W^{-1}$ $km^{-1}$, respectively. The optical band-pass filters 14 removed the control light pulses, and passed therethrough and outputted only the signal light pulses. The three optical threshold processors 301A, 302A and 303A had substantially the same characteristics. The gain of the erbium-doped fiber optical amplifiers 27 was adjusted to a proper value of about 23 dB. When asymmetric loops of self-switching type NOLMs were created using 10 dB optical attenuators 10, the HNLFs of the NOLMs had a length "L" of 830 m and a nonlinear coefficient γ of 19 $W^{-1}$ $km^{-}$.

Figure 66:
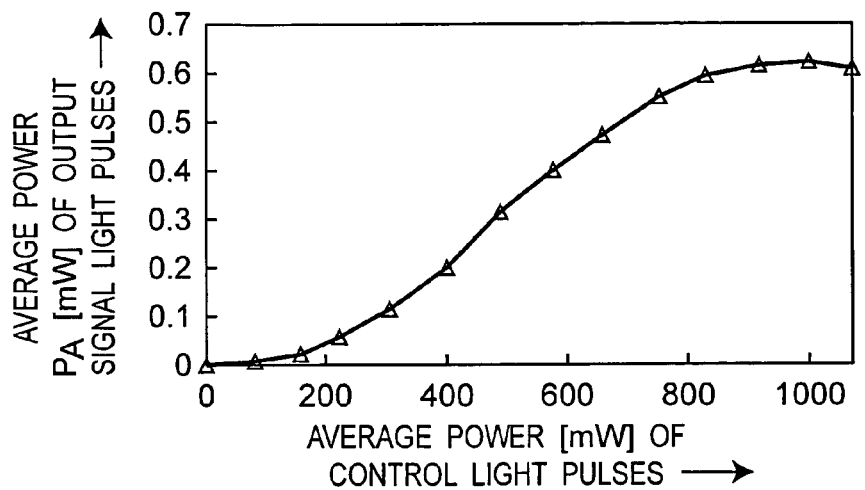
FIG. 66 is a graph showing an average power $P_A$ of output signal light pulses outputted from an optical encoder 201A with respect to an average power of control light pulses inputted to the optical encoder 201A, showing results of experiments with the fifth experimental system of FIGS. 64 and 65.
Figure 67:
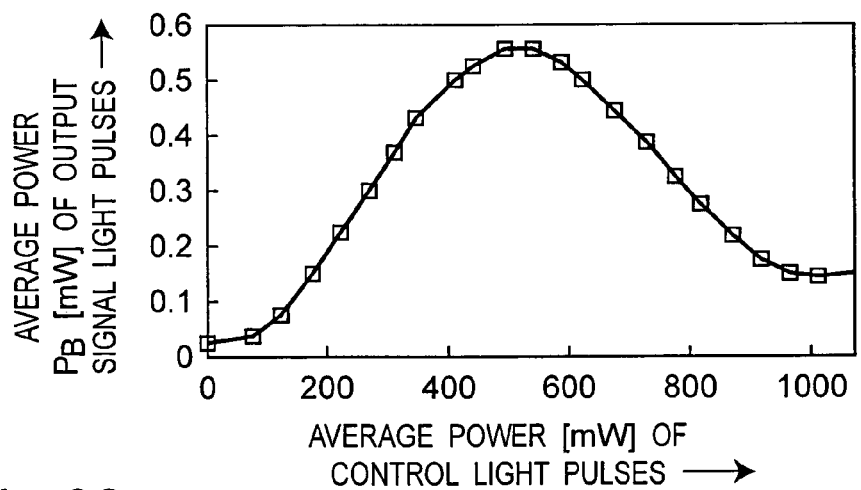
FIG. 67 is a graph showing an average power $P_B$ of the output signal light pulses outputted from an optical encoder 202A with respect to the average power of the control light pulses inputted to the optical encoder 202A, showing results of experiments with the fifth experimental system of FIGS. 64 and 65.
Figure 68:
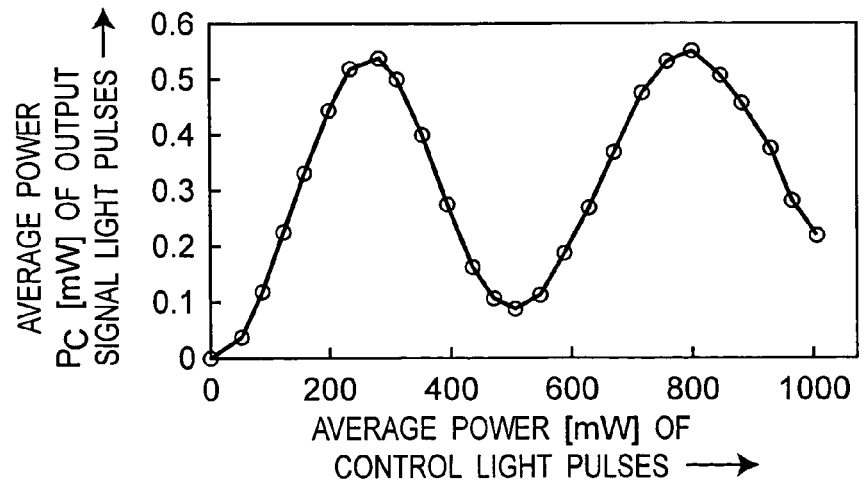
FIG. 68 is a graph showing an average power $P_C$ of the output signal light pulses outputted from an optical encoder 203A with respect to the average power of the control light pulses inputted to the optical encoder 203A, showing results of experiments with the fifth experimental system of FIGS. 64 and 65.
Figure 69:
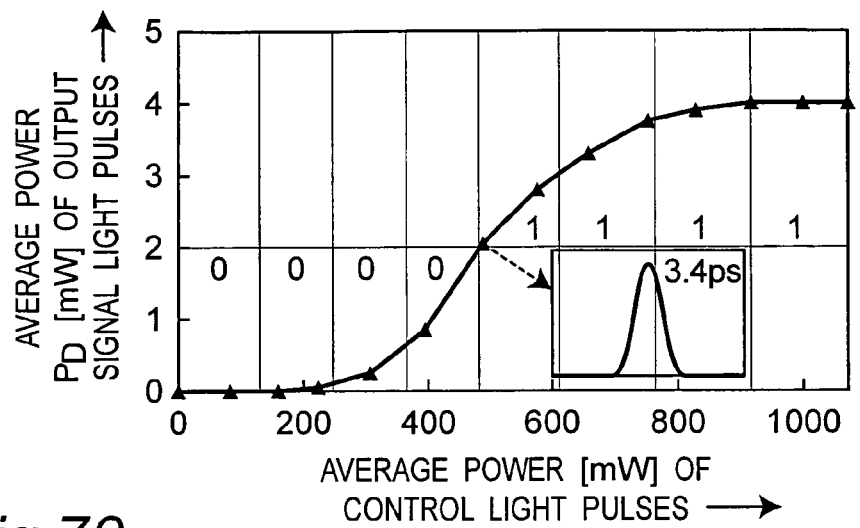
FIG. 69 is a graph showing an average power $P_D$ of the output signal light pulses outputted from an optical threshold processor 301A with respect to the average power of control light pulses inputted to the optical threshold processor 301A, showing results of experiments with the fifth experimental system of FIGS. 64 and 65.
Figure 70:
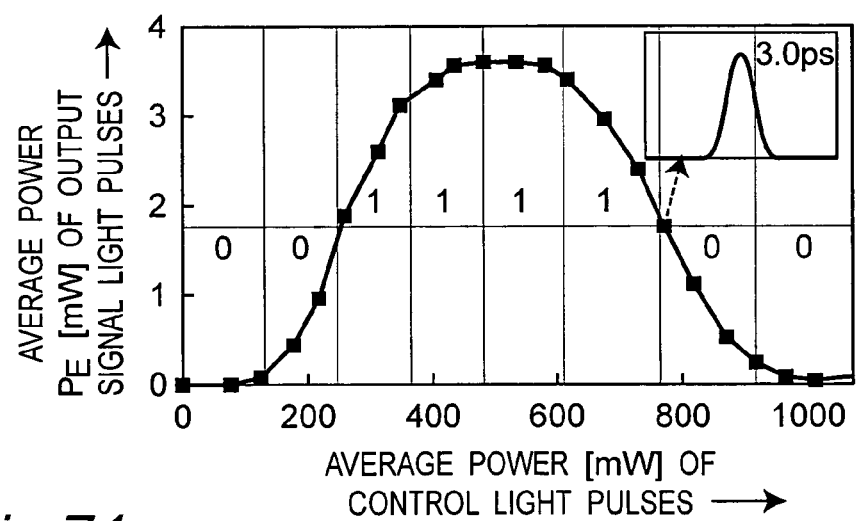
FIG. 70 is a graph showing an average power $P_E$ of output signal light pulses outputted from an optical threshold processor 302A with respect to the average power of control light pulses inputted to the optical threshold processor 302A, showing results of experiments with the fifth experimental system of FIGS. 64 and 65.
Figure 71:
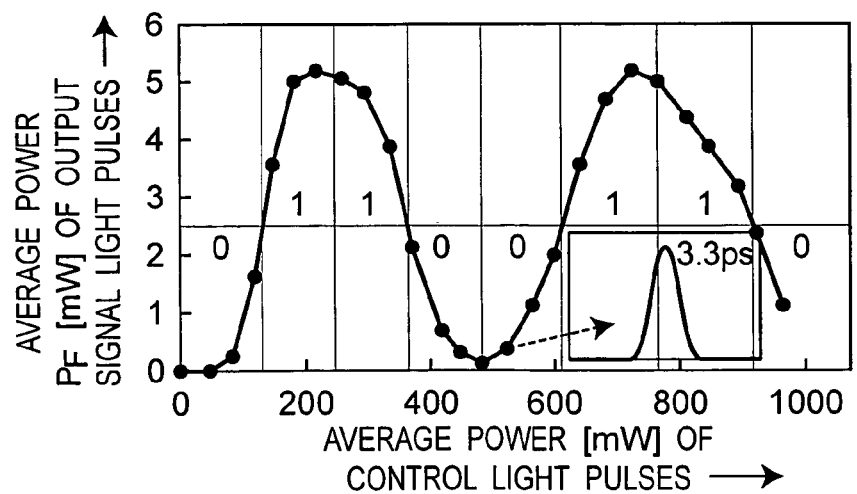
FIG. 71 is a graph showing an average power $P_F$ of the output signal light pulses outputted from the optical threshold processor 303A with respect to the average power of the control light pulses inputted to the optical threshold processor 303A, showing results of experiments with the fifth experimental system of FIGS. 64 and 65.
Figure 72:
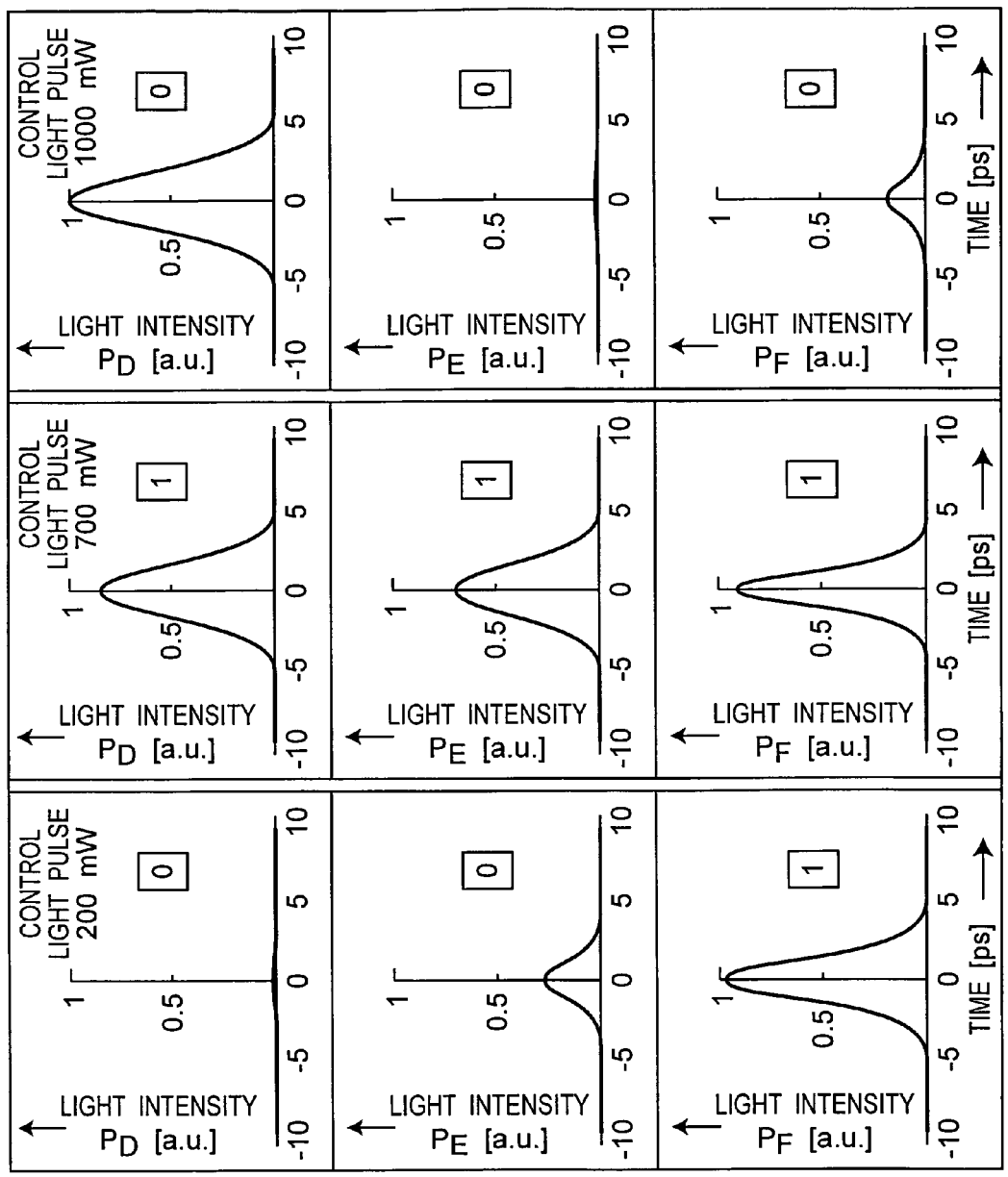
FIG. 72 is graphs showing light intensities $P_D$, $P_E$ and $P_F$ of the optical signals outputted from the respective optical threshold processors 301A, 302A and 303A, showing results of experiments with the fifth experimental system of FIGS. 64 and 65, in the case where the average power of the control light pulses is 200 mW, 700 mW and 1000 mW.

FIG. 66 is a graph showing an average power $P_A$ of output signal light pulses outputted from the optical encoder 201A with respect to an average power of control light pulses inputted to the optical encoder 201A, showing results of experiments with the fifth experimental system of FIGS. 64 and 65. FIG. 67 is a graph showing an average power $P_B$ of the output signal light pulses outputted from the optical encoder 202A with respect to the average power of the control light pulses inputted to the optical encoder 202A, showing results of experiments with the fifth experimental system of FIGS. 64 and 65. FIG. 68 is a graph showing an average power $P_C$ of the output signal light pulses outputted from the optical encoder 203A with respect to the average power of the control light pulses inputted to the optical encoder 203A, showing results of experiments with the fifth experimental system of FIGS. 64 and 65. In addition, FIG. 69 is a graph showing an average power $P_D$ of the output signal light pulses outputted from the optical threshold processor 301A with respect to the average power of control light pulses inputted to the optical threshold processor 301A, showing results of experiments with the fifth experimental system of FIGS. 64 and 65. FIG. 70 is a graph showing an average power $P_E$ of output signal light pulses outputted from the optical threshold processor 302A with respect to the average power of control light pulses inputted to the optical threshold processor 302A, showing results of experiments with the fifth experimental system of FIGS. 64 and 65. FIG. 71 is a graph showing an average power $P_F$ of the output signal light pulses outputted from the optical threshold processor 303A with respect to the average power of the control light pulses inputted to the optical threshold processor 303A, showing results of experiments with the fifth experimental system of FIGS. 64 and 65. Further, FIG. 72 is graphs showing light intensities $P_D$, $P_E$ and $P_F$ of optical signals outputted from the respective optical threshold processors 301A, 302A and 303A, showing results of experiments with the fifth experimental system of FIGS. 64 and 65, in the case where the average power of the control light pulses is 200 mW, 700 mW and 1000 mW.

As shown in FIG. 68, as far as the present inventor knows, it is firmly believed that this is the result of the first experiment in which a multi-period transfer function was observed up to the second period. The average power of control light pulses was measured at the connection point "X" of FIG. 65. It is considered that the non-return-to-zero periodicity is caused by undesirable nonlinearity phenomena, instable polarization, and fluctuation of pulse intensity and timing in the optical fiber cable.

As apparent from the results of experiments for the output light from the respective optical threshold processors 301A, 302A and 303A of FIGS. 69 to 71, the transfer functions were improved and substantially completely returned to "0" after the periods thereof. The inserted drawings in FIGS. 69, 70 and 71 show portions of autocorrelation waveforms with pulse widths determined from the output lights from the respective optical threshold processors 301A, 302A and 303A, and there was observed no significant change in the pulse waveforms. FIG. 72 shows output digital pulses restructured with average powers of control pulses of 200 mW, 700 mW and 1000 mW, which are obtained from measurement values of the pulse width and the average power on the assumption that the pulse waveform is a Gaussian shape. As described above, it was confirmed that 3-bit A/D conversion could be successfully attained. The "0" pulse light can be further suppressed by employing any of a cascade-type connection of plural optical threshold processors as shown in FIG. 15, for example, and an optical 2R technique (re-amplification and re-shaping).

INDUSTRIAL APPLICABILITY

The optical A/D conversion device according to the present invention is applicable to the fields of nodes which require conversion of optical analog signals into optical digital signals and computing which requires high-speed A/D conversion, as well as the field of measurement apparatuses which require high-speed sampling. In addition, the optical A/D conversion device according to the present invention is applicable to other various fields, since the present invention is a basic signal processing technique.

The invention claimed is:

1. An optical signal processing method for optically analog-to-digital-converting an optical analog signal into an optical digital signal, the method including the steps of:

optically sampling the optical analog signal using a sampled signal having a predetermined sampling frequency, and outputting control light having a pulse train of optically sampled optical analog signal;

generating a pulse train of signal light which is synchronized with the sampled signal and has a first wavelength; and optically encoding the pulse train of the signal light according to the control light having the pulse train of the optically sampled optical analog signal, by using a plurality of optical encoders each including nonlinear optical loop mirrors having input-to-output characteristics with different periodicities with respect to light intensity, and outputting a plurality of pulse trains of optically encoded signal light from said optical encoders, respectively; and performing optical threshold processing on the plurality of pulse trains of optically-encoded signal light to optically quantize the plurality of pulse trains of optically-encoded signal light, by using at least one of optical threshold processors each of which is connected to each of said optical encoders and includes a nonlinear optical device having a nonlinear input-to-output characteristic with respect to light intensity, and outputting optically quantized pulse trains as optical digital signals.

2. The optical signal processing method as claimed in claim 1,
wherein said plurality of optical encoders are "N" optical encoders each having an input-to-output characteristic with a period of T×2$^{(N-2)}$, where "N" is a natural number (N=1, 2, 3 . . . ) indicating a quantifying bit number.

3. The optical signal processing method as claimed in claim 1,
wherein said nonlinear optical loop mirror is set to satisfy a relationship of G<2Tth+1, where "G" is a ratio of amplification of the signal light propagating in the same direction as that of the control light, where the amplification is caused by a parametric gain in a nonlinear medium of said nonlinear optical loop mirrors, and "Tth" is a ratio of amplification to the maximum value of power of the outputted signal light.

4. An optical signal processing device for optically analog-to-digital-converting an optical analog signal into an optical digital signal, said device comprising:

an optically sampling device for optically sampling the optical analog signal using a sampled signal having a predetermined sampling frequency, and outputting control light having a pulse train of optically sampled optical analog signal;

a signal generating device for generating a pulse train of signal light which is synchronized with the sampled signal and has a first wavelength; and an optically encoding device for optically encoding the pulse train of the signal light according to the control light having the pulse train of the optically sampled optical analog signal, by using a plurality of optical encoders each including nonlinear optical loop mirrors having input-to-output characteristics with different periodicities with respect to light intensity, and outputting a plurality of pulse trains of optically encoded signal light from said optical encoders, respectively; and an optically quantizing device for performing optical threshold processing on the plurality of pulse trains of optically-encoded signal light to optically quantize the plurality of pulse trains of optically-encoded signal light, by using at least one of optical threshold processors each of which is connected to each of said optical encoders and includes a nonlinear optical device having a nonlinear input-to-output characteristic with respect to light intensity, and outputting optically quantized pulse trains as optical digital signals.

5. The optical signal processing device as claimed in claim 4,
wherein said plurality of optical encoders are "N" optical encoders each having an input-to-output characteristic with a period of T×2$^{(N-2)}$, where "N" is a natural number (N=1, 2, 3 . . . ) indicating a quantifying bit number.

6. The optical signal processing device as claimed in claim 4,
wherein said nonlinear optical loop mirror is set to satisfy a relationship of G<2Tth+1, where "G" is a ratio of amplification of the signal light propagating in the same direction as that of the control light, where the amplification is caused by a parametric gain in a nonlinear medium of said nonlinear optical loop mirrors, and "Tth" is a ratio of amplification to the maximum value of power of the outputted signal light.

7. A nonlinear optical loop mirror comprising an optical fiber, a photo-coupler, a control-light input device for inputting a control light signal to said optical fiber, and a nonlinear medium placed on an optical path of said optical fiber,
wherein said photo-coupler is connected so as to branch an input optical signal inputted from an optical-signal input end into two optical signals and to output the optical signals to both ends of said optical fiber and connected so as to branch and output optical signals outputted from the both ends of said optical fiber to said optical-signal input end and an optical-signal output end, respectively,
wherein said nonlinear optical loop mirror adjusts a phase difference between optical signals inputted to the both ends of said optical fibers according to power of the control light signal so as to control power of the output optical signal outputted from said optical-signal output end, and
wherein said nonlinear optical loop mirror suppresses a parametric gain caused among the respective branched optical signals and the control light signal, so that a ratio of the power of the output optical signal to the maximum value thereof becomes equal to or smaller than a predetermined threshold value when a difference between phase shifts caused to the respective branched optical signals is set to 2nπ (where "n" is an integer equal to or larger than 1), where the phase shifts are caused by cross-phase modulation (XPM) generated among the respective branched optical signals and the control light signal.

8. The nonlinear optical loop mirror as claimed in claim 7,
wherein a relationship of G<2Tth+1 is set to be satisfied, where "G" is a ratio of amplification of the optical signal propagating in the same direction as that of the control light signal, where the amplification is caused by the parametric gain, and "Tth" is a ratio of the predetermined threshold value to the maximum value of the output optical signal.

9. The nonlinear optical loop mirror as claimed in claim 7,
wherein one of the input optical signal and the control light signal is inputted after passing through an optical delay line, so that pulses of the optical signals and pulses of the control light signal are superimposed on each other over a predetermined range of said nonlinear medium.

10. The nonlinear optical loop mirror as claimed in claim 7,
wherein polarization states of the optical signals and the control light signal are substantially identical to each other in said optical fiber and said nonlinear medium.

11. The nonlinear optical loop mirror as claimed in claim 8, wherein the predetermined threshold value is a threshold value required for quantization and encoding processings for optical analog-to-digital conversion.

12. The nonlinear optical loop mirror as claimed in claim 8, wherein the predetermined threshold value is 3 dB.

13. The nonlinear optical loop mirror as claimed in claim 7, wherein one of the following conditions is set to be satisfied:
(a) a dispersion value of said nonlinear medium is equal to or smaller than the minimum dispersion value of dispersion values when the parametric gain caused among the optical signals and the control light signal is equal to or larger than a predetermined value; and
(b) a dispersion value of said nonlinear medium is equal to or larger than the maximum dispersion value of dispersion values when the parametric gain caused among the optical signals and the control light signal is equal to or larger than a predetermined value.

14. The nonlinear optical loop mirror as claimed in claim 7, wherein a wavelength difference between the control light signal and the input optical signal is larger than the maximum wavelength difference which cause a parametric gain equal to or larger than a predetermined value among the optical signals and the control light signal.

15. The nonlinear optical loop mirror as claimed in claim 8, wherein an absolute value of a product of a wavelength difference between the control light signal and the optical signals, and a dispersion value of said nonlinear medium is equal to or smaller than a value which suppress walk-off and set a phase shift difference between the branched optical signals due to cross-phase modulation (XPM) caused among the respective optical signals and the control light signal to be equal to or larger than $2\pi$.

16. A nonlinear optical loop mirror comprising an optical fiber, a photo-coupler, a control-light input device for inputting a control light signal to said optical fiber, and a nonlinear medium placed on an optical path of said optical fiber,
wherein said photo-coupler is connected so as to branch an input optical signal inputted from an optical-signal input end into two optical signals and to output the optical signals to both ends of said optical fiber and connected so as to branch and output optical signals outputted from the both ends of said optical fiber to said optical-signal input end and an optical-signal output end,
wherein said nonlinear optical loop mirror adjusts a phase difference between optical signals inputted to the both ends of said optical fibers according to power of the control light signal so as to control power of the output optical signal outputted from said optical-signal output end,
wherein a dispersion characteristic of said nonlinear medium has a normal dispersion characteristic, at a wavelength of the control light signal, and
wherein one of the following conditions is set to be satisfied:
(a) a dispersion value of said nonlinear medium at a wavelength of the control light signal is equal to or smaller than −0.62 ps/nm/km and a wavelength difference between the input signal light and the control light is equal to or larger than 16 nm; and
(b) a dispersion value of said nonlinear medium at a wavelength of the control light signal is equal to or smaller than −0.315 ps/nm/km and a wavelength difference between the input signal light and the control light is equal to or larger than 20 nm.

17. The nonlinear optical loop mirror as claimed in claim 16,
wherein polarization states of the optical signals and the control light signal are substantially identical to each other in said optical fiber and said nonlinear medium.

18. A nonlinear optical loop mirror comprising an optical fiber, a photo-coupler, a control-light input device for inputting a control light signal to said optical fiber, and a nonlinear medium placed on an optical path of said optical fiber,
wherein said photo-coupler is connected so as to branch an input optical signal inputted from an optical-signal input end into two optical signals and to output the optical signals to both ends of said optical fiber and connected so as to branch and output optical signals outputted from the both ends of said optical fiber to said optical-signal input end and an optical-signal output end,
wherein said nonlinear optical loop mirror adjusts a phase difference between optical signals inputted to the both ends of said optical fibers according to power of the control light signal so as to control power of the output optical signal outputted from said optical-signal output end,
wherein a difference between phase shifts caused to the respective optical signals, due to cross-phase modulation (XPM) caused between the respective optical signals and the control light signal, is equal to or larger than $2\pi$,
wherein said nonlinear medium has a normal dispersion characteristic, at a wavelength of the control light signal, and
wherein said nonlinear optical loop mirror suppresses a parametric gain caused among the respective branched optical signals and the control light signal, so that a ratio of the power of the output optical signal to the maximum value thereof becomes equal to or smaller than a threshold value for optical analog-to-digital conversion when a difference between phase shifts caused to the respective branched optical signals is set to $2n\pi$ (where "n" is an integer equal to or larger than 1), where the phase shifts are caused by cross-phase modulation (XPM) generated among the respective branched optical signals and the control light signal.

19. The nonlinear optical loop mirror as claimed in claim 18,
wherein polarization states of the optical signals and the control light signal are substantially identical to each other in said optical fiber and said nonlinear medium.

20. A method for designing a nonlinear optical loop mirror comprising an optical fiber, a photo-coupler, a control-light input device for inputting a control light signal to said optical fiber, and a nonlinear medium placed on an optical path of said optical fiber,
wherein said photo-coupler is connected so as to branch an input optical signal inputted from an optical-signal input end into two optical signals and to output the optical signals to both ends of said optical fiber and connected so as to branch and output optical signals outputted from the both ends of said optical fiber to said optical-signal input end and an optical-signal output end,
wherein said nonlinear optical loop mirror adjusts a phase difference between optical signals inputted to the both ends of said optical fibers according to power of the control light signal so as to control power of the output optical signal outputted from said optical-signal output end, and wherein the method including the steps of:

a first step of determining a transfer function and a period ($\phi_{max}$) of the transfer function, the transfer function being expressed as a relationship of power of an input optical signal with respect to power of an output optical signal;

a second step of determining a threshold value of the output optical signal suitable for optical signal processing;

a third step of provisionally determining a nonlinearity constant and a dispersion characteristic of said nonlinear medium, and a wavelength and a peak power of the control light signal;

a fourth step of judging whether or not a phase shift reaches the period $\phi_{max}$, and proceeding to a fifth step when the phase shift reaches the period $\phi_{max}$, while returning to the third step when the phase shift does not reach the period $\phi_{max}$; and the fifth step of judging whether or not a relationship of G<2Tth+1 is satisfied, where "G" is a ratio of amplification of the optical signal propagating in the same direction as that of the control light signal, where the amplification is caused by the parametric gain, and "Tth" is a ratio of the predetermined threshold value to the maximum value of the output optical signal, and setting the nonlinearity coefficient and the dispersion characteristic of the nonlinear medium and the wavelength and the peak power of the control light signal which have been provisionally determined to a designing determined value when the relationship is satisfied, while returning to the third step when the relationship is not satisfied.

21. An optical signal conversion method including the steps of branching an input optical signal into two optical signals (A) and (B), propagating the optical signal (A) in the same direction as that of a control light signal having a different wavelength so as to cause cross-phase modulation, and changing a phase shift difference between the optical signals (A) and (B) periodically with respect to change in power of the control light signal so as to change power of output optical signal resulted from interference between the optical signals (A) and (B), wherein the method includes the steps of suppressing a parametric gain caused between the optical signal (A) and the control light signal, so that the power of the output optical signal when the phase shift difference is 2n$\pi$ (where "n" is an integer equal to or larger than 1) is equal to or smaller than a threshold value for quantization and encoding processings for optical analog-to-digital conversion, with respect to the maximum value of the power of the output optical signal.

* * * * *

UNITED STATES PATENT AND TRADEMARK OFFICE
CERTIFICATE OF CORRECTION

PATENT NO. : 7,423,564 B2
APPLICATION NO. : 10/579630
DATED : September 9, 2008
INVENTOR(S) : Ken-ichi Kitayama et al.

It is certified that error appears in the above-identified patent and that said Letters Patent is hereby corrected as shown below:

ON THE TITLE PAGE

Insert section --(30)  Foreign Application Priority Data
November 17, 2003 (JP)  2003-386898
June 4, 2004  (JP)  2004-167230--.

Signed and Sealed this

Eleventh Day of November, 2008

JON W. DUDAS
*Director of the United States Patent and Trademark Office*